United States Patent [19]
Kirii

[11] Patent Number: 5,692,405
[45] Date of Patent: Dec. 2, 1997

[54] METHOD AND APPARATUS FOR OPTIMIZING PRESS OPERATING CONDITION BASED ON PRESS OPERATING ENVIRONMENT AND/OR PHYSICAL CONDITION OF BLANK

[75] Inventor: Kazunari Kirii, Aichi-ken, Japan

[73] Assignee: Toyota Jidosha Kabushiki Kaisha, Toyota, Japan

[21] Appl. No.: 414,013

[22] Filed: Mar. 30, 1995

[30] Foreign Application Priority Data

Mar. 31, 1994 [JP] Japan ................................. 6-063263
Mar. 31, 1994 [JP] Japan ................................. 6-063264

[51] Int. Cl.$^6$ ................................. B21D 24/14
[52] U.S. Cl. ................................. 72/16.1; 72/351
[58] Field of Search ................................. 72/19.1, 21.1, 72/350, 351, 14.8, 14.9, 16.1

[56] References Cited

U.S. PATENT DOCUMENTS

| | | |
|---|---|---|
| 3,809,488 | 5/1974 | Sonderegger . |
| 4,283,929 | 8/1981 | Heiberger . |
| 4,386,304 | 5/1983 | Bergmann . |
| 4,488,237 | 12/1984 | Aronson et al. . |
| 4,592,220 | 6/1986 | Martinez et al. . |
| 4,621,517 | 11/1986 | Hatanaka et al. . |
| 4,745,792 | 5/1988 | Story et al. . |
| 4,909,061 | 3/1990 | Reitter et al. ................ 72/334 |
| 4,945,742 | 8/1990 | Schoch . |
| 5,027,631 | 7/1991 | Naito . |
| 5,138,857 | 8/1992 | Siegert . |
| 5,140,834 | 8/1992 | Kashiwagi et al. . |

FOREIGN PATENT DOCUMENTS

| | | |
|---|---|---|
| 0491948 | 2/1987 | European Pat. Off. . |
| 0467297 | 1/1992 | European Pat. Off. . |
| 0566308 | 11/1993 | European Pat. Off. . |
| 59212199 A | 12/1984 | Japan . |
| 60-261700 | 12/1985 | Japan . |
| 399730 | 4/1991 | Japan . |

OTHER PUBLICATIONS

Patent abstracts of Japan, vol. 12, No. 218 (M-711), 22 Jun. 1988 & JP-A-63 16820, 23 Jan. 1988.

Patent abstracts of Japan, vol. 16, No. 557 (M-1340), 27 Nov. 1992 & JP-A-4 212826, 4 Aug. 1992.

Patent abstracts of Japan, vol. 14, No. 315 (M-995) 6 Jul. 1990 & JP-A-2 106308, 18 Apr. 1990.

Patent abstracts of Japan, vol. 011, No. 048 (M-561), 13 Feb. 1987 & JP-A-61 209853, 18 Sep. 1986.

*Primary Examiner*—Lowell A. Larson
*Attorney, Agent, or Firm*—Cushman Darby & Cushman IP Group of Pillsbury Madison & Sutro LLP

[57] ABSTRACT

A method and an apparatus of optimizing the operating condition of a press which includes the quality of a product to be obtained by a pressing operation on a blank, wherein at least one physical value of the press operating environment (e.g., ambient temperature and humidity and atmospheric pressure) and/or the physical condition (e.g., configuration and dimensions, mechanical and chemical properties and surface condition) of the blank is detected or manually entered into a memory, and an optimum value of the press operating condition is determined on the basis of the detected or manually entered physical value or values, so that the press operating condition is adjusted to the determined optimum value, irrespective of a variation in the press operating environment and/or a variation in the physical condition of the blank.

14 Claims, 23 Drawing Sheets

METHOD AND APPARATUS FOR OPTIMIZING PRESS OPERATING CONDITION BASED ON PRESS OPERATING ENVIRONMENT AND/OR PHYSICAL CONDITION OF BLANK

BACKGROUND OF THE INVENTION

1. Field of the Invention

The present invention relates generally to a press, and more particularly to a method and an apparatus for adjusting or setting an operating condition or conditions of the press, depending upon the operating environment of the press and/or the characteristics of a blank or workpiece.

2. Discussion of the Related Art

There has been widely used a press adapted to perform a pressing operation with a relative movement of a pair of dies toward and away from each other. Such a press is provided with condition adjusting means for adjusting the operating conditions such as a blank-holding force and a pressing force, which influences the quality of a product to be obtained by the pressing operation. An example of a single-action press provided with a cushioning device is shown in FIGS. 1 and 2. The press is designed to effect a drawing operation on a blank 49 by a die 18 and a punch 12 while the blank 49 is held between the die 18 and a pressure ring 30, with a blank-holding force being evenly distributed over the entire area of the pressure ring 30 by the cushioning device. The press has condition adjusting means in the form of a solenoid-operated shut-off valve 46 for adjusting the blank-holding force as one of the operating conditions of the press, by adjusting air pressure Pa in a cushioning air cylinder 42. The press further has another condition adjusting means in the form of die-height adjusting mechanisms 52 for adjusting a pressing or forming force as another operating condition of the press, by adjusting relative distances h between plungers 22 and slide plate 20. Co-pending U.S. application, Ser. No. 08/043,822, now U.S. Pat. No. 5,419,169, (assigned to the assignee of the present application and disclosing the subject matter of JP-A-5-285700) discloses methods of automatically adjusting such operating conditions of the press, on the basis of die-set information representative of the specifications of the die set (12, 18, 30), and machine information representative of the specifications of the press.

According to the method of adjusting the blank-holding force as disclosed in the above-identified co-pending application, the die-set information used for the adjustment includes: an optimum value Fso of the blank-holding force for permitting an optimum drawing operation with the die set; a weight Wr of the pressure ring 30 of the die set; and number "n" of cushion pins 24 of the cushioning device. These die-set information Fso, Wr and "n" are determined by performing a test drawing operation on a trial press (used for testing the die set during manufacture of the die set). An optimum level Pax of the air pressure Pa in the cushioning air cylinder 42 is calculated according to the following equation (1), which includes the following machine information: a weight Wa of a cushion pad 28; an average weight Wp of the cushion pins 24; and a pressure-receiving area Aa of the air cylinder 42.

$$Pax=(Fso+Wa+Wr+n\cdot Wp)/Aa \tag{1}$$

However, it was found that the die-set information and machine information indicated above were not sufficient to assure consistently high quality of the products to be obtained under the adjusted press operating conditions. Namely, the quality of the products may be deteriorated in some operating environment of the press, even if the operating conditions are adjusted on the basis of the die-set information and machine information. In this respect, it is noted, for instance, that the blank generally has some amount of a lubricant or coolant oil left on its surfaces. Although the optimum blank-holding force Fso and the other parameters are determined with the presence of such oil being taken into account, the amount of volatilization of the oil varies with changes in the temperature and humidity of the ambient atmosphere. The variation of the amount of volatilization of the oil on the blank leads to a variation in the sliding resistance of the blank, that is, a resistance to a sliding movement of the blank relative to the die 18 and pressure ring 30 during an initial period of a pressing or drawing cycle. Consequently, the products to be obtained by the pressing operation under the same optimum blank-holding force Fso, for example, may not have the consistent quality, due to the variation in the sliding resistance of the blank due to the varying ambient temperature and humidity.

It is also noted that the air pressure Pa is detected by an air pressure sensor 50 (FIG. 1), with respect to the atmospheric pressure such that the air pressure Pa is zero when it is equal to the atmospheric pressure, assuming that the ambient atmosphere has a constant pressure (one atmospheric pressure). Accordingly, the air pressure Pa as detected by the air pressure sensor 50 is different from the actual pressure if the atmospheric pressure at the location of the press varies. This is also a possible cause for the deterioration of the quality of the product. The above drawback also applies to the air pressures of the other air cylinders used on the press, such as air pressure Pb in counterbalancing air cylinders 80 (FIG. 2), and air pressure Pc in overload-protective hydro-pneumatic cylinders 66. In the case of the cylinders 66, a detection error of the air pressure Pc would result in damaging the press and the die set.

The test pressing or drawing operation to determine the optimum blank-holding force Fso and other press operating conditions is performed using the same blank or workpiece as used on a production run of the press. However, the blanks on which the pressing operation is effected in the actual production run have different physical characteristics, which lead to inconsistent quality of the obtained products. For example, the blanks have variations in the material composition and the thickness. In the case of manufacture of an outer panel of a motor vehicle by drawing the blanks in the form of metal sheets, for instance, the metal sheets are obtained from rolls or coils of metal strips. The individual rolls or coils may have variations in the material composition and thickness of the strips, within certain permissible ranges. Further, even the same roll or coil has different material characteristics due to different residual stresses, at its radially inner and outer portions. Such varying or different physical characteristics of the rolls or coils mean varying characteristics of the individual metal sheets as the blanks, which may cause different qualities of the products produced by pressing under the same press operating conditions. This drawback resulting in the rejected products may be avoided by applying more strict standards to the material, size and other properties of the blanks (by narrowing the above-indicated permissible ranges) or by using higher-grade blanks which are less likely to cause cracking, creasing or deformation of the products due to some variations of the material and thickness. However, this solution increases the cost of manufacture of the products.

SUMMARY OF THE INVENTION

It is therefore a first object of the present invention to provide a method of optimizing an operating condition of a press, without an influence of at least one of (i) a variation in the operating environment of the press such as the ambient temperature and humidity and the atmosphere pressure, and (ii) a variation in the physical condition of the blank such as the material and thickness.

It is a second object of the present invention to provide an apparatus suitable for practicing the method indicated above.

The first object may be achieved according to one aspect of the present invention, which provides a method of optimizing an operating condition of a press which influences a quality of a product to be obtained by a pressing operation performed on a blank, the method comprising the steps of: determining at least one physical value of at least one of an operating environment of the press and a physical condition of the blank; determining an optimum value of the operating condition on the basis of the at least one physical value; and adjusting the operating condition to the optimum value.

According to the present method, a physical value or values of the press operating environment and/or the physical condition of the blank is/are determined, and the optimum value of the press operating condition is determined, so that the press operating condition which influences the quality of the product is adjusted to the determined optimum value by suitable means. Accordingly, the press operating condition is optimized irrespective of, or without an influence of a variation in the press operating environment and/or a variation in the physical condition of the blank.

According to one form of the method of the invention, at least one physical value of the operating environment of the press is determined. For example, the atmospheric pressure near the press is determined, more specifically, detected as a physical value of the press operating condition, by suitable detecting means. This example is applicable to the press which has an air pressure sensor for detecting as the operating condition of the press an air pressure of an air cylinder such that the air pressure is zero when the detected air pressure is equal to the atmospheric pressure. In this case, the optimum value of the air pressure is determined on the basis of the air pressure value as detected by the air pressure sensor and the detected atmospheric pressure, more particularly, determined such that the optimum air pressure value is equal to a sum of the detected air pressure (gage pressure) and the detected atmospheric pressure. Suitable pressure control means such as a solenoid-operated pressure control valve as condition adjusting means is controlled so as to adjust the air pressure of the cylinder to the determined optimum value. This arrangement permits the operating operation to be performed with the optimum air pressure of the air cylinder, without an influence of the varying atmospheric pressure.

The optimum value of the press operating condition may be determined on the basis of the detected physical value or values of the press operating environment, and according to a predetermined relationship between the physical value or values of the press operating environment and the optimum value of the press operating condition. The predetermined relationship is preferably stored in suitable memory means of a controller of the press. For example, the press operating condition may be a blank-holding force or a forming force which influences the quality of the product to be obtained by the pressing operation on the blank. The blank-holding force is applied to the blank through a pressure member so that the blank is held by and between the pressure member and one of a pair of dies during an initial period of the pressing operation. The forming force acts on the blank through the pair of dies during the pressing operation to form the blank into the product. The blank-holding force or forming force as the press operating condition is influenced by the ambient temperature and/or the ambient humidity of the press. In this case, the ambient temperature and/or the ambient humidity is/are detected, and the optimum value of the blank-holding force or forming force is determined on the basis of the detected ambient temperature and/or ambient humidity, and according to the predetermined relationship between the ambient temperature and/or humidity and the optimum value of the blank-holding or forming force. The blank-holding force or forming force is adjusted by suitable adjusting means to the determined optimum value.

Thus, the optimum value of the press operating condition such as the blank-holding force or forming force is determined based on the actually detected physical value or values of the press operating environment such as the ambient temperature and humidity, and according to the predetermined relationship, so that the press operating condition is adjusted to the determined optimum value by the suitable adjusting means of the press. According to this method, the blank can be formed into the product having the desired quality, even in the varying press operating environment such as the varying ambient temperature and/or ambient humidity. In other words, the present method is effective to avoid occurrence of defective products due to a change in the press operating environment.

In the above case where the blank-holding force or forming force is determined on the basis of the detected ambient temperature and/or humidity, the predetermined relationship may comprise an equation for obtaining an optimum value of the blank-holding force or forming force on the basis of at least an amount of change of a sliding resistance of the blank due to a change in at least one of the ambient temperature and humidity. The sliding resistance is a resistance to a sliding movement of the blank relative to the pressure member and the above-indicated one of the dies which cooperates with the pressure member to hold the blank.

As indicated above, the ambient temperature and/or humidity will influence the quality of the product even if the pressing operation is effected with the same blank-holding force or forming force. In other words, the optimum value of the blank-holding force or forming force should be varied depending upon the ambient temperature and/or humidity which influences the amount of volatilization of an oily substance adhering to or left on the blank. To this end, the ambient temperature and/or humidity is/are detected by a temperature sensor and/or a humidity sensor. The predetermined relationship between the physical value or values of the press operating environment and the optimum value of the press operating condition is determined by experiment or simulation or according to a theoretical formula, so as to assure the desired quality of the product. In this respect, the quality of the product is considered in terms of the cracks, creases, deformation, spring-back, buckling or warpage of the product, etc. for example. The determination relationship may take the form of an equation or equations. Although the optimum operating condition of the press may be obtained directly from the actually detected physical value or values of the press operating environment, the optimum value of the operating condition may be determined by adjusting a predetermined standard operating condition by a compensating value which is determined depending upon a difference between a standard value and the detected actual value of the operating condition. Since the optimum operating condition varies with a kind or type of the die set (pressure member and pair of dies), the above-indicated relationship should preferably be provided for each kind of the die sets, so that the optimum operating condition is determined for each kind of the die sets, according to the appropriate relationship. Alternatively, the optimum press operating condition may be determined according to a predetermined relationship which includes as parameters the physical values representative of the specifications of the die set used, an angle and an amount of sliding movement of the blank, etc.

While the press operating condition such as the blank-holding force or forming force is adjusted by the condition adjusting means, the adjustment may be made either manually or automatically. In the manual adjustment, the condition adjusting means is operated by the operator of the press while monitoring the actual force or other value of the press operating condition on the basis of an output of a measuring device such as load cell or strain gage device. For the automatic adjustment, a relationship between the press operating condition (e.g., blank-holding force) and a control parameter (e.g., air cylinder pressure) which is controlled by the condition adjusting means to adjust the press operating condition is obtained on the basis of the actual press operating condition detected by a suitable sensor such as the strain gage device, while the control parameter is changed. The optimum value of the control parameter is calculated by a computer according to the above relationship, and the condition adjusting means is automatically controlled by the computer to adjust the control parameter to the calculated optimum value. For some press operating condition, the optimum value of an appropriate control parameter may be calculated by a suitable formula, and the condition adjusting means is automatically controlled to adjust the control parameter to the calculated optimum value. If the computer requires machine information and die-set information representative of the specifications of the press and die set to calculate the optimum value of the control parameter, such machine information and die-set information are stored in a memory of the computer. It is also possible to provide a suitable display for indicating the optimum value of the control parameter calculated by the computer, so that the operator of the press may manipulate the condition adjusting means so as to adjust the control parameter to the optimum value displayed.

According to another form of the method of the invention, at least one physical value of the physical condition of the blank is obtained. For instance, such physical value or values of the physical condition of the blank is entered into a controller of the press, and the optimum value of the press operating condition is determined on the basis of the entered physical value or values of the physical condition of the blank, and according to a predetermined relationship between the physical value or values of the blank and the optimum value of the press operating condition. The predetermined relationship is stored in a suitable memory of the controller.

In the above case, the optimum value of the press operating condition is determined according to the predetermined relationship, and depending upon the actual physical value or values indicative of the physical condition of the blank. The actual operating condition of the press is adjusted to the determined optimum value by the condition adjusting means. This arrangement assures the desired quality of the product, even in the presence of a variation in the physical value or values of the blank. In other words, the present method prevents occurrence of defective products due to the variation in the physical condition of the blanks, and reduces the required tolerance or accuracy of the blank in terms of the material composition and thickness, for example. Further, the present method makes it possible to reduce the cost of manufacture of the product. That is, since the present method assures the optimum press operating condition irrespective of the variation in the material, thickness and other physical condition of the blank, the blank can be pressed into the product having the desired quality, even if the blank is a relatively inexpensive low-grade or low-quality blank which would otherwise be likely to suffer from cracking, creasing or deformation due to the variation of its physical condition from the nominal specifications.

The physical condition of the blank may be expressed by physical values of the blank: thickness or other dimensions; tensile strength, value "r", value "n" and other mechanical properties; a content of carbon and other chemical properties; presence or absence of a plating, and a kind of the plating; and surface roughness and other surface condition. These physical values of the physical condition of the blank will influence the quality of the product even if the blank is pressed with the same blank-holding force or forming force. That is, the optimum value of the press operating condition such as the blank-holding force or forming force should be adjusted depending upon the physical condition of the blank. The physical values of the physical condition of the blank to be used are suitably selected depending upon the press operating condition to be adjusted. These physical values may be actually measured by suitable testing or measuring instruments, or may be supplied from a manufacturer of the blank. The predetermined relationship between the physical value or values of the blank and the optimum value of the press operating condition is determined by experiment or simulation or according to a theoretical formula, so as to assure the desired quality of the product. In this respect, the quality of the product is considered in terms of the cracks, creases, deformation, spring-back, buckling or warpage of the product, etc. for example. The relationship may take the form of an equation or equations. Although the optimum operating condition of the press may be obtained directly from the actually detected physical value or values of the blank, the optimum value of the operating condition may be determined by adjusting a predetermined standard operating condition by a compensating value which is determined depending upon a difference between a standard value and the detected actual value of the operating condition. A physical value of the blank which will not vary to such an extent as to influence the quality of the product need not be taken into account. Only one physical value or a few physical values such as the thickness of the blank, whose variation will have a significant influence on the product quality, may be used to determine the optimum value of the press operating condition. The above-indicated relationship should preferably be provided for each kind of the die sets, so that the optimum operating condition is determined for each kind of the die sets, according to the appropriate relationship. Alternatively, the optimum press operating condition may be determined according to a predetermined relationship which includes as parameters the specifications of the die set used, an angle and an amount of sliding movement of the blank, etc. as described above with respect to the physical values of the press operating environment.

The condition adjusting means may be controlled either manually by the operator or automatically by a computer, as described above, to adjust the press operating condition to the optimum value determined depending upon the physical value or values of the physical condition of the blank.

The second object indicated above may be achieved according to another aspect of the present invention, which provides an apparatus for optimizing an operating condition of a press which influences a quality of a product to be obtained by a pressing operation performed on a blank, the apparatus comprising condition adjusting means for adjusting the operating condition, the apparatus comprising: first determining means for determining at least one physical value of at least one of an operating environment of the press and a physical condition of the blank; and second determining means for determining an optimum value of the operating condition on the basis of the at least one physical value, the condition adjusting means adjusting the operating condition of the press to the determined optimum value.

According to one form of the apparatus of the invention, the first determining means comprises detecting means for detecting at least one physical value of the operating environment of the press, and relationship memory means for storing a predetermined relationship between the at least one physical value of the operating environment and the optimum value of the press operating condition, and the second determining means comprises condition calculating means for calculating the optimum value of the operating condition on the basis of the detected physical value or values of operating environment and according to the predetermined relationship stored in the relationship memory means.

The apparatus according to the above form of the invention is suitable for practicing the above-indicated method of optimizing the press operating condition such as the blank-holding force or forming force which influences the quality of the product and which is changed by a physical value or values of the press operating environment such as the ambient temperature and/or humidity. In the present apparatus, the physical value or values of the press operating environment is actually detected by the detecting means, and the optimum value of the press operating condition is calculated by the condition calculating means on the basis of the detected physical value or values and according to the predetermined relationship stored in the relationship memory means. The press operating condition is adjusted to the calculated optimum value by the condition adjusting means. The condition adjusting means is either automatically controlled by a suitable controller, or manually by the operator of the press while observing the optimum value of the press operating condition displayed on suitable display means. The present apparatus assures the desired quality of the product irrespective of a variation in the press operating environment such as the ambient temperature or humidity or both, or prevents occurrence of defective products due to such variation.

According to another form of the apparatus of the invention, the first determining means comprises data input means for entering at least one physical value of the physical condition of the blank, and relationship memory means for storing a predetermined relationship between the at least one physical value of the physical condition and the optimum value of the press operating condition, and the second determining means comprises condition calculating means for calculating the optimum value of the press operating condition on the basis of the entered physical value or values of the physical condition of the blank and according to the predetermined relationship stored in the condition memory means.

The apparatus according to the above form of the invention is suitable for practicing the above-indicated method of optimizing the press operating condition on the basis of the physical value or values of the physical condition of the blank. In the present apparatus, the optimum value of the press operating condition is calculated on the basis of the physical value or values of the physical condition of the blank entered through the data input means, and according to the predetermined relationship stored in the relationship memory means. The press operating condition is adjusted to the calculated optimum value by the condition adjusting means, which is either automatically controlled by a suitable controller, or manually by the operator of the press while observing the optimum value of the press operating condition displayed on suitable display means. The present apparatus also assures the desired quality of the product irrespective of a variation in the press operating environment such as the ambient temperature and/or humidity.

BRIEF DESCRIPTION OF THE DRAWINGS

The above and optional objects, features, advantages and significant aspects of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
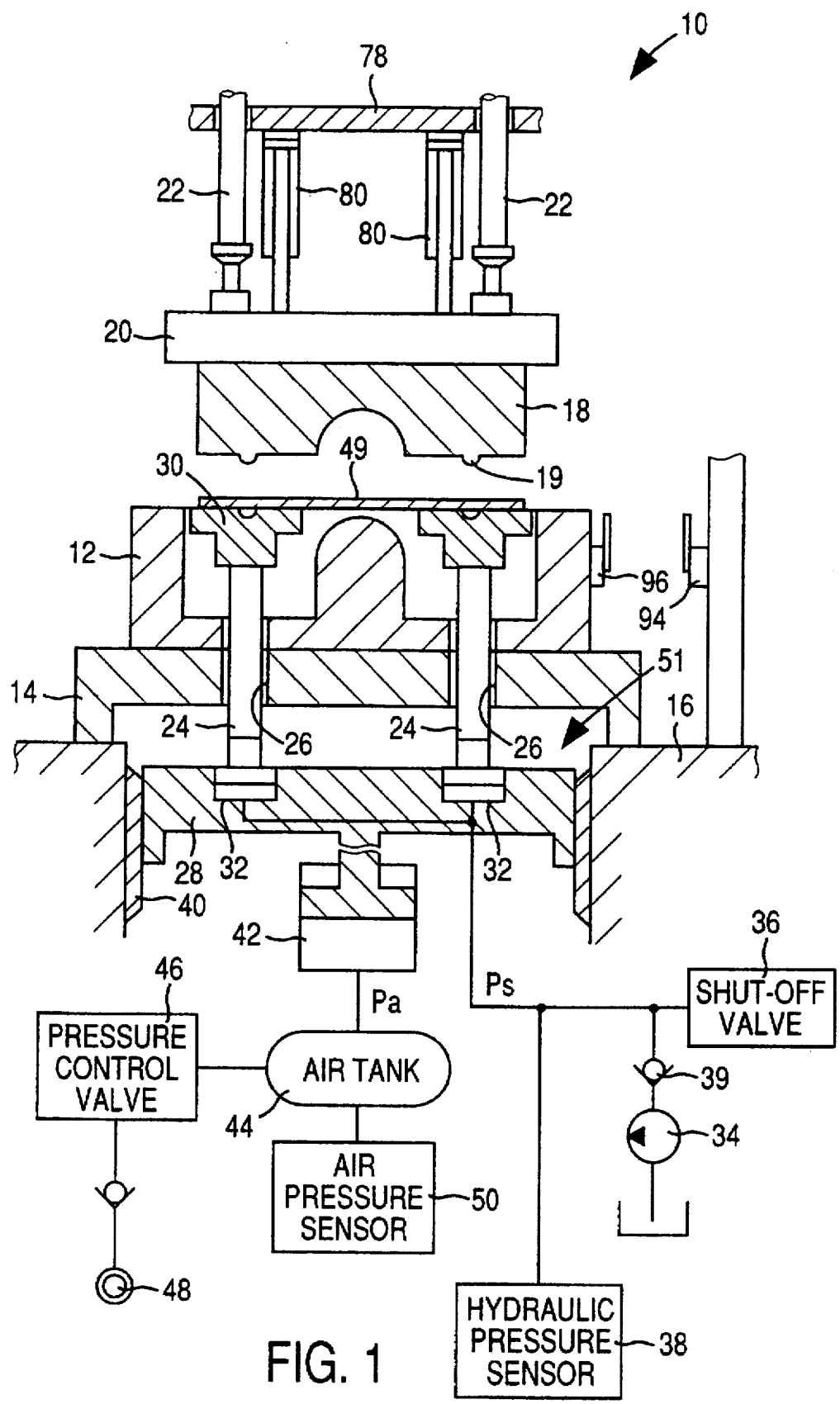
FIG. 1 is a schematic view showing an example of a single-action press to which the principle of the present invention is applicable.

Referring first to FIG. 1, there is schematically shown one example of a single-action press 10 adapted to perform a drawing operation for producing a formed outer panel for a motor vehicle. The press 10 has a bolster 14 fixed in place on a press bed 16. A lower die in the form of a punch 12 is fixedly disposed on the bolster 14, while an upper die in the form of a die 18 is attached to a slide plate 20. This slide plate 20 is moved in the vertical direction by four plungers 22, which are operatively connected to a suitable drive mechanism including a drive motor, gears, crankshaft, joint pins and links. The bolster 14 has a multiplicity of through-holes 26 through which respective cushion pins 24 extend. Located below the bolster 14 is a cushion pad 28 which support the cushion pins 24. The cushion pins 24 also extend through the punch 12, to support at their upper ends a pressure member in the form of a pressure ring 30 disposed around a working portion of the punch 12. The number "n" and positions of the cushion pins 24 are suitably determined depending upon the size and shape of the pressure ring 30, for example.

The punch 12, upper die 18 and pressure ring 30 constitute a die set which is removably installed on the press 10.

Figure 3:
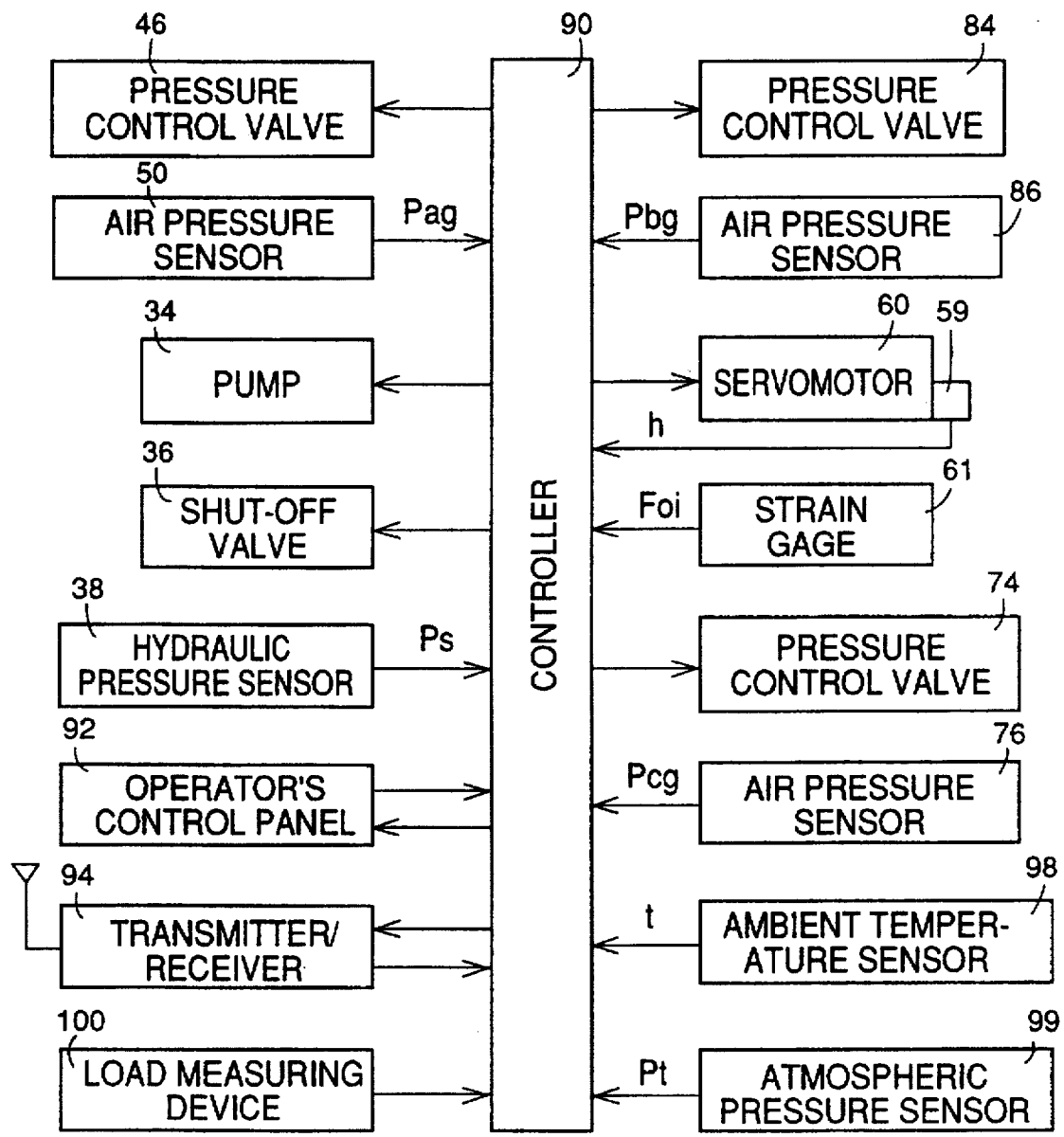
FIG. 3 is a block diagram indicating a control system provided for the press of FIG. 1, which is constructed according to a first embodiment of the present invention.

The cushion pad 28 incorporates a multiplicity of balancing hydraulic cylinders 32 corresponding to the cushion pins 24 which extend through the through-holes 26 formed through the bolster 14. The lower ends of the cushion pins 24 are held in abutting contact with the pistons of the respective hydraulic cylinders 32. The cushion pad 28 is supported by a cushioning air cylinder 42 such that the cushion pad 28 is movable in the vertical direction while being guided by a guide 40 and such that the cushion pad 28 is biased by the air cylinder 42 in the upward direction. The pressure chamber of the air cylinder 42 is connected to an air tank 44, which is connected to an air pressure source 48 via a solenoid-operated pressure control valve 46. The air pressure source 48 may be a suitable compressed air source provided in a plant in which the press 10 is installed. Air pressure Pa within the air tank 44 is suitably adjusted by the pressure control valve 46, which is electromagnetically operated and controlled. An air pressure sensor 50 is provided to detect an air pressure (gage pressure) Pag with respect to the atmospheric pressure Pt, which is detected by an atmospheric pressure sensor 99 (FIG. 3). As described below, an air pressure Pa within the air tank 44 and the air cylinder 42 is calculated by adding the atmospheric pressure Pt to the gage pressure Pag.

The air tank 44 and the cushioning air cylinder 42 cooperate to constitute force generating means for generating a blank-holding force Fs to be applied to the pressure ring 30, while the press is in a drawing operation on a blank in the form of a metal strip or sheet 49. Described in detail, a force acting on the blank under drawing is applied to the cushion pad 28 through the pressure ring 30 and cushion pins 24, whereby the cushion pad 28 is lowered, forcing down the piston of the cushioning air cylinder 42. As a result, the blank-holding force Fs corresponding to the air pressure Pa in the air cylinder 42 is applied to the pressure ring 30 and to the blank 49 through the cushion pad 28 and cushion pins 24. Although only one cushioning air cylinder 42 is shown in FIG. 1, two or more air cylinders 421 may be used as needed. In this case, all the cushioning air cylinders 42 are connected to the common air tank 44.

The balancing hydraulic cylinders 32 have respective oil chambers which communicate with each other. These oil chambers are supplied with a pressurized working fluid delivered from an electrically operated hydraulic pump 34. Hydraulic pressures Ps within the oil chambers of the hydraulic cylinders 32 is regulated by opening and closing a solenoid-operated shut-off valve 36. The hydraulic pressure Ps is detected by a hydraulic pressure sensor 38, and adjusted so as to apply the blank-holding force Fs to the pressure ring 30, with the force Fs substantially evenly distributed to the individual cushion pins 24, so that the blank-holding force Fs is substantially evenly distributed over the entire area of the pressure ring 30. The cushion pins 24, cushion pad 28, balancing hydraulic cylinders 32 and air cylinder 42 constitute a cushioning device 51 for even distribution of the blank-holding force Fs on the pressure ring 30.

In operation of the press 10, the blank in the form of the metal sheet 49 is first squeezed or pressed at its peripheral portion, with the blank-holding force Fs, between the upper die 18 and the pressure ring 30 when the upper die 18 is lowered. With the upper die 18 further lowered, the central portion of the metal sheet 49 is brought into contact with the lower die in the form of the punch 12, whereby the peripheral portion of the metal sheet 49 is moved toward the central portion of the punch 12, against the blank-holding force Fs. Thus, the metal sheet 49 is drawn by and between the punch 12 and die 18. The die 18 has a bead or protrusion 19 formed on its lower surface contacting the metal sheet 49. This bead 19 is provided to give a suitable resistance to the movement of the metal sheet 49 relative to the die 18, for thereby providing the metal sheet 49 with a suitable tension that does not cause a crease or crack on the product obtained by drawing of the metal sheet 49.

Figure 2:
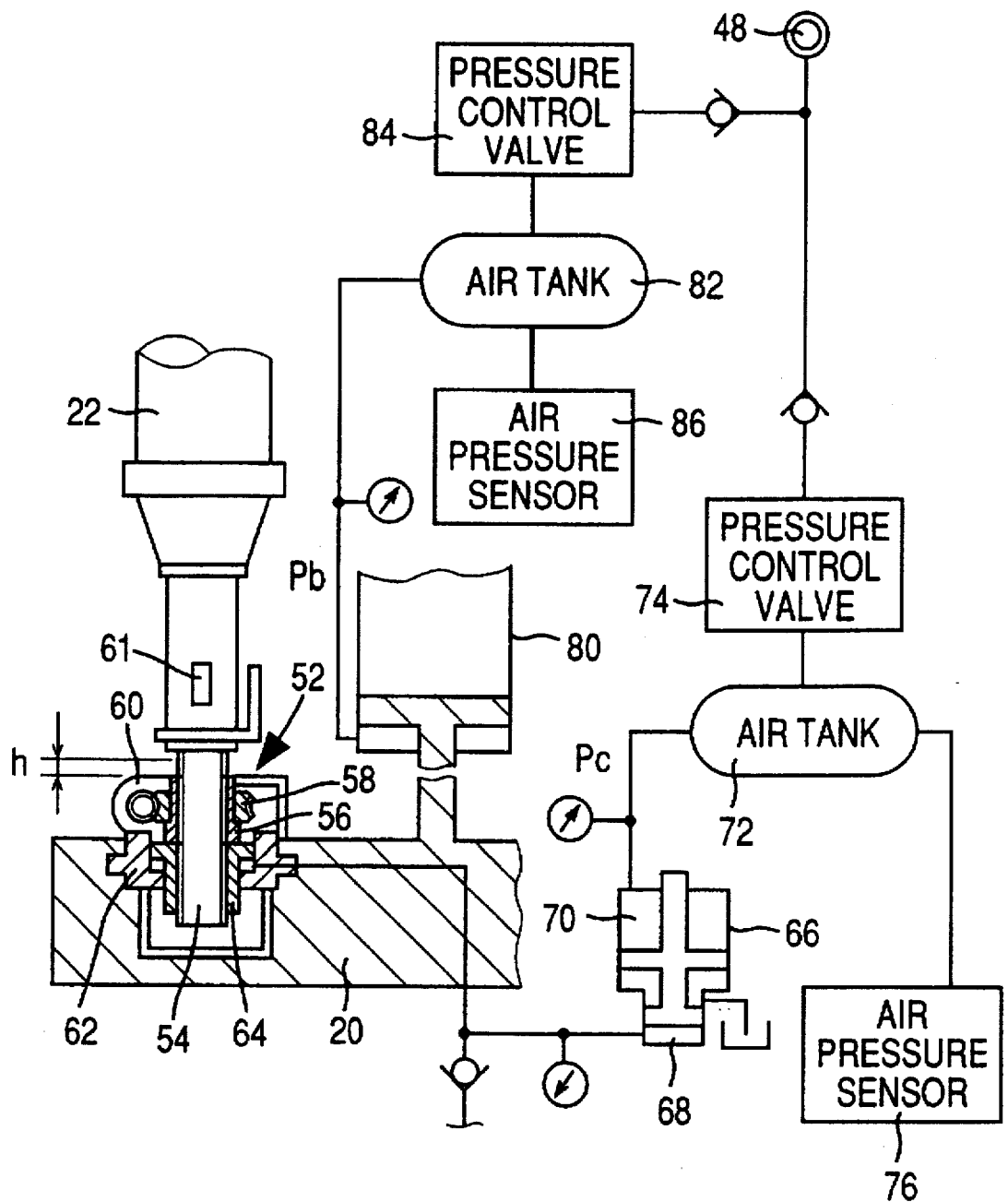
FIG. 2 is a block diagram showing a die-height adjusting mechanism and the related components of the press of FIG. 1.

Referring to FIG. 2, each of the four plungers 22 is connected to the slide plate 20 through a die-height adjusting mechanism indicated generally at 52. The die-height adjusting mechanism 52 engages a threaded shaft 54 formed integrally with the corresponding plunger 22. The mechanism 52 includes a nut 56 engaging the threaded shaft 54, a worm wheel 58 fixed to the nut 56, and a servomotor 60 for rotating a worm which meshes with the worm wheel 58. The servomotor 60 is bidirectionally operated to rotate the worm wheel 58 and the nut 56 clockwise or counterclockwise, for thereby adjusting the height or vertical position of the die-height adjusting mechanism 52 relative to the threaded shaft 54, that is, a relative distance "h" between the plunger 22 and the slide plate 20, more precisely, between the lower end of the plunger 22 and the upper end of the mechanism 52. The relative distance "h" is detected by a rotary encoder 59 (FIG. 3) attached to the servomotor 60.

The slide plate 20 is lowered away from the plunger 20 as the relative distance "h" increases, and the initial position of the slide plate 20, namely, the upper stroke end of the slide plate 20 is shifted toward the punch 12. Accordingly, a pressing force Fp which acts on the blank 49 when the plunger 22 is at its lower stroke end can be adjusted by changing the relative distance "h". The relative distance "h" is adjusted for each of the four plungers 22, depending upon the desired pressing force Fp, by suitably controlling the servomotor 60.

As shown in FIGS. 2 and 3, each plunger 22 is provided with a strain gage 61, which is adapted to detect a load which acts on the corresponding plunger 22. In practice, the load represented by the output of the strain gage 61 is used to calculate an optimum value of a load Foi (i=1, 2, 3, 4) which is expected to act on a portion of the slide plate 20 at which the appropriate plunger 22 is connected. This optimum load value Foi is calculated, for example, on the basis of the output of the strain gage 61, and according to a predetermined relationship between the output of the strain gage 61 and a load value actually measured by a load measuring device 100 shown in FIG. 4. The predetermined relationship is represented by a data map stored in a controller 90 (FIG. 3), which will be described.

The slide plate 20 incorporates an overload-protective hydraulic cylinder 62 which has a piston 64 connected to each die-height adjusting mechanism 52. The housing of the hydraulic cylinder 62 is formed integrally with the slide plate 20. The pressure chamber of the hydraulic cylinder 62 is filled with a working fluid and communicates with an oil chamber 68 of a hydro-pneumatic cylinder 66. This cylinder 66 has also an air chamber 70 communicating with an air tank 72 connected to the above-indicated air pressure source 48 through another solenoid-operated pressure control valve 74. Air pressure Pc within the air chamber 70 and air tank 72 is adjusted by means of the pressure control valve 74. The air pressure Pc is detected by an air pressure sensor 76, and is adjusted depending upon the pressing capacity of the press 10. That is, the air pressure Pc is determined so that when an excessive load acts on the overload-protective hydraulic cylinder 62, the piston of the hydro-pneumatic cylinder 66 is moved toward the air chamber 70, so as to permit movements of the die-height adjusting mechanism 52 and the slide plate 20 toward each other, for thereby protecting the press 10 and the dies 12, 18 against damage due to an overload. The hydraulic cylinder 62, air tank 72 and the related components are provided for each of the four plungers 22 associated with the respective die-height adjusting mechanisms 52, and the air pressure Pc in each of the four air tanks 72 is suitably controlled.

The slide plate 20 is also connected to four counterbalancing air cylinders 80 attached to a frame 78 (indicated at the top of FIG. 1) of the press 10. Each air cylinder 80 has a pressure chamber communicating with an air tank 82, which is also connected to the air pressure source 84 through a solenoid-operated pressure control valve 84. By controlling the valve 84, air pressure Pb within the pressure chamber of the air cylinder 80 and the air tank 82 can be suitably regulated. The air pressure Pb is detected by an air pressure sensor 86 is adjusted so that the force corresponding to the air pressure Pb in the four air cylinders 80 counterbalances the total weight of the slide plate 20 and the upper die 18. An air pressure sensor 86 is provided to detect an air pressure (gage pressure) Pbg. As described below, the air pressure Pb is calculated by adding the atmospheric pressure Pt to the gage pressure Pbg. The pressure chambers of the four counterbalancing air cylinders 80 are connected to the common air tank 82.

The press 10 is controlled by a controller 90 as shown in FIG. 3. The controller 90 is adapted to receive output signals of the air pressure sensors 50, 86, 76, hydraulic pressure sensor 38, rotary encoder 59 and strain gages 61, which are indicative of the air pressures Pag, Pbg, Pcg, hydraulic pressure Ps, relative distance "h" and load value Foi. The controller 90 is constituted by a microcomputer, which incorporates a central processing unit (CPU), a random-access memory (RAM), a read-only memory (ROM), an input/output interface circuit, and analog-digital (A/D) converters. The CPU operates to process various signals according to control programs stored in the ROM, while utilizing a temporary data storage function of the RAM, so as to control the pressure control valves 46, 84, 74 and shut-off valve 36, and apply drive signals to the pump 34 and servomotor 60. Although FIG. 3 shows only one piece or one unit, for the servomotor 60, strain gage 61, pressure control valve 74 and air pressure sensor 76, the controller 90 is adapted to control all of the four pieces provided on the press 10.

To the controller 90, there are also connected an operator's control panel 92, a transmitter/receiver (transceiver) 94, an ambient temperature sensor 98 and an atmospheric pressure sensor 99. The operator's control panel 92 has various indicators or displays for indicating the air and hydraulic pressure values indicated above, various keys, switches or other controls for entering setting or changing various kinds of data or parameters. The transmitter/receiver 94 is provided to read die-set information from an ID card 96 (FIG. 1) attached to the punch 12, and transmit the die-set information to the controller 90. The die-set information represent specifications of the die set 12, 18, 30 used on the press 10. The ID card 96 storing the die-set information has a built-in battery and a data transmitting function. The transmitter/receiver 94 transmits a call signal to the ID card 96, to request the transmission of the die-set information. The ambient temperature sensor 98 detects an ambient or room temperature "t" near the press 10, while the atmospheric pressure sensor 99 detects the atmospheric pressure Pt. These sensors 90, 99 function as means for detecting physical values indicative of the operating environment of the press 10.

Figure 4:
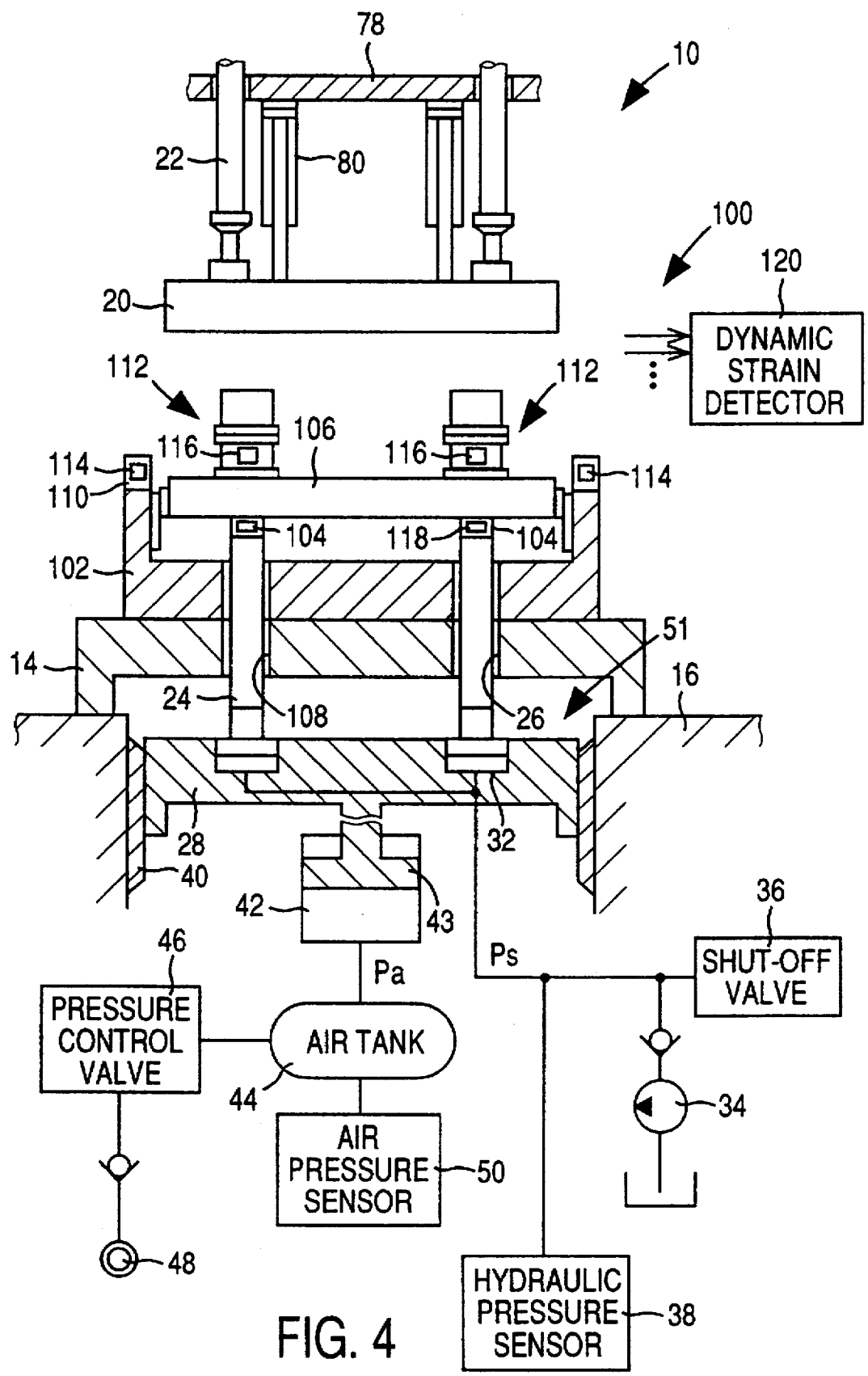
FIG. 4 is a schematic view of the press of FIG. 1 as equipped with a load measuring device for measuring a load expected to act on the pressure ring of the press.

The controller 90 is also adapted to receive an output signal of the load measuring device 100 indicated above. As shown in FIG. 4, the load measuring device 100 is installed on the press 10, without the punch 12, die 18 and pressure ring 30 installed on the press 10. The load measuring device 100 is used to measure load values at local portions of the press 10 during simulation of a pressing operation as described below. The device 100 has a positioning member 102 of rectangular box construction fixed on the bolster 14, and a measuring member 106 accommodated within the positioning member 102. The measuring member 106 is movable in the vertical direction, and has a plurality of sensing pins 104 protruding from the underside thereof. The sensing pins 104 are disposed so as to be aligned with the respective cushion pins 24. The positioning member 102 has a plurality of apertures 108 through which the respective cushion pins 24 extend. The measuring member 106 rests on the cushion pins 24 extending through the through-holes 26 and the apertures 108, such that the sensing pins 104 are held in abutting contact with the upper ends of the corresponding cushion pins 24. The positioning member 102 also has four sensing posts 110 projecting upwards at the four corners of the rectangular box. On the other hand, the measuring member 106 has four sensing elements 112 projecting upwards from the upper surface, near the four corner portions of an area in which a drawing operation is effected on the press 10. The four sensing posts 110 and the four sensing elements 112 are provided with respective sets of strain gages 114, 116. Suitably selected ones of the sensing pins 104 indicated above are provided with respective sets of strain gages 118. The strain gages 114, 116, 118 are connected to a dynamic strain detector 120, which is connected to the controller 90. The dynamic strain detector 120 has a function of an amplifier, and is capable of adjusting a zero point thereof.

Each set of strain gages 114, 116, 118 consists of four strain gages attached to each sensing post 110, sensing element 112 or sensing pin 104, at respective four side surface portions of the latter. The four strain gages of each set are connected to each other so as to form a bridge circuit.

Figure 5:
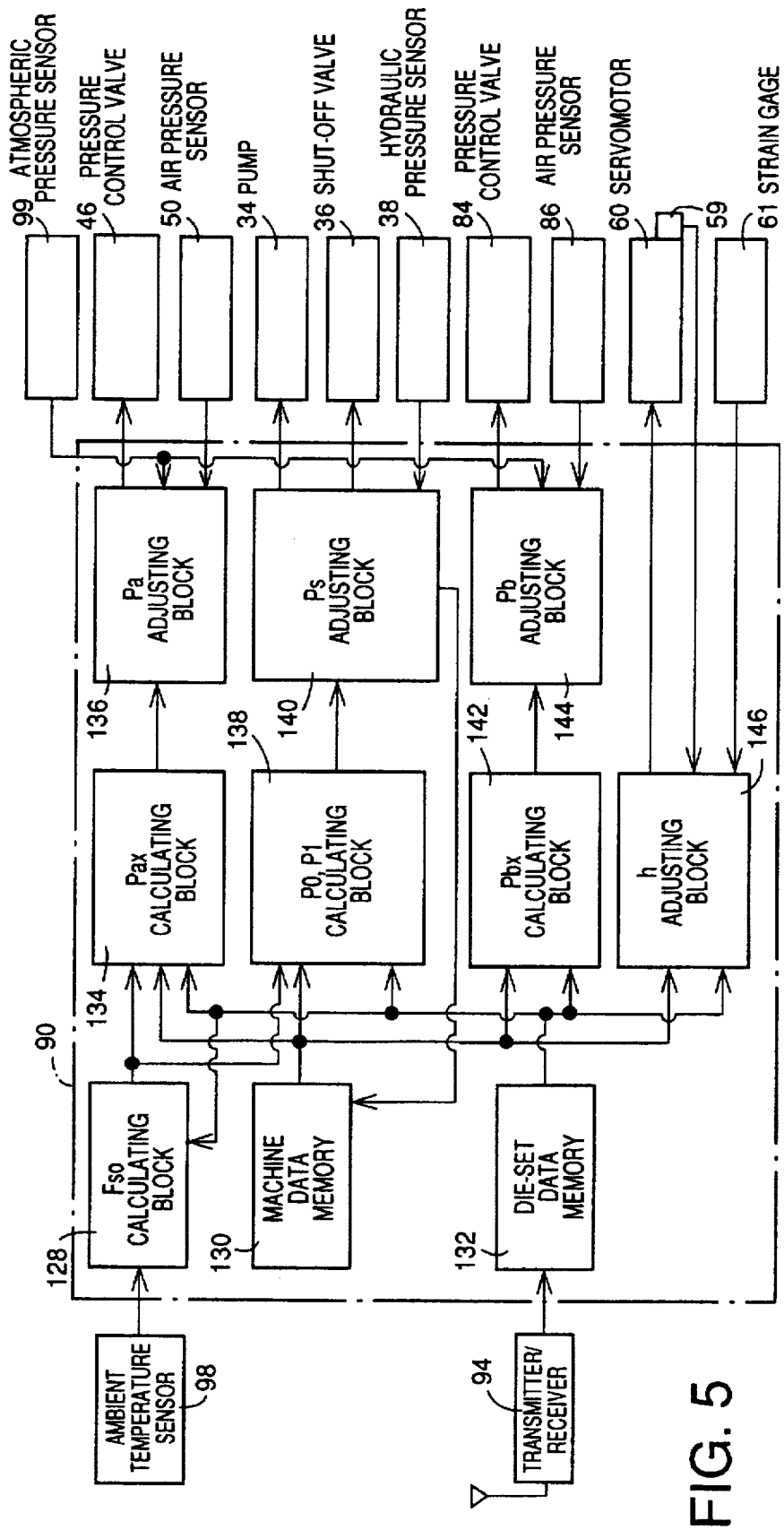
FIG. 5 is a block diagram for explaining the functions of a controller of the control system of FIG. 3.

The controller 90 performs the functions illustrated in the block diagram of FIG. 5, according to the control programs stored in the ROM. As indicated in FIG. 5, the controller 90 includes a machine data memory 130 for storing machine information indicative of the specifications of the press 10, and a die-set data memory 132 for storing the die-set information which is transmitted from the ID card 96 through the transmitter/receiver 94 as explained above. The machine information and the die-set information are used to determine the air pressure values Pa, Pb, hydraulic pressure Ps and relative distance "h", which assure an optimum pressing or drawing operation on the press 10 using the die set 12, 18, 30. The machine information and the die-set information include the following information, for example.

[Machine Information]

(a) Weight Wa of the cushion pad 28
(b) Average weight Wp of the cushion pins 24
(c) Weight Ws of the slide plate 20
(d) Pressure-receiving area Aa of the air cylinder 42
(e) Total pressure-receiving area Ab of the four air cylinders 80
(f) Average pressure receiving area As of the hydraulic cylinders 32
(g) Modulus K of elasticity of volume of the working fluid used for the hydraulic cylinders 32
(h) Mean travel Xav of the pistons of the hydraulic cylinders 32
(i) Total volume V of the fluid in the hydraulic circuit including the hydraulic cylinders 32
(j) Provisional h-Ffi characteristic relationship (Ffi=a·h)

[Die-Set Information]

(1) Weight Wr of the pressure ring 30
(2) Weight Wu of the upper die 18
(3) Optimum local forming forces Ffoi (4) Number "n" of the cushion pins 24
(5) Optimum tension $T_o$ of the metal strip 49
(6) Standard sliding resistance $\mu_o$ of the metal strip 49 between the die 18 and the pressure ring 30
(7) Standard ambient temperature $t_o$
(8) Equation (8) to calculate a compensating value $\Delta\mu$ The equation (8) will be described below. It is noted that the die-set information also include: data indicative of the specific die set used, which differs depending on the product to be produced; data indicative of a model of a car for which the product is used; data indicative of a type of the press 10 on which die set is used; and data indicative of a process in which the product is produced from the blank 49.

The weight Wa of the cushion pad 28 is the actual weight of the pad 28 minus the sliding resistance applied to the pad 28. This weight value Wa can be obtained by the load measuring device 100 installed on the press 10, as shown in FIG. 4. Described in detail, the weight value Wa is obtained from an Fs-Pa relationship, which is obtained by measuring the blank-holding force Fs while the air pressure Pa is changed. To measure the blank-holding force Fs expected to be generated on the single-action press 10, the positioning member 102 and the measuring member 106 are installed on the press 10, without the punch 12, pressure ring 30 and upper die 18 installed on the press 10. For the measurement, the slide plate 20 is lowered to its lower stroke end. During this downward movement of the slide plate 20, the lower surface of the slide plate 20 is brought into contact with the sensing elements 112 on the measuring member 106, whereby the measuring member 106 is lowered against the biasing force of the cushioning air cylinder 42. The loads acting on the four sensing elements 112 during the downward movement of the measuring member 106 are detected by the strain gages 116. Before the slide plate 20 has reached its lower stroke end, the measuring member 106 comes into abutting contact with the positioning member 102. At this time, the loads detected by the strain gages 116 suddenly rise, due to rigidity of the structure of the press 10.

Figure 6:
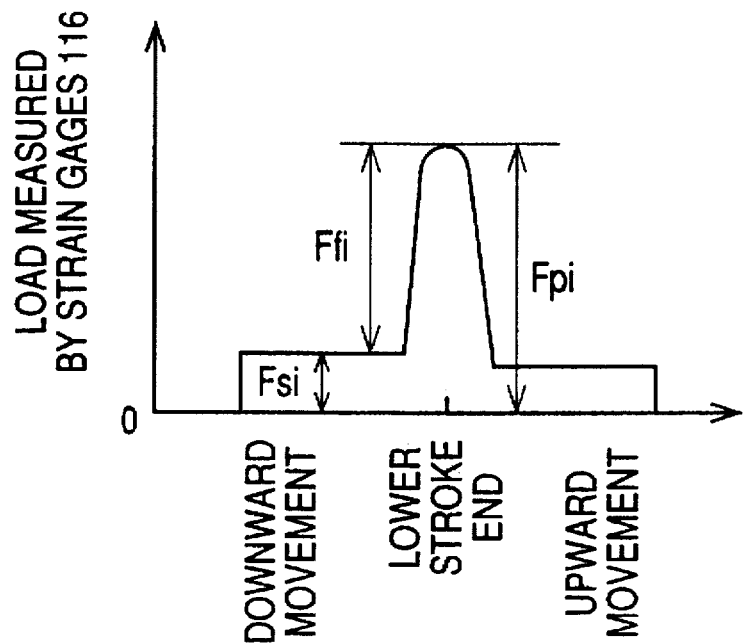
FIG. 6 is a graph showing an example of a waveform of a load detected by strain gages used in the load measuring device of FIG. 4.

The graph of FIG. 6 indicates a variation in the local load value detected by the strain gages 116 provided on one of the four sensing elements 112. In the graph, "Fsi" represents a local value of the blank-holding force Fs, which local value corresponds to the sensing element 112 in question. Similarly, "Ffi" represents a local value of a forming force Ff for drawing the metal strip 49, while "Fpi" represents a local value of a pressing force Fp. The local pressing force value Fpi is equal to a sum of the local blank-holding force value Fsi and the local forming force value Ff. Namely, the total pressing force Fp is equal to a sum of the total blank-holding force Fs and the total forming force Ff. The measuring member 106 and the positioning member 102 have a higher degree of rigidity than the die set 12, 18, 30 usually used on the press 10.

Figure 7:
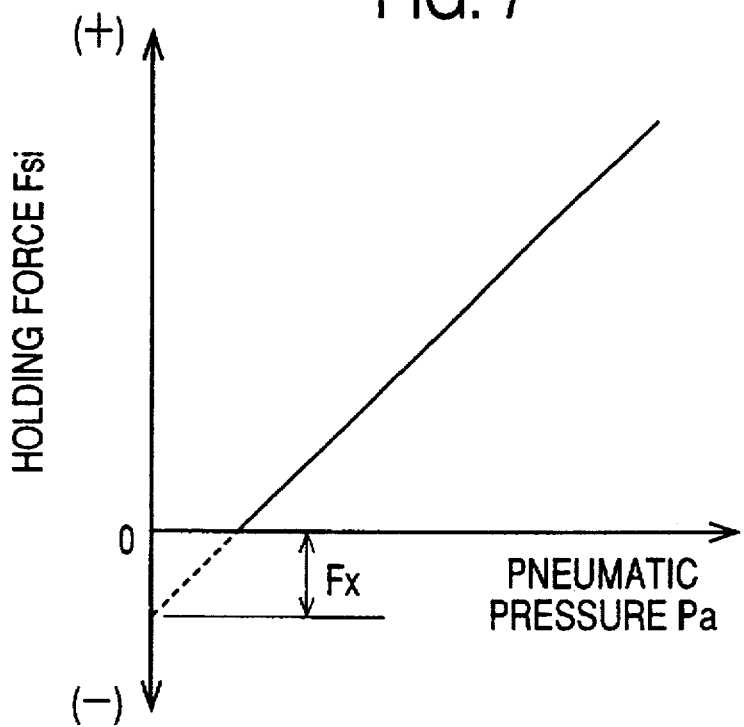
FIG. 7 is a graph indicating a relationship between blank-holding force Fs detected by the load measuring device of FIG. 4 and air pressure Pa of cushioning air cylinder in the press of FIG. 1.

The graph of FIG. 7 indicates a relationship between the air pressure Pa of the air cylinder 42 and the total blank-holding force Fs which is equal to a sum of the local values Fsi corresponding to the four sensing elements 112. The weight Wa of the cushion pad 28 is calculated on the basis of a load value Fx which can be obtained from the Pa-Fs relationship. Described more specifically, the weight Wa is calculated by subtracting the total weight of the measuring member 106 (including the weight of the sensing pins 104 and sensing elements 112) and the cushion pins 24, from the load value Fx. The thus obtained weight Wa is different from and smaller than the actual weight of the cushion pad 28, by an amount which is determined by various parameters such as the sliding resistance values of the guide 40 and piston 43, a degree of the air leakage of the air cylinder 42 and a detecting error of the air pressure sensor 50. Accordingly, the obtained weight Wa is specific to the particular condition of the press 10 on which the load measuring device 100 was used and operated.

The weight Wp is an average value of the weights of the multiple cushion pins 24 used on the press 10. The weight Ws is equal to the actual weight of the slide plate 20 minus a sliding resistance value of the slide plate 20 with respect to a guide therefor. To obtain the weight Ws, the local load values Foi are detected by the respective strain gages 61 during the downward movement of the slide plate 20. The total load value Fo of the four local load values Foi of the four plungers 22 is detected while the air pressure Pb of the air cylinder 80 is continuously changed. Like the weight Wa of the cushion pad 28, the weight Ws of the slide plate 20 can be obtained from the obtained Fo-Pb characteristic relationship between the total load Fo and the air pressure Pb. The pressure-receiving area Aa of the cushioning air cylinder 42 is a value which reflects an influence of the air leakage of the cylinder 42. For instance, the area Aa corresponds to a gradient of a line which represents the relationship between the blank-holding force Fs (sum of the four local load values Fsi) and the air pressure Pa. When a plurality of air cylinders 42 are provided, the area Aa is a total pressure-receiving area of all the air cylinders 42. Like the pressure-receiving area Aa, the total pressure-receiving area Ab of the four air cylinders 80 can be obtained from the Fo-Pb characteristic relationship. The average pressure-receiving area As of the balancing hydraulic cylinders 32 can be obtained from a Fs-Ps characteristic relationship between the blank-holding force Fs, and the hydraulic pressure Ps which is detected by the hydraulic pressure sensor 38 when the Fs-Pa characteristic relationship of FIG. 7 is obtained, for example.

The modulus K of elasticity of volume of the working fluid is determined depending upon the specific property of the oil used. The mean travel Xav of the pistons of the hydraulic cylinders 32 is an average value of travel distances of the pistons of the hydraulic cylinders 32 from the upper stroke ends, when the slide plate 20 has reached its lower stroke end. The mean travel Xav is determined so as to apply the blank-holding force Fs to the pressure ring 30 evenly through all of the cushion pins 24 in abutting contact with the pressure ring 30. Described more specifically, the mean travel Xav is determined so that all of the pistons of the hydraulic cylinders 32 are lowered from their upper stroke ends by the respective cushion pins 24 while none of the pistons are bottomed or lowered to their lower stroke ends by the cushion pins 24, upon reaching of the slide plate 20 to its lower stroke end, even in the presence of a variation in the length dimension of the cushion pins 24 and an inclination of the cushion pad 28. The average travel Xav can be obtained by an experiment, or on the basis of the measured length variation of the cushion pins 24 and maximum strokes of the pistons of the cylinders 32. The volume V is a total volume of the fluid existing in a portion of the hydraulic circuit associated with the hydraulic cylinders 32, which portion includes the pressure chambers of the cylinders 32 and is bounded by a check valve 39 (FIG.1). The volume V is a value when the pistons of the cylinders 32 are at their upper stroke ends.

The provisional h-Ffi characteristic relationship (i=1, 2, 3, 4) is a relationship (Ffi=a·h) between the distance "h" and the local forming force Ffi when the plungers 22 have reached the lower stroke ends. This h-Ffi relationship is obtained by measuring the local forming force Ffi (when the appropriate plunger 22 has reached the lower stroke end), with different values of the relative distance "h". The obtained provisional h-Ffi relationship reflects the rigidity of the press 10. The measurement of the value Ffi is effected after the air pressure Pb of the air cylinders 80 is adjusted so that the lifting force produced by the cylinders 80 counterbalances the total weight of the slide plate 20 and the upper die 18. An example of the provisional h-Ffi characteristic relationship is indicated by one-dot chain line in the graph of FIG. 8, wherein the maximum value $h_o$ of the relative distance "h" when the forming force Ffi is zero is used as a reference. This h-Ffi characteristic relationship is obtained for each of the four plungers 22 (four die-height adjusting mechanisms 52). The total forming force Ff is a sum of the four local forming forces Ffi corresponding to the four plungers 22. It is noted that the four sensing elements 112 having the strain gages 116 are substantially aligned with the respective plungers 22.

The individual items of the die-set information to be stored in the die-set memory 132 will be described.

The weight Wr of the pressure ring 30 and the weight Wu of the upper die 18 are the values which were actually measured of the ring 30 and die 18 as manufactured. The optimum local forming forces Ffoi (i=1, 2, 3, 4) are obtained by a trial-and-error procedure, in which the optimum local forming forces Ffoi suitable for performing a desired drawing operation are determined by test operations on a trial or test press on which the pressure ring 30, upper die 18 and punch 12 are installed. The forces Ffoi do not include components due to the influences by the sliding resistance values of the associated components of the press. In the case where the trial press is similar to that shown in FIGS. 1 and 2, for example, the air pressure Pb is adjusted so that the slide plate 20 is lowered by the plungers 22 while the total weight of the slide plate 20 and the upper die 18 is counterbalanced by the lifting force produced by the counterbalancing air cylinders 80. The optimum local forming forces Ffoi are detected by the strain gages 61 during a trial drawing operation effected with the adjusted air pressure Pb. Like the strain gages 116, the strain gages 61 have an output waveform as indicated in FIG. 6. The local forming forces Ffoi can be determined based on this waveform. The optimum total forming force Ffo is a sum of the four optimum local forming force values Ffoi corresponding to the four plungers 22. The number "n" of the cushion pins 24 is determined by experiment depending upon the size and shape of the pressure ring 30, so as to obtain a desired product by drawing the blank 49.

When the optimum local forming forces Ffoi are determined by test pressing operations with different relative distances "h", the air pressure Pa of the air cylinder 42 and the hydraulic pressure Ps of the hydraulic cylinders 32 are adjusted by entering appropriate data through the operator's control panel 92. Namely, the air pressure Pa is adjusted according to Pax calculating block 134 and Pa adjusting block 136 indicated in FIG. 5, so as to establish the optimum blank-holding force Fso which suits the specific operating environment of the press 10, more specifically, the specific room or ambient temperature t. That is, the air pressure Pa should be adjusted so that the drawing operation is performed with the optimum blank-holding force Fso which is calculated according to Fso calculating block 128 of FIG. 5. Further, the hydraulic pressure Ps of the hydraulic cylinders 32 is adjusted according to P0, P1 calculating block 138 and Ps adjusting block 140 of FIG. 5, so that the blank-holding force Fs is evenly distributed to the cushion pins 24. The air pressure Pb of the counterbalancing air cylinders 80 can also be adjusted according to Pbx calculating block 142 and Pb adjusting block 144 of FIG. 5.

The optimum tension $T_0$ and standard sliding resistance $\mu_0$ of the metal strip 49, the standard ambient temperature $t_0$ of the press 10, and the equation to calculate the compensating value $\Delta\mu$ are used to calculate the optimum blank-holding force Fso according to the following equation (2), so that the optimum blank-holding force Fso is changed depending upon the ambient temperature "t".

$$Fso=T_0/(\mu_0+\Delta\mu) \qquad (2)$$

The optimum tension $T_0$ is a tension of the blank or metal strip 49 which is produced during a drawing operation and which does not cause creasing, cracking or deformation of the product obtained by drawing of the metal strip 49. The optimum tension $T_0$ is determined for each die set (12, 18, 30) used, depending upon the thickness and material of the metal strip 49 and the shape of the die set. While the optimum tension $T_0$ can be obtained according to a theoretical equation, it may be calculated by multiplying the optimum blank-holding force Fso by the sliding resistance $\mu$ of the metal strip 49. The optimum blank-holding force Fso for obtaining the desired product can be obtained by test drawing operations performed with different values of the blank-holding force. The sliding resistance $\mu$ of the metal strip 49 may be determined according to a theoretical equation or by experiment, on the basis of the surface roughness of the sheet 49, presence or absence of a plating layer on the sheet 49, kind of the plating layer, composition and amount of an oil adhering to the surface of the sheet 49, and presence or absence of the bead 19 on the die 18, dimensions of the bead 19, etc. The sliding resistance $\mu$ varies with a change in the amount of volatilization of the oil on the surface of the sheet 49 due to a change in the ambient or room temperature "t". In view this fact, the sliding resistance $\mu$ at the ambient temperature "t" is calculated as a sum of a standard sliding resistance value $\mu_0$ at the standard ambient temperature $t_0$ and the compensating value $\Delta\mu$. The compensating value $\Delta\mu$ is calculated according to the following equation (3), on the basis of a difference $\Delta t$ between the actual ambient temperature "t" and the standard ambient temperature $t_0$.

$$\Delta\mu=a1\cdot\Delta t^{b1} \qquad (3)$$

where, a1 and b1 are predetermined constants, which are determined by experiment, for example.

Referring back to the block diagram of FIG. 5, there will be described the various functions of the controller 90, which are indicated by the respective functional blocks in the block diagram, which correspond to respective means for performing the respective functions.

The Pso calculating block 128 is for calculating the optimum blank-holding force Fso for performing the drawing operation with the optimum tension $T_0$ of the metal sheet 49, on the basis of the optimum tension $T_0$, standard sliding resistance $\mu_0$, standard ambient temperature $t_0$ and the above equation (3) for calculating the compensating value $\Delta\mu$, which are stored in the die-set data memory 132, and on the basis of the ambient temperature "t" detected by the ambient temperature sensor 98. That is, the difference $\Delta t$ between the actual ambient temperature "t" and the standard temperature $t_0$ is first obtained, and the compensating value $\Delta\mu$ is calculated according to the above equation (3). Then, the optimum blank-holding force Fso is calculated according to the above equation (2) on the basis of the optimum tension $T_0$, standard sliding resistance $\mu_0$ and compensating value $\Delta\mu$.

It will be understood that the optimum blank-holding force Fso is one of optimum operating conditions of the press 10, and that the Fso calculating block 128 corresponds to condition calculating means for calculating the optimum blank-holding force Fso depending upon the actual ambient temperature "t", while the die-set data memory 132 storing the above equation (3), optimum tension $T_0$ and standard sliding resistance $\mu_0$ and ambient temperature to correspond to relationship memory means for storing data representative of a relationship between the optimum operating condition (optimum blank-holding force Fso) (optimum operating condition) and physical values (ambient temperature "t" and sliding resistance $\mu$) which define the operating environment of the press 10).

The blank-holding force Fso can be obtained otherwise, depending upon the detected ambient temperature "t". For instance, the sliding resistance $\mu$ of the blank 49 can be calculated according to a function $\mu=f1(t)$, on the basis of the detected ambient temperature "t", without using the standard sliding resistance $\mu_0$. The optimum blank-holding force Fso can be calculated by adding to a standard blank-holding force value Fsn a compensating value $\Delta Fs$, which is calculated according to a function $\Delta Fs=f2(\Delta t)$, on the basis of the temperature difference $\Delta t$. Alternatively, the optimum blank-holding force Fso can be calculated according to a function Fso=f3(t), on the basis of the detected ambient temperature "t".

The Pax calculating block 134 is for calculating an optimum air pressure Pax for producing the optimum blank-holding force Fso (calculated according to the Pso calculating block 128), according to the following equation (4) and on the basis of the machine information and die-set information which are stored in the machine data memory 130 and die-set data memory 132.

$$Pax=(Fso+Wa+Wr+n\cdot Wp)/Aa \qquad (4)$$

The Pa adjusting block 136 is for controlling the solenoid-operated pressure control valve 46 on the basis of the air pressure Pag within the air tank 44 which is detected by the air pressure sensor 50 while the press 10 is at rest, and the atmospheric pressure Pt detected by the atmospheric pressure sensor 99. Namely, the pressure control valve 46 is controlled so that the sum (Pag+Pt) of the detected air pressure Pag and atmospheric pressure Pt is equal to the optimum air pressure Pax calculated according to the Pax calculating block 134.

With the air pressure Pa thus adjusted, the optimum blank-holding force Fso calculated according to the Fso calculating block 128 depending upon the ambient temperature "t" is applied to the pressure ring 30 and the blank 49, whereby the blank 49 can be drawn into the desired product having a high quality, irrespective of a change in the ambient temperature "t".

It will be understood that the pressure control valve 46 constitutes condition adjusting means for adjusting the blank-holding force as one of the operating conditions of the press 10. It will also be understood that adjusting the blank-holding force Fs by adjusting the air pressure Pa to obtain the optimum blank-holding force Fso depending upon the ambient temperature "t" corresponds to a step of adjusting an operating condition of the press 10, and that the ambient temperature "t" is a physical value indicative of a part of the operating environment of the press 10, while the blank-holding force Fs is one of the operating conditions of the press.

As described above, the air pressure Pa is adjusted to the optimum level Pax depending upon the atmospheric pressure Pt. That is, the air pressure Pa is held at the optimum level Pax, irrespective of a change in the atmospheric pressure Pt, whereby the drawing operation can be effected with the optimum blank-holding force Fso which assures the desired quality of the obtained product. It will be understood that adjusting the air pressure Pa depending upon the atmospheric pressure Pt corresponds to a step of adjusting an operating condition of the press 10, and that the atmospheric pressure Pt is a physical value indicative of a part of the press operating environment while the air pressure Pa is one of the operating conditions of the press.

The adjustment of the air pressure Pa according to the Pa adjusting block 136 is usually effected for each pressing or drawing cycle on each piece of the blank 49. However, the atmospheric pressure Pt need not be detected for each drawing cycle. For instance, the atmospheric pressure Pt detected at the start of a series of drawing cycles may be used for all the drawing cycles, or detected at a suitable time interval or each time a predetermined number of drawing cycles have been completed. The calculation of the optimum blank-holding force Fso depending upon the ambient temperature "t" may be implemented at a predetermined time interval or each time a predetermined number of drawing cycles have been completed. Alternatively, the calculation may be implemented when a predetermined condition is satisfied, for example, when the detected ambient temperature "t" changes by more than a predetermined amount or falls outside a predetermined permissible range.

In the present embodiment, the optimum air pressure Pax is calculated according to the Pax calculating block 134, and the air pressure Pa is adjusted to the calculated optimum level Pax according to the Pa adjusting block 136, so that the optimum blank-holding force Fso is established. However, the optimum air pressure Pax may be obtained in the following steps: positioning the slide plate 20 such that the blank-holding force Fs is applied to the pressure ring 30 by the cushioning air cylinder 42 while the pressure ring 30 is slightly lowered from its initial or original position by a downward movement of the upper die 18; detecting the actual blank-holding force Fs on the basis of the total load Fo represented by the four sets of strain gages 61 corresponding to the four plungers 22; and controlling the pressure control valve 46 to adjust the air pressure Pa so that the detected actual blank-holding force Fs is equal to the optimum value Fso. Since there exists a relationship between the blank-holding force Fs and the air pressure Pa as indicated in the graph of FIG. 7, the amount of change or adjustment of the air pressure Pa by the pressure control valve 46 (condition adjusting means) to obtain the optimum air pressure Pax can be determined on the basis of the actual blank-holding force Fs detected by the strain gages 61 and according to the above relationship, so that the air pressure Pa is adjusted to the optimum value Pax to obtain the optimum blank-holding force Fso. The air pressure Pa can be adjusted to the optimum level by continuously changing the air pressure Pa until the detected actual blank-holding force Fs becomes equal to the optimum value Fso. In such cases where the air pressure Pa is adjusted on the basis of the outputs of the strain gages 61 (on the basis of the detected actual blank-holding force Fs), the machine information and the die-set information are not necessary to adjust the air pressure Pa. The air pressure Pb in the counterbalancing air cylinders 80 is adjusted so that the lifting force produced by the cylinders 80 counterbalances the total weight of the slide plate 20 and the die 18, for example, so that the blank-holding force Fs detected by the strain gages 61 when the slide plate 20 is at its upper stroke end is zeroed.

In the present embodiment, the air pressure Pa is automatically adjusted with the pressure control valve 46 automatically controlled by the condition adjusting means in the form of the Pax calculating block 134 and the Pa adjusting block 136. The air pressure Pa may be adjusted to the optimum level Pax manually by the operator of the press 10, by operating the appropriate switches on the operator's control panel 92, which includes switches for displaying on the panel 92 the actual air pressure Pa and the optimum air pressure Pax calculated according to the Pax calculating block 134 and for controlling the pressure control valve 46. In this case, the operator operates the pressure control valve 46 so that the displayed actual air pressure Pa is equal to the displayed optimum level Pax. Alternatively, the blank-holding force Fs calculated according to the above equation (4) on the basis of the air pressure Pa and the optimum blank-holding force Fso calculated according to the Pso calculating block 128 may be displayed on the operator's control panel 92, so that the operator operates the pressure control valve 46 so that the displayed blank-holding force Fs is equal to the displayed optimum value Fso. The blank-holding force Fs calculated according to the equation (4) may be replaced by the total load Fo represented by the outputs of the four sets of strain gages 61 when the pressure ring 30 is slightly lowered by the downward movement of the upper die 18. In this case, the total load Fo is displayed as the blank-holding force Fs on the operator's control panel 92.

The P0, P1 calculating block 138 is for calculating an optimum initial hydraulic pressure P0 and an optimum final hydraulic pressure P of the hydraulic cylinders 32 according to the following equations (5) and (6), respectively, on the basis of the machine information stored in the machine data memory 130, the die-set information stored in the die-set data memory 132, and the optimum blank-holding force Fso calculated according to the Pso calculating block 128:

$$Xav = (Fso - n \cdot As \cdot P0)V/n^2 \cdot As^2 \cdot K \quad (5)$$

$$Fso + Wr + n \cdot Wp = n \cdot As \cdot P1 \quad (6)$$

The optimum initial hydraulic pressure P0 is a pressure for applying the optimum blank-holding force Fso to the pressure ring 30 substantially evenly or equally through all the cushion pins 24, when the upper die 18 is not in pressing contact with the pressure ring 30. On the other hand, the optimum final hydraulic pressure P1 is a similar pressure when the upper die 18 is in pressing contact with the pressure ring 30. The Ps adjusting block 140 is for controlling the pump 34 and shut-off valve 36, so that the initial value of the hydraulic pressure Ps detected by the hydraulic pressure sensor 38 is equal to the calculated optimum initial hydraulic pressure P0 indicated above. With the hydraulic pressure Ps thus adjusted to the optimum initial value P0, it is theoretically possible to lower the pistons of all the hydraulic cylinders 32 by the average travel distance Xav, in a drawing operation with the pressure ring 30 in pressing contact with the upper die 18, and to apply the optimum blank-holding force Fso to the pressure ring 30 substantially evenly through all the cushion pins 24. However, the optimum initial hydraulic pressure P0 is not necessarily accurate enough due to a possibility of existence of air in the hydraulic circuit including the cylinders 32, which causes a variation in the modulus K of elasticity of volume of the working fluid. In view of this drawback, the Ps adjusting block 140 is adapted to read the hydraulic pressure Ps in a test pressing operation, and adjust the pressure Ps once adjusted to the optimum initial value P0, so that the pressure Ps is made substantially equal to the optimum final pressure P1 also calculated according to the P0, P1 calculating block 138. If the actually detected hydraulic pressure Ps during the test pressing operation is higher than the optimum final value P1, some of the cushion pins 24 are not in abutting contact with the pressure ring 30, and the optimum blank-holding force Fso is applied to the pressure ring 30 through the other cushion pins 24 only. In this case, the initial hydraulic pressure P0 is lowered to move the cushion pins 24 upwards so that all the cushion pins 24 may contact the pressure ring 30. If the actual hydraulic pressure Ps is lower than the optimum final value P1, on the other hand, the pistons of some of the hydraulic cylinders 32 are bottomed, and a portion of the blank-holding force Fso acts on the pressure ring 30 directly through the cushion pad 28 and the cushion pins 24 corresponding to the bottomed pistons. In this case, the initial hydraulic pressure P0 is raised to avoid the bottoming of the pistons of any cylinders 32. The thus adjusted initial and final pressure values P0 and P1 are stored in the machine data memory 130.

The Pbx adjusting block 142 is for calculating an optimum air pressure Pbx of the air cylinders 80 to produce the lifting force for counterbalancing the total weight of the slide plate 20 and the upper die 18, according to the following equation (7), on the basis of the machine information and the die-set information.

$$Pbx=(Wu+Ws)/Ab \qquad (7)$$

The Pb adjusting block 144 is for controlling the solenoid-operated pressure control valve 84 on the basis of the air pressure Pbg within the air tank 82 which is detected by the air pressure sensor 86, and the atmospheric pressure Pt detected by the atmospheric pressure sensor 99. Namely, the pressure control valve 84 is controlled so that the sum (Pbg+Pt) of the detected air pressure Pbg and atmospheric pressure Pt is equal to the optimum air pressure Pbx calculated according to the Pbx calculating block 142. With the pressure Pb thus adjusted, the optimum local forming forces Ffoi as specified by the die-set information can be applied to the die set 12, 18, 30, in a drawing operation, without an influence of the weights of the slide plate 20 and upper die 18. Thus, the air pressure Pb is adjusted to the optimum level Pbx depending upon the atmospheric pressure Pt. That is, the air pressure Pb is held at the optimum level Pbx, irrespective of a change in the atmospheric pressure Pt, whereby the drawing operation can be effected with the optimum local forming forces Ffoi, so as to produce the desired product with high quality.

Figure 8:
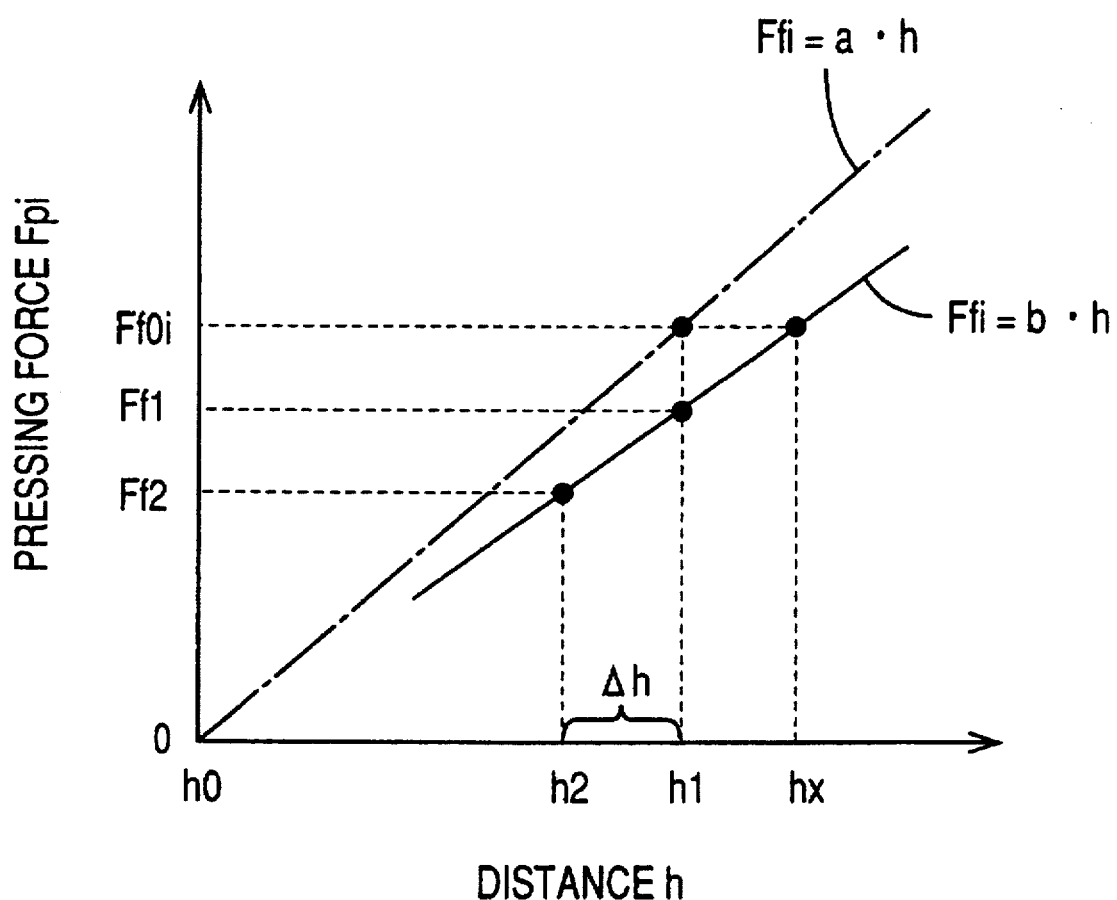
FIG. 8 is a graph indicating forming force Ffi and relative distance h of the press of FIG. 1.

It will be understood that adjusting the air pressure Pb depending upon the atmospheric pressure Pt also corresponds to a step of adjusting an operating condition of the press 10, and that the atmospheric pressure Pt is a physical value indicative of a part of the press operating environment while the air pressure Pb is one of the An h adjusting block 146 is for adjusting the relative distances "h" associated with the four die-height adjusting mechanisms 52, independently of each other, on the basis of the machine information and the die-set information, so that a drawing operation on the blank 49 is effected with the optimum local forming forces Ffoi specified by the die-set information. Initially, the maximum value or reference value h0 of the relative distance "h" when the local forming force Ffi is zero is determined on the basis of the optimum local forming force Ffi which is detected by the strain gages 61 in a test pressing operation in which the press 10 is operated with the cushion pad 28 placed at its lowest position so that no blank-holding force Fs is applied to the pressure ring 30. Then, a relative distance h1 for obtaining the optimum local forming force Ffoi is obtained from the provisional h-Ffi characteristic relationship (Ffi=a·h) as indicated by one-dot chain line in the graph of FIG. 8. The distance "h" is then adjusted to the obtained value h1, with respect to the reference value h0, by operating the servomotor 60. In this condition, a test pressing operation is performed to measure the actual local forming force Ff1 on the basis of the outputs of the strain gages 61. Since the provisional h-Ffi characteristic relationship is based on higher rigidity of the die set than the rigidity of the actually used die set 12, 18, 30, the local forming force Ff1 is generally smaller than the optimum local forming force Ffoi. Then, the relative distance "h" is changed to h2 which is smaller than h1 by a predetermined amount Δh, and the corresponding forming force Ff2 is measured in the same manner as described above with respect to the value Ff1. Subsequently, a final h-Ffi characteristic relationship (Ffi=b·h) indicated by solid line in FIG. 8 is obtained on the basis of the values h1, h2 and the thus obtained force values Ff1, Ff2. An optimum relative distance hx for obtaining the optimum local forming force Ffoi is determined according to the obtained final h-Ffi relationship, and the servomotor 60 is operated to adjust the distance "h" to the determined optimum value hx. The determination of the optimum relative distance hx and the adjustment of the relative distance "h" to the determined value hx by the servomotor 60 are effected for each of the four die-height adjusting mechanisms 52 (corresponding to the respective four plungers 22). The adjustment of the local relative distances "h" as described above permits a drawing operation on the blank 49 with the optimum local forming forces Ffoi as specified by the die-set information, irrespective of different rigidity values of the individual presses 10. The local relative distances "h" may be adjusted to the optimum values hx by adjusting the air pressure Pa so as to produce the optimum blank-holding force Fso, so that each pressing force Ffi is made equal to (Ffi+Fso/4).

The controller 90 is also adapted to regulate the air pressure Pc in the air chamber 70 of the hydro-pneumatic cylinders 66, so that the local load values Foi detected by the four sets of strain gages 61 corresponding to the four plungers 22 do not exceed predetermined upper limit values Foli (i=1, 2, 3, 4). That is, the solenoid-operated pressure control valve 74 is controlled to adjust the air pressure Pc to a predetermined optimum value Pcx. This optimum value Pcx is determined on the basis of the pressure-receiving area of the overload-protective hydraulic cylinder 62 and the pressure-receiving areas of the oil and air chambers 68, 70 of the hydro-pneumatic cylinder 66, so that if a load exceeding the upper limit Foli acts on the hydraulic cylinder 62, due to increased sliding resistance of the slide plate 20, for example, the piston of the cylinder 66 may be moved toward the air chamber 70, thereby permitting the working fluid to flow from the hydraulic cylinder 62 into the oil chamber 68 of the cylinder 66, and allowing the corresponding plunger 22 to be moved toward and relative to the slide plate 20. This air pressure Pc is obtained as a sum of the air pressure Pcg detected by the air pressure sensor 76 and the atmospheric pressure Pt detected by the atmospheric pressure sensor 99. The adjustment of the air pressure Pc is effected for all of the hydro-pneumatic four cylinders 66 provided for the respective four plungers 22, so that the pressure values Pci of the four cylinders 66 are adjusted independently of each other. With the air pressure Pc thus adjusted, the press 10 and the die set 12, 18, 30 can be protected against damage due to an overload, irrespective of a variation in the atmospheric pressure Pt.

It will be understood that adjusting the air pressure Pc depending upon the atmospheric pressure Pt corresponds to a step of adjusting an operating condition of the press 10, and that the atmospheric pressure Pt is a physical value indicative of a part of the press operating environment while the air pressure Pc is one of the operating conditions of the press 10.

As described above, the press 10 equipped with the control system constructed according to the present embodiment is capable of automatically calculating optimum values of the operating conditions, such as optimum initial air pressures Pa, Pb and hydraulic pressure Ps and optimum relative distance "h", so as to permit a pressing or drawing operation with the optimum blank-holding force Fso and optimum local forming force values Ffoi, irrespective of variations or differences in the rigidity and sliding resistances of the press from one machine to another. The automatic calculation of the optimum operating parameters is effected by the controller 90, according to the machine information stored in the machine data memory 130 and the die-set information stored in the die-set data memory 132 (received from the ID card 96 through the transmitter/receiver 94). Thus, the control system for the press 10 eliminates or minimizes the conventional cumbersome manual adjustments of the operating conditions of the press by the trial-and-error procedure, and reduces the operator's work load during a setup procedure of the press, while assuring high stability in the quality of the products produced by the drawing operation on the blanks 49. It is noted that the air pressures Pa, Pb, hydraulic pressure Ps and relative distance "h" need not be adjusted strictly to the optimum values Pax, Pbx, P0 and hx, respectively, but may be adjusted to fall within respective permissible optimum ranges that assure a required quality of the products.

The control system for the press 10 is further adapted to determine the optimum blank-holding force Fso depending upon the ambient or room temperature "t", and adjust the air pressure Pa to effect a drawing operation with the determined optimum blank-holding force Fso that does not cause creasing, cracking or deformation of the products. This arrangement permits the blanks 49 to have the optimum tension $T_0$ for assuring the manufacture of the products with consistently high quality, even under the varying ambient temperature "t" which causes a change in the sliding resistance µ of the blanks 49 relative to the die 18 and pressure ring 30, due to a change in the amount of oil left on the blanks 49. Further, since the pressure control valve 46 is automatically controlled to adjust the air pressure Pa so as to establish the optimum blank-holding force Fso, the operator's work load is considerably reduced, and the pressing operation on the press 10 can be fully automated.

In the present embodiment, the atmospheric pressure Pt is detected by the atmospheric pressure sensor 99, so that the air pressures Pa, Pc, Pb are obtained by adding the detected atmospheric pressure Pt to the air pressures (gage pressures) Pag, Pcg, Pbg detected by the air pressure sensors 50, 76, 86, respectively. The thus obtained air pressures Pa, Pc, Pb are adjusted to the optimum levels Pax, Pcx, Pbx, so that the pressing operation is performed with the optimum air pressures Pax, Pcx, Pbx, without an influence by a change in the atmospheric pressure Pt. Namely, the pressing operation can be performed with the optimum blank-holding force Fso and the optimum local forming forces Ffoi, without a risk of damaging of the press 10 and die set 12, 18, 30 due to an overload, irrespective of a variation in the atmospheric pressure Pt, whereby the blanks 49 can be drawn to produce the desired products with consistently high quality. These air pressures Pa, Pc, Pb are also automatically adjusted, resulting in significant reduction of the operator's work load and making it possible to fully automate the drawing operation.

Figure 9:
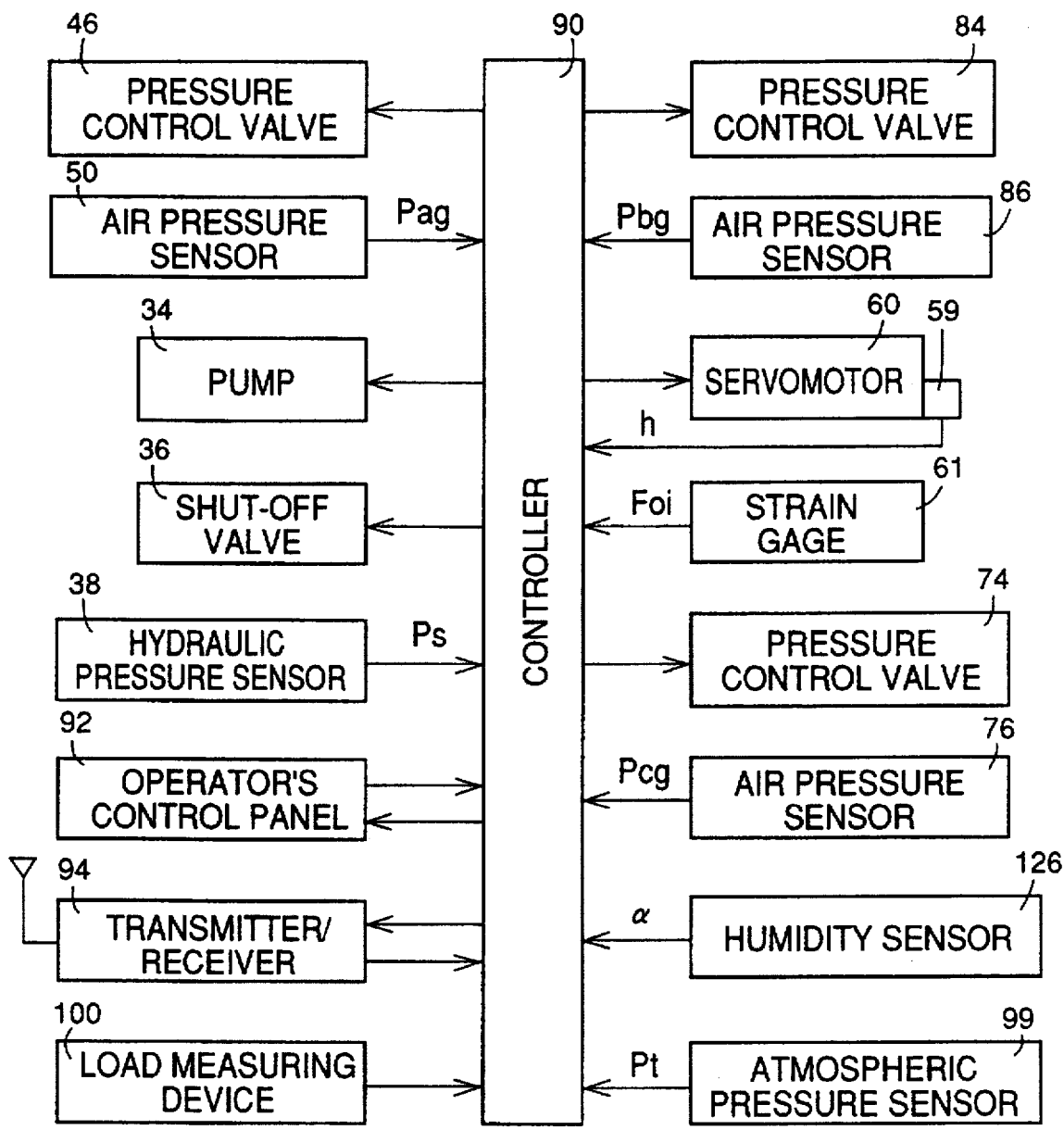
FIG. 9 is a block diagram corresponding to that of FIG. 3, showing a control system for the press of FIG. 1, which is constructed according to a second embodiment of the present invention.

In the illustrated embodiment described above, the optimum blank-holding force Fso for the optimum tension $T_0$ of the blank 49 is obtained based on the detected ambient temperature "t", so that the pressing operation is always performed with the optimum blank-holding force Fso, irrespective of a variation in the sliding resistance µ of the blanks 49 due to the varying ambient temperature "t". In this connection, it is noted that the sliding resistance µ also varies with a change in the humidity of the ambient atmosphere. In view of this fact, it is considered possible to determine the optimum blank-holding force depending upon the ambient humidity which has been detected as a physical value indicative of a part of the press operating environment. Described in detail, the ambient temperature sensor 98 is replaced by a hygrometer or humidity sensor 126 as indicated in the block diagrams of FIGS. 9 and 10. The humidity sensor 126 detects an ambient humidity α near the press 10. Thus, this sensor 126 serves as means for detecting the ambient humidity α as a physical value indicative of a part of the press operating environment. In this second embodiment of FIGS. 9 and 10, the die-set data memory 132 stores, as the die-set information, a standard ambient humidity $α_0$ in place of the standard ambient temperature $t_0$, and the following equation (8) for calculating the compensating value Δµ in place of the equation (3).

$$\Delta\mu = a2 \cdot \Delta\alpha^{b2} \tag{8}$$

where, a2 and b2 are predetermined constants, which are determined by experiment, for example.

AS explained above, the equation (8) is stored in the die-set data memory 132. The compensating value Δµ is calculated according to the above equation (8), on the basis of a difference Δα between the actual ambient humidity α and the standard ambient humidity $α_0$. The optimum blank-holding force Fso is calculated according to the above equation (2).

The blank-holding force Fso can be obtained otherwise, depending upon the detected ambient humidity α. For instance, the sliding resistance µ of the blank 49 can be calculated according to a function µ=g1(α), on the basis of the detected ambient humidity α. The optimum blank-holding force Fso can be calculated by adding to a standard blank-holding force value Fsn a compensating value ΔFs, which is calculated according to a function ΔFs=g2(Δα), on the basis of the humidity difference Δα. Alternatively, the optimum blank-holding force Fso can be calculated according to a function Fso=g3(α), on the basis of the detected ambient humidity α. Further, the optimum blank-holding force Fso may be obtained on the basis of both the ambient humidity α and the ambient temperature "t" detected by the humidity and temperature sensors 126, 98, according to appropriate functions such as Δµ=q1(Δt, Δα), µ=q2(t, α), ΔFs=q3(Δt, Δα), and Fs=q4(t, α).

Figure 11:
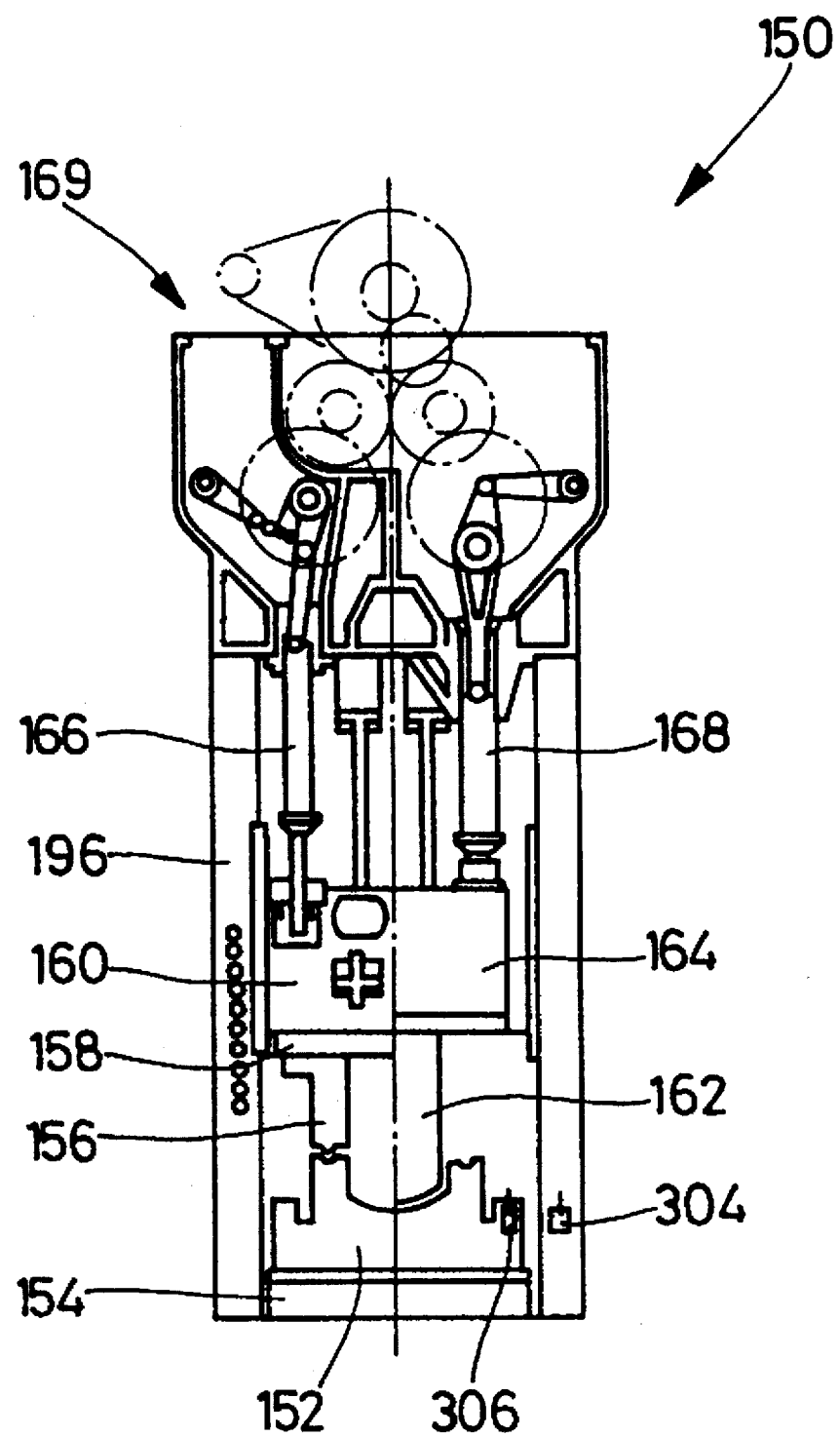
FIG. 11 is an elevational view showing an example of a double-action press to which the present invention is also applicable.
Figure 12:
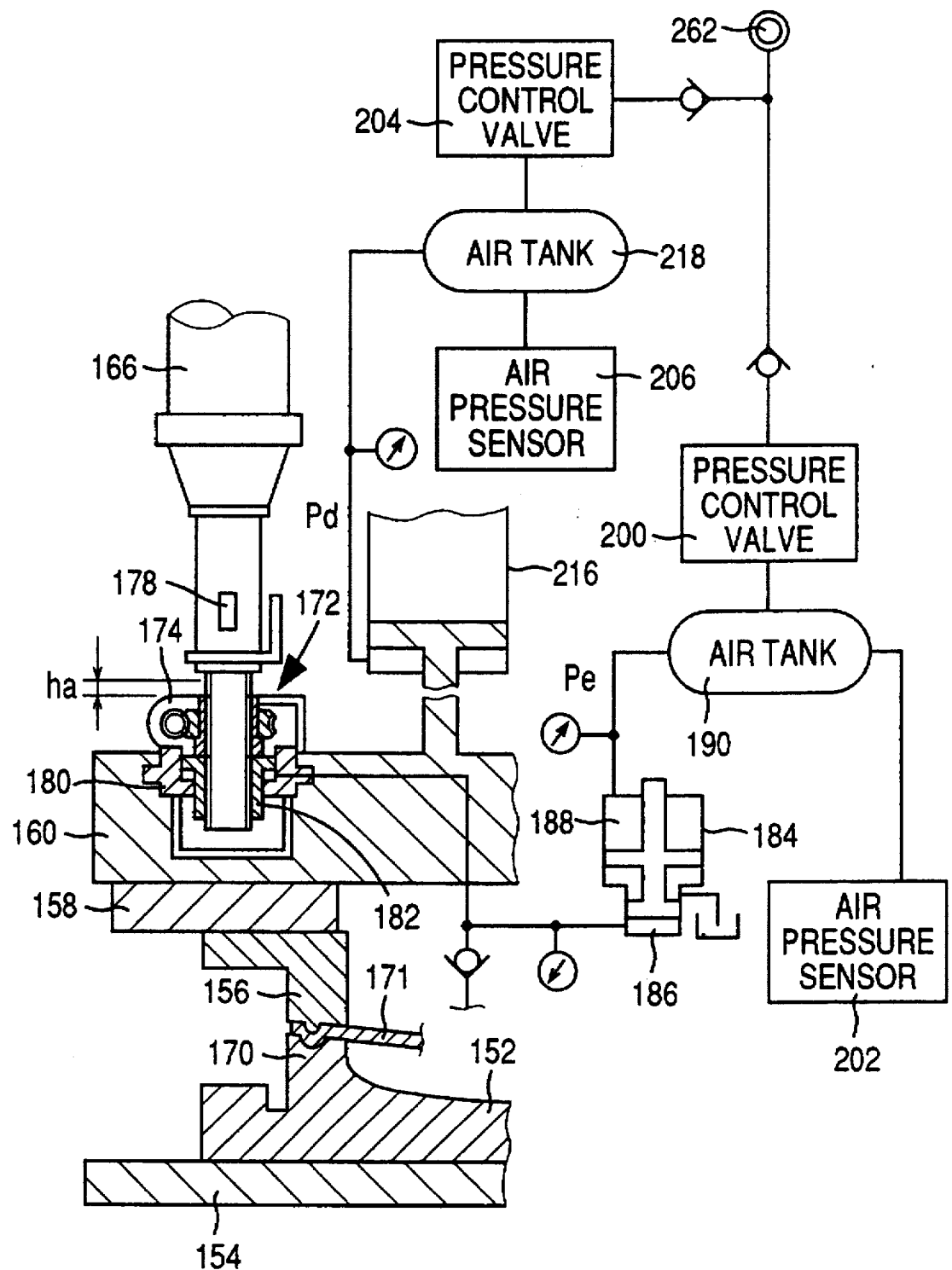
FIG. 12 is a schematic view showing a die-height adjusting mechanism and the related components associated with an outer slide of the press of FIG. 11.

Referring next to FIG. 11, there is shown an example of a double-action press 150 according to a third embodiment of this invention. The press 150 is also adapted to perform a drawing operation on a blank in the form of a metal strip or sheet 171, for an outer panel of a motor vehicle, for instance. The press 150 includes: a bolster 154 on which a lower die 152 is fixed; an outer slide 160 which carries a pressure ring 156 through a blank holder plate 158 secured thereto; and an inner slide 164 to which is fixed an upper die in the form of a punch 162. The outer slide 160 and the inner slide 164 are vertically reciprocated by four outer plungers 166 and four inner plungers 168, respectively. As shown in FIG. 12, the lower die 152 includes a pressure portion 170, which cooperates with the pressure ring 156 to hold a peripheral portion of the blank or sheet 171 therebetween while the sheet 171 is drawn by the punch 162 and the lower die 152. The lower die 152, pressure ring 156 and punch 162 constitute a die set removably installed on the press 150.

The outer plungers 166 and the inner plungers 168 are vertically reciprocated at a controlled timed relation with each other, by a drive mechanism 169 which includes, a drive motor, gears, crankshafts, joint pins and links. As is apparent from FIG. 12, each of the four outer plungers 166 is connected to the outer slide 160, through a die-height adjusting mechanism 172 similar to the mechanism 52 which has been described above with respect to the single-action press 10. The mechanism 172 is operated by a servomotor 174 to adjust a relative distance ha (indicated in FIG. 12). The adjusted relative distance ha is detected by a rotary encoder 176 (FIG. 14) provided on the servomotor 174. The outer slide 160 is lowered with respect to the outer plunger 166 as the relative distance ha increases. Accordingly, the blank-holding force Fs applied to the pressure ring 156 when the outer plunger 166 is at its lower stroke end is changed with the relative distance ha. The die-height adjusting mechanism 172 is provided for each of the four outer plungers 166, so that the relative distances ha associated with all the four plungers 166 can be adjusted. The outer plungers are provided with respective sets of strain gages 178 to detect the local load values Fai ($i=1, 2, 3, 4$) acting thereon. More specifically explained, the local load values Fai can be determined on the basis of the output signals of the strain gages 178 and according to a predetermined relationship between the output signals and the actually measured load values obtained by the load measuring device 100 described above. This relationship is represented by a data map stored in the ROM of a controller 280, which will be described by reference to FIG. 14.

Figure 14:
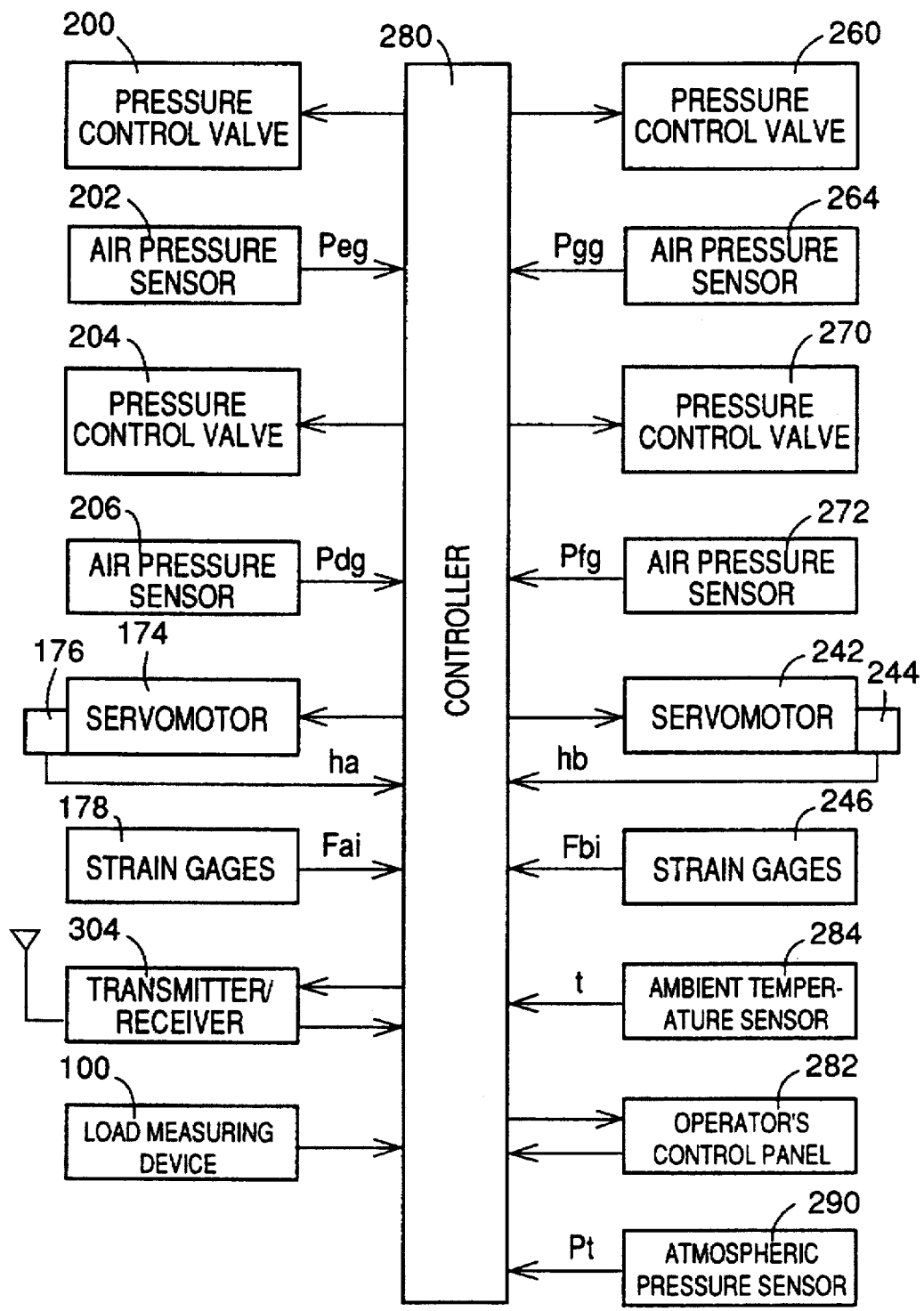
FIG. 14 is a block diagram showing a control system provided for the press of FIG. 11, which is constructed according to a third embodiment of this invention.

Each die-height adjusting mechanism 172 is integrally connected to a piston 182 of a hydraulic cylinder 180. The housing of the hydraulic cylinder 180 is built in the outer slide 160. The pressure chamber of the hydraulic cylinder 180 is filled with a working fluid and communicates with an oil chamber 186 of a hydro-pneumatic cylinder 184. The cylinder 184 also has an air chamber 188 communicating with an air tank 190, which is connected to an air pressure source 262 through a solenoid-operated pressure control valve 200. Air pressure Pe within the air chamber 188 is controlled by the pressure control valve 200, depending upon the blank-holding force Fs to be applied to the pressure ring 156. An air pressure sensor 202 is provided to detect an air pressure (gage pressure) Peg within the air tank 190. The air pressure Pe in the air chamber 188 is obtained by adding the gage pressure Peg to an atmospheric pressure Pt detected by an atmospheric pressure sensor 290 (FIG. 14). The hydraulic cylinder 180, hydro-pneumatic cylinder 184 and air tank 190 are provided for each of the four outer plungers 166 (for the four die-height adjusting mechanisms 172). The air pressures Pe within the air chambers 188 of the four hydro-pneumatic cylinders 184 are adjusted.

The outer slide 160 is connected to four counterbalancing air cylinders 216 attached to a machine frame 196 of the press 150. The pressure chamber of each air cylinder 216 communicates with an air tank 218, which is connected to the air pressure source 262 through a solenoid-operated pressure control valve 204. Air pressure Pd within the air chamber of the air cylinder 216 is controlled by the pressure control valve 204, such that the blank-holding force Fs is not influenced by the weights of the outer slide 160 and the pressure ring 156. An air pressure sensor 206 is provided to detect an air pressure (gage pressure) Pdg within the air tank 218. The air pressure Pd in the air cylinder 216 is obtained by adding the gage pressure Pdg to the atmospheric pressure Pt. The pressure chambers of the four air cylinders 216 are connected to the common air tank 218.

Figure 13:
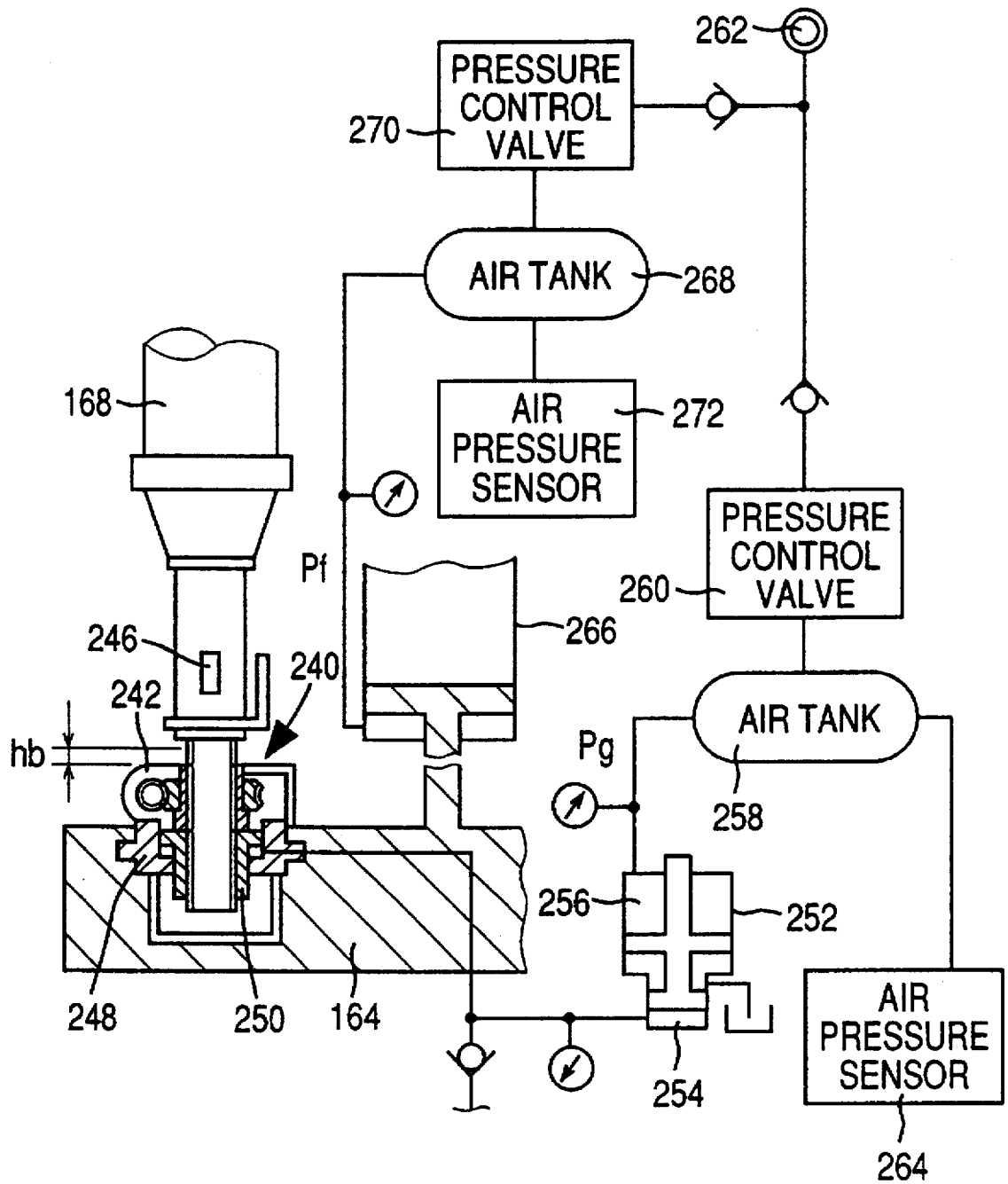
FIG. 13 is a schematic view showing a die-height adjusting mechanism and the related components associated with an inner slide of the press of FIG. 11.

As shown in FIG. 13, each of the four inner plungers 168 is connected to the inner slide 164 through a die-height adjusting mechanism 240 similar to the mechanism 172, so that a relative distance hb indicated in the figure is adjustable by a servomotor 242. The relative distance hb is detected by a rotary encoder 244 (FIG. 14) provided on the servomotor 242. The inner slide 164 is lowered with respect to the inner plunger 168 as the relative distance hb increases. Accordingly, the forming force Fs applied to the blank 171 when the inner plunger 168 is at its lower stroke end is changed with the relative distance hb. The die-height adjusting mechanism 240 is provided for each of the four inner plungers 168, so that the relative distances hb associated with all the four plungers 168 can be adjusted. The inner plungers 168 are provided with respective sets of strain gages 246 to detect the local load values Fbi ($i=1, 2, 3, 4$) acting thereon. Namely, the local load values Fbi can be determined on the basis of the output signals of the strain gages 246 and according to a predetermined relationship between the output signals and the actually measured load values obtained by the load measuring device 100. This relationship is also represented by a data map stored in the controller 280.

Each of the die-height adjusting mechanisms 240 is integrally connected to a piston of an overload-protective hydraulic cylinder 248. The housing of the hydraulic cylinder 248 is built in the inner slide 164. The pressure chamber of the hydraulic cylinder 248 is filled with the working fluid and communicates with an oil chamber 254 of a hydro-pneumatic cylinder 252. This cylinder 252 also has an air chamber 256 communicating with an air tank 258, which is connected to an air pressure source 262 through a solenoid-operated pressure control valve 260. Air pressure Pg within the air chamber 256 and the air tank 258 is controlled by the pressure control valve 260. Air pressure sensor 264 is provided to detect air pressure (gage pressure) Pgg. The air pressure Pg within the air chamber 256 is obtained by adding the gage pressure Pgg to the atmospheric pressure Pt. The air pressure Pg is adjusted depending upon the pressing capacity of the press 150, so that when an overload acts on the hydraulic cylinder 248, the piston of the hydro-pneumatic cylinder 252 is moved toward the air chamber 256 to permit the die-height adjusting mechanism 240 and the inner slide 164 to move toward each other, for protecting the press 150 and the die set (152, 156, 162) against damage due to the overload. The hydraulic cylinder 248, hydro-pneumatic cylinder 252 and air tank 258 are provided for each of the four inner plungers 168 (for each of the four die-height adjusting mechanisms 240), and the air pressure Pg in each of the air cylinders 252 is adjusted as described above.

The inner slide 164 is connected to four counterbalancing air cylinders 266 attached to the machine frame 196. The pressure chamber of each air cylinder 266 communicates with an air tank 268, which in turn is connected to the air pressure source 262 through a solenoid-operated pressure control valve 270. Air pressure Pf within the pressure chamber of the air cylinder 266 and the air tank 268 is adjusted by the pressure control valve 270, so that the forming force Ff is not influenced by the weights of the inner slide 164 and the punch 162. Air pressure sensor 272 is provided to detect air pressure (gage pressure) Pfg. The air pressure Pfg within the air cylinder 266 is obtained by adding the gage pressure Pfg to the atmospheric pressure Pt.

The pressure chambers of the four air cylinders 266 are connected to the common air tank 268.

The press 150 is controlled by the controller 280 shown in FIG. 14. The controller 280 is adapted to receive the output signals of the air pressure sensors 202, 206, 264, 272, rotary encoders 176, 244 and strain gages 178, 246, which represent the air pressures Peg, Pdg, Pgg, Pfg, relative distances Ha, Hb, and local load values Fai, Fbi, respectively. The controller 280 controls the pressure control valves 200, 204, 260, 270 and the servomotors 174, 242. The controller 280 is a microcomputer including a central processing unit (CPU), a random-access memory (RAM), a read-only memory (ROM), and an input-output interface circuit, as well known in the art. The CPU performs data processing operations according to control programs stored in the ROM, while utilizing a temporary data storage function of the RAM. Although FIG. 14 shows only one piece or unit, for the servomotors 174, 242, strain gages 178, 246, pressure control valves 200, 260, and air pressure sensors 202, 264, four pieces or units are in fact provided for each of these elements, and the controller 280 controls all of these four pieces or units.

Figure 15:
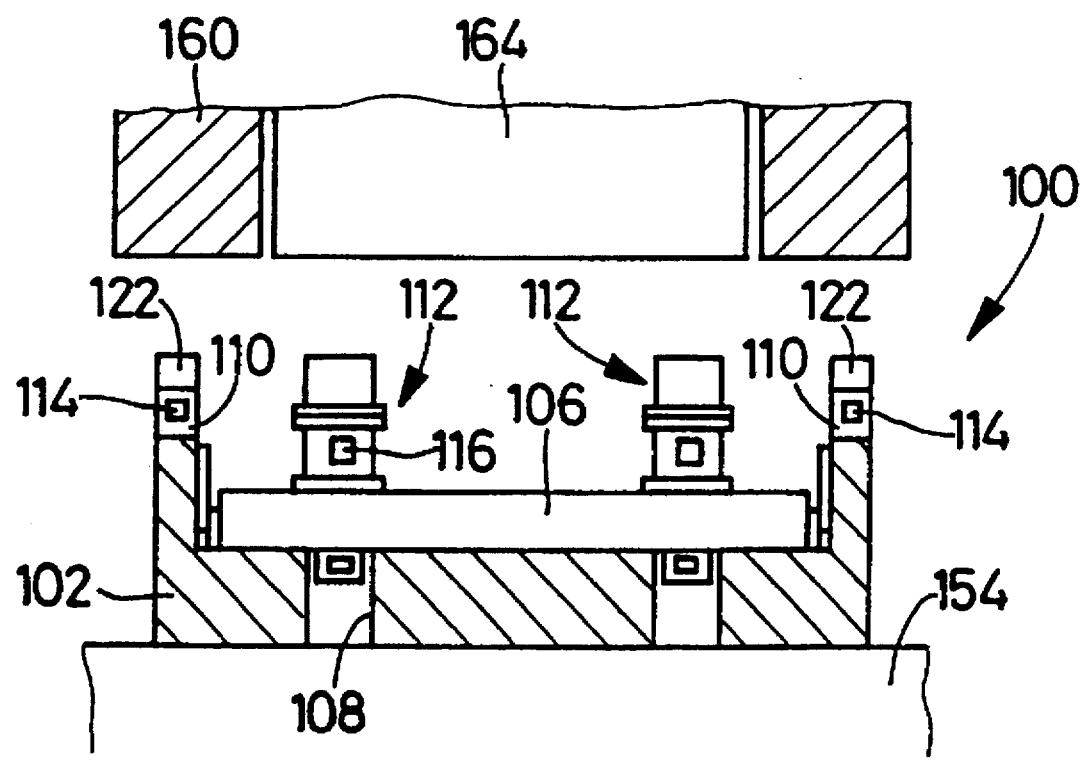
FIG. 15 is an elevational view showing the load measuring device of FIG. 4 as installed on the press of FIG. 11.

To the controller 280, there are also connected: an operator's control panel 282 having various displays, switches and other controls for displaying various parameters such as the air pressure values, and for setting or changing the parameters or entering appropriate data; a transmitter/receiver 304 for receiving the die-set information from an ID card 306 (FIG. 11), which may be attached to the lower die 152, for example; an ambient temperature sensor 284 for detecting the ambient temperature "t" near the press 150; and the atmospheric pressure sensor 290 for detecting the atmospheric pressure Pt, as indicated above. The load measuring device 100 is connected to the controller 280 when needed. The ambient temperature sensor 284 and atmospheric pressure sensor 290 are considered to serve as means for detecting physical values indicative of a part of the operating environment of the press 150. When the load measuring device 100 is used, it is installed on the press 150, in place of the lower die 152, pressure ring 156 and punch 162, such that spacer blocks 122 are bolted to the posts 110, as shown in FIG. 15. The load acting on the outer slide 160, that is, the blank-holding force Fs is detected by the strain gages 114, while the load acting on the inner slide 164, that is, the forming force Ff is detected by the strain gages 116.

Figure 16:
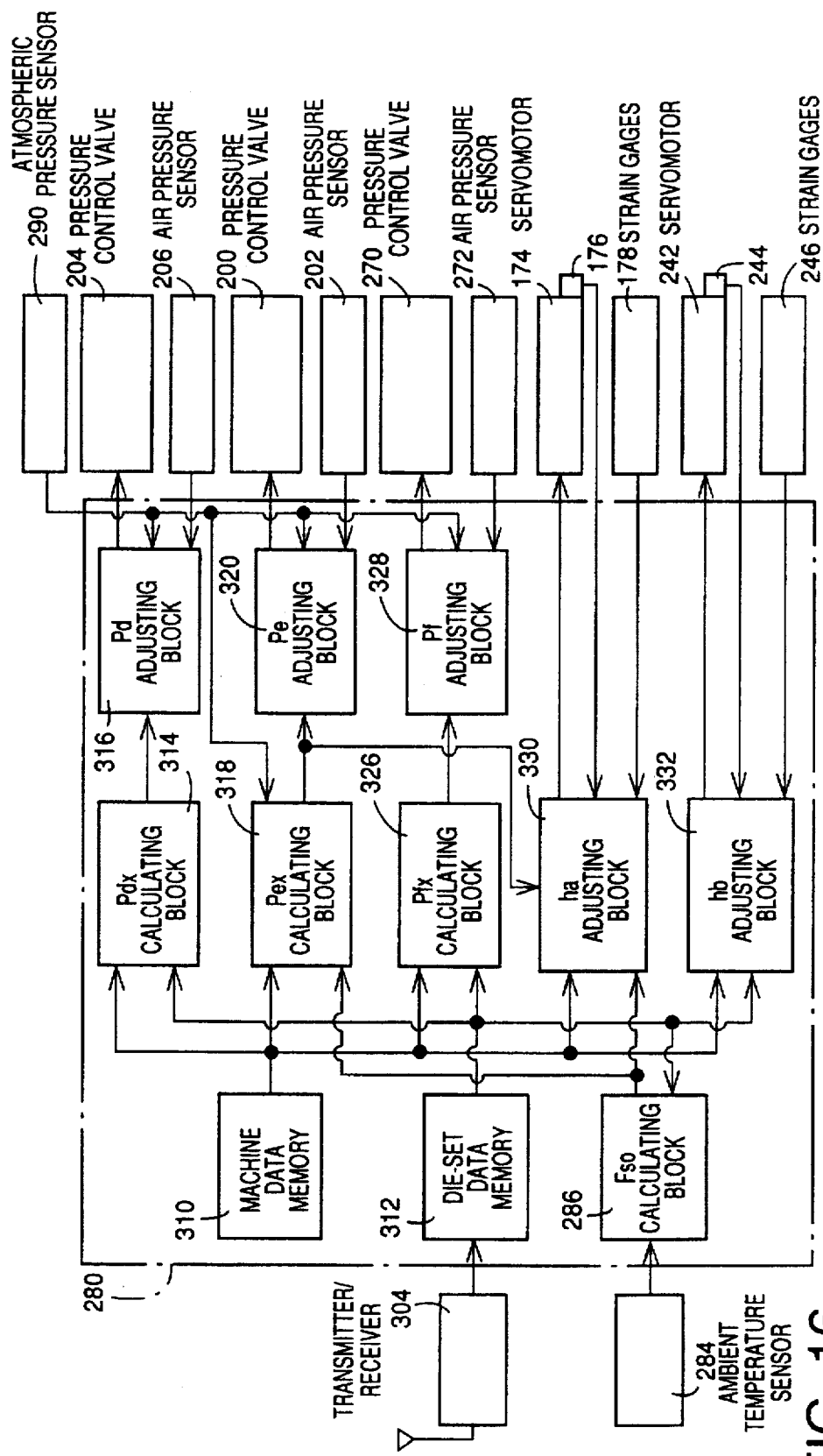
FIG. 16 is a block diagram for explaining the functions of a controller of the control system of FIG. 14.

The controller 280 is adapted to perform various functions as indicated in the block diagram of FIG. 16, according to control programs stored in the ROM. To this end, the controller 280 incorporates a machine data memory 310 storing machine information representative of the specifications of the press 150, and a die-set data memory 312 for storing the die-set information received from the ID card 306 through the transmitter/receiver 304. The machine information and the die-set information are necessary for determining the air pressures Pd, Pe, Pf and relative distances ha, hb for permitting the press 150 to perform a drawing operation under the optimum operating conditions. The machine information and die-set information include the following data:

[Machine Information]

(a) Travel Y of the piston of the air cylinder 188
(b) Pressure-receiving area Ax of the hydraulic cylinder 180
(c) Pressure-receiving area Ay of the oil chamber 186 of the hydro-pneumatic cylinder 184
(d) Pressure-receiving area Az of the air chamber 188 of the hydro-pneumatic cylinder 184
(e) Volume Ve of the air tank 190
(f) Total weight Wos of the outer slide 160 and the blank holder plate 158
(g) Weight Wis of the inner slide 164
(h) Total pressure-receiving area Ad of the four air cylinders 216
(i) Total pressure-receiving area Af of the four air cylinders 266
(j) Provisional ha-Fsi relationship (Fsi=c·ha+d)
(k) Provisional hb-Ffi relationship (Ffi=e·hb)

[Die-Set Information]

(1) Weight Wr of the pressure ring 156
(2) Weight Wq of the punch 162
(3) Optimum local forming forces
(4) Optimum tension $T_o$
(5) Standard sliding resistance $\mu_o$
(6) Standard ambient temperature $t_o$
(7) Equation for calculating a compensating value $\Delta\mu$ It is noted that the die-set information also include: data indicative of the specific die set used, which differs depending upon a model of a car for which a product produced by the press 150 is used; a type of the press on which the die set is used; and a process in which the product is produced.

The travel Y, pressure-receiving areas Ax, Ay, Ax and volume Ve are obtained for each of the four outer plungers 166 connected to the outer slide 160. The travel Y is a travel distance of the piston of the cylinder 184 from its lower stroke end toward the air chamber 188. The travel Y is determined by an experiment, for example, so as to apply the optimum blank-holding force to the pressure ring based on the air pressure Pe. The pressure-receiving areas Ax, Ay and Az are effective areas which are determined according to the operating characteristics of the cylinders 180, 184 and which reflect influences of the sliding resistance and the fluid leakage. The volume Ve includes the volume of the air chamber 188 of the cylinder 184, and can be obtained on the basis of a change in the pressure Pe in relation to the travel distance of the piston of the cylinder 184.

The total weight Wos of the outer slide 160 and the blank holder plate 158 is the actual total weight minus the sliding resistance of the outer slide 160. Like the weight Ws of the slide plate 20 in the first embodiment, the total weight value Wos can be obtained from a Fa-Pd relationship, which is obtained from the total load Fa measured upon lowering of the outer slide 160 while the air pressure Pd in the cylinder 216 is changed. The total load Fa is a sum of the four local load values Fai detected by the strain gages 178. The weight Wos may be replaced by the actual total weight of the outer slide 160 and the blank holder plate 158, and the sliding resistance value of the outer slide 160. The weight Wis of the inner slide 164 can be obtained from the Fb-Pf relationship, in the same manner as described above with respect to the weight Wos.

The total pressure-receiving area Ad of the four air cylinders 216 reflects the influences of the air leakage of the individual cylinders 216. A gradient of the line representing the Fa-Pd relationship corresponds to the total pressure-receiving area Ad. The total pressure-receiving area Af of the four air cylinders 266 reflects the influences of the air leakage of the individual cylinders 266. A gradient of the line representing the Fa-Pf relationship corresponds to the total pressure-receiving area Af.

Figure 17:
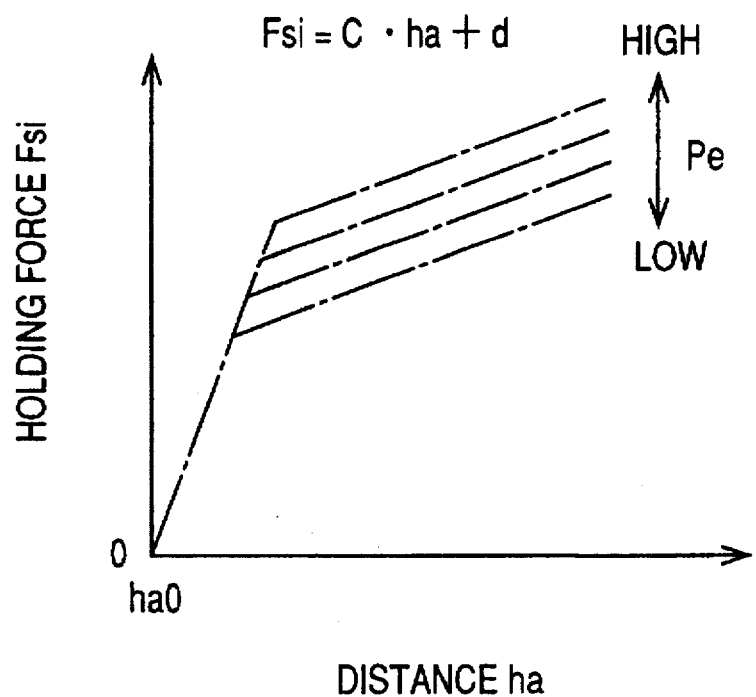
FIG. 17 is a graph indicating a relationship between the blank-holding force Fsi and the relative distance h of the press of FIG. 11.

The ha-Fsi relationship (i=1, 2, 3, 4) is a relationship (Fsi=c·ha+d) between the relative distance ha and the local blank-holding force Fsi when the appropriate outer plunger 166 has reached the lower stroke end. This relationship is obtained from the local blank-holding force value Fsi detected by the strain gages 178 (when the plunger 160 has reached the lower stroke end), with different values of the relative distance ha. The local blank-holding force value Fsi reflects the rigidity of the press 150. The detection of the local blank-holding force values Fsi corresponding to the four outer plungers 166 is effected after the air pressures Pd of the air cylinders 216 are adjusted so that the lifting force produced by the cylinders 216 counterbalances the total weight of the outer slide 160 and the blank holder plate 158. Since each local blank-holding force value Fsi changes with the air pressure Pe, the Fsi-ha relationship is set in relation to the air pressure, as indicated in the graph of FIG. 17, to obtain the provisional ha-Fsi relationship, the maximum value ha0 of the relative distance ha when the local blank-holding force value Fsi is zero is used as a reference. The provisional ha-Fsi relationship is obtained for each of the four outer plungers 166 (four die-height adjusting mechanisms 172). The overall blank-holding force Fs is a sum of the four local load values Fsi of the individual plungers 166. The four posts 110 are substantially aligned with the respective outer plungers 166. The ha-Fsi relationships may be obtained by using the strain gages 178 attached to the outer plungers 166.

The provisional hb-Ffi relationship (i=1, 2, 3, 4) is a relationship (Ffi=e·h) between the relative distance hb and the local forming force Ffi when the inner plunger 168 has reached the lower stroke end. This relationship is obtained in the same manner as the relationship h-Ffi (Ffi=a·h) in the first embodiment. That is, the local forming force values Ffi corresponding to the four inner plungers 168 are detected by the strain gages 246 when the plungers 168 have reached the lower stroke ends, with different values of the relative distances hb. These local forming force values Ffi reflect the rigidity of the press 150. The detection of these force values Ffi is effected after the air pressures Pf of the air cylinders 266 are adjusted so that the lifting force produced by the cylinders 266 counterbalance the weight of the inner slide 164. The provisional hb-Ffi relationship is obtained for each of the four inner plungers 168 (four die-height adjusting mechanisms 240). The total forming force Ff is a sum of the local forming force values Ffi of the individual plungers 168. The four sensing elements 112 are substantially aligned with the respective four inner plungers 168. The provisional hb-Ffi relationships may be obtained by using the strain gages 246 attached to the inner plungers 168.

The individual items of the die-set information received from the ID card 306 and stored in the die-set data memory 312 will be described.

The weight Wr of the pressure ring 156 and the weight Wq of the punch 162 are the values actually measured of the ring 156 and punch 162 as manufactured. The local forming force values Ffoi (i=1, 2, 3, 4) are obtained by a try-and-error procedure, in which the optimum local forming forces Ffoi suitable for performing a desired drawing operation are determined by test operations on a trial or test press on which the pressure ring 156, lower die 152 and punch 162 are installed. The optimum local forming force values Ffoi do not include components due to the influences by the weights of the die set 156, 152, 162 and the sliding resistance of the associated components. In the case where the trial press is similar to that shown in FIG. 11, for example, the air pressure Pf is adjusted so that the outer slide 164 is lowered by the inner plungers 168 while the total weight of the inner slide 164 and the punch 162 is counterbalanced by the lifting force produced by the air cylinders 266. The local load values Fbi are detected by the strain gages 246 during a trial drawing operation effected with the thus adjusted air pressure Pf. The optimum local forming force values Ffoi are obtained on the basis of the detected local load values Fbi. Thus, the optimum local forming force values Ffoi corresponding to the four inner plungers 168 are obtained. The optimum total forming force Ffo is a sum of the four local forming force values Ffoi.

When the optimum local forming forces Ffoi are determined by test pressing operations with different relative distances "hb", the air pressure Pe of the cylinder 184 and the relative distance ha are adjusted by entering appropriate data through the operator's control panel 282. Namely, the air pressure Pe is adjusted according to Pex calculating block 318 and Pe adjusting block 320 indicated in FIG. 16, so as to establish the optimum blank-holding force Fso which suits the specific operating environment of the press 150, more specifically, the specific room or ambient temperature "t". That is, the air pressure Pe should be adjusted so that the drawing operation is performed with the optimum blank-holding force Fso which is calculated according to Fso calculating block 286 of FIG. 16. Further, the air pressure Pd of the counterbalancing air cylinders 216 is adjusted according to P0,P1 calculating block 138 and Pdx calculating block 314 and Pd adjusting block 316 of FIG. 16, so that the total weight of the outer slide 160, blank holder plate 158 and pressure ring 156 is counterbalanced by the lifting force produced by the air cylinders 216. The air pressure Pf of the air cylinders 266 can also be adjusted according to Pfx calculating block 326 and Pf adjusting block 328 of FIG. 16.

The optimum tension $T_0$ and standard sliding resistance $\mu_0$ of the metal strip 171, the standard ambient temperature $t_0$ of the press 150, and the equation to calculate the compensating value $\Delta\mu$ are used to calculate the optimum blank-holding force Fso according to the above-indicated equation (2), so that the optimum blank-holding force Fso is changed depending upon the ambient temperature "t". The optimum and standard values $T_0$, $\mu_0$, $t_0$ and the equation for the value $\Delta\mu$ are determined by experiment or simulation or by suitable formulas, as described above with respect to the first embodiment.

Referring back to the block diagram of FIG. 16, there will be described the various functions of the controller 280, which are indicated by the respective functional blocks in the block diagram, which correspond to respective means for performing the respective functions.

The Pso calculating block 286 is for calculating the optimum blank-holding force Fso for performing the drawing operation with the optimum tension $T_0$ of the metal sheet 171, on the basis of the optimum tension $T_0$, standard sliding resistance $\mu_0$, standard ambient temperature $t_0$ and the equation for calculating the compensating value $\Delta\mu$, which are stored in the die-set data memory 312, and on the basis of the actual ambient temperature "t" detected by the ambient temperature sensor 284, in the same manner as described above.

In the present embodiment, too, the optimum blank-holding force Fso is one of optimum operating conditions of the press 150, and the Fso calculating block 286 corresponds to condition calculating means for calculating the optimum blank-holding force Fso depending upon the actual ambient temperature "t", while the die-set data memory 312 storing the optimum tension $T_0$ and standard sliding resistance $\mu_0$ and ambient temperature $t_0$ and the equation for the value $\Delta\mu$ correspond to relationship memory means for storing data representative of a relationship between the optimum operating condition (optimum blank-holding force Fso) and physical values (ambient temperature "t" and sliding resistance μ) which define the operating environment of the press 10). The blank-holding force Fso can be obtained otherwise, depending upon the detected ambient temperature "t", as described above with respect to the first embodiment. While the present embodiment is adapted such that the total blank-holding force Fso is calculated, the four optimum local blank-holding force values Fsoi corresponding to the four die-height adjusting mechanisms 172 may be calculated independently of each other. In this case, the optimum local tension values $T_oi$ corresponding to the mechanisms 172 are stored in the ID card 306 and transmitted to the die-set data memory 312.

The Pdx calculating block 314 is for calculating an optimum air pressure Pdx on the basis of the machine information stored in the machine data memory 310 and the die-set information stored in the die-set data memory 312, and according to the following equation (9), so that the total weight of the outer slide 160, blank holder plate 158 and pressure ring 156 is counterbalanced by the lifting force produced by the counterbalancing air cylinders 216.

$$Pdx=(Wr+Wos)/Ad \qquad (9)$$

The Pd adjusting block 316 is for controlling the solenoid-operated pressure control valve 204 on the basis of the air pressure Pdg within the air tank 218 which is detected by the air pressure sensor 206 while the press 150 is at rest, and the atmospheric pressure Pt detected by the atmospheric pressure sensor 290. Namely, the pressure control valve 204 is controlled so that the sum (Pdg+Pt) of the detected air pressure Pdg and atmospheric pressure Pt is equal to the optimum air pressure Pdx calculated according to the Pdx calculating block 314.

With the air pressure Pd thus adjusted, the optimum blank-holding force Fso calculated according to a Fso calculating block 286 depending upon the ambient temperature "t" is applied to the pressure ring 156 and the blank 171, whereby the blank 171 can be drawn into the desired product having a high quality, irrespective of a change in the ambient temperature "t".

It will be understood that the pressure control valve 204 constitutes condition adjusting means for adjusting the blank-holding force as one of the operating conditions of the press 150. It will also be understood that adjusting the blank-holding force Fs by adjusting the air pressure Pd to obtain the optimum blank-holding force Fso depending upon the ambient temperature "t" corresponds to a step of adjusting an operating condition of the press 150, and that the ambient temperature "t" is a physical value indicative of a part of the operating environment of the press 150, while the air pressure Pd is one of the operating conditions of the press. The air pressure Pdx may be calculated, with suitable compensation for a change in the volume of the pressure chamber of the four air cylinders 216 due to a downward movement of the outer slide 160. In this respect, however, since the capacity of the air tank 218 is sufficiently large, the amount of change in the air pressure Pd due to the change in the volume of the pressure chamber of the cylinders 216 is so small and negligible.

The Pex calculating block 318 is for calculating an optimum air pressure Pex for producing the optimum blank-holding force Fso (calculated according to the Pso calculating block 286), according to the following equation (10) and on the basis of the machine information.

$$Fso/4=(Ax \cdot Az/Ay)\{(Pex+Pt)[Ve/(Ve-Az \cdot Y)-Pt]\} \qquad (10)$$

The Pe adjusting block 320 is for controlling the solenoid-operated pressure control valve 200 on the basis of the air pressure Peg within the air tank 190 which is detected by the air pressure sensor 202, and the atmospheric pressure Pt detected by the atmospheric pressure sensor 290. Namely, the pressure control valve 200 is controlled so that the sum (Peg+Pt) of the detected air pressure Peg and atmospheric pressure Pt is equal to the optimum air pressure Pex calculated according to the Pex calculating block 318. The adjustment of the air pressure Pe is effected for each of the four air tanks 190.

With the air pressure Pe thus adjusted, the optimum blank-holding force Fso calculated according to the Fso calculating block 286 depending upon the ambient temperature "t" is applied to the pressure ring 156 and the blank 171, irrespective of variations in the pressure-receiving areas of the various cylinders of the press 150. Since the air pressures Pe are adjusted to the optimum levels Pex depending upon the atmospheric pressure Pt, the air pressure Pe is held at the optimum level Pex to assure the optimum blank-holding force Fso, irrespective of a change in the atmospheric pressure Pt. It will be understood that adjusting the air pressure Pe depending upon the atmospheric pressure Pt corresponds to a step of adjusting an operating condition of the press 150, and that the atmospheric pressure Pt is a physical value indicative of a part of the press operating environment while the air pressure Pe is one of the operating conditions of the press.

A Pfx calculating block 326 is for calculating an optimum air pressure Pfx on the basis of the machine information and the die-set information, and according to the following equation (11), so that the total weight of the inner slide 164 and punch 162 is counterbalanced by the lifting force produced by the counterbalancing air cylinders 266.

$$Pfx=(Wq+Wis)/Af \qquad (11)$$

The Pf adjusting block 328 is for controlling the solenoid-operated pressure control valve 270 on the basis of the air pressure Pfg within the air tank 268 which is detected by the air pressure sensor 272, and the atmospheric pressure Pt detected by the atmospheric pressure sensor 290. Namely, the pressure control valve 204 is controlled so that the sum (Pdg+Pt) of the detected air pressure Pfg and atmospheric pressure Pt is equal to the optimum air pressure Pfx calculated according to the Pdx calculating block 326.

With the air pressure Pf thus adjusted, the drawing operation is effected with the optimum local forming forces Ffoi as specified by the die-set information, without an influence of the eights of the inner slide 164 and punch 162. Further, since the air pressure Pf is adjusted to the optimum level Pfx depending upon the atmospheric pressure Pt, the air pressure Pf is held at the optimum level Pfx to assure the optimum blank-holding force Fso and the desired high quality of the products, irrespective of a change in the atmospheric pressure Pt. It will be understood that adjusting the air pressure Pf depending upon the atmospheric pressure Pt corresponds to a step of adjusting an operating condition of the press 150, and that the atmospheric pressure Pt is a physical value indicative of a part of the press operating environment while the air pressure Pf is one of the operating conditions of the press. The optimum air pressure Pfx may be calculated, with suitable compensation for a change in the volume of the pressure chamber of the four air cylinders 266 due to a downward movement of the inner slide 164. In this respect, however, it is noted that since the capacity of the air tank 268 is sufficiently large, the amount of change in the air pressure Pf due to the change in the volume of the pressure chamber of the cylinders 268 is so small and negligible.

Figure 18:
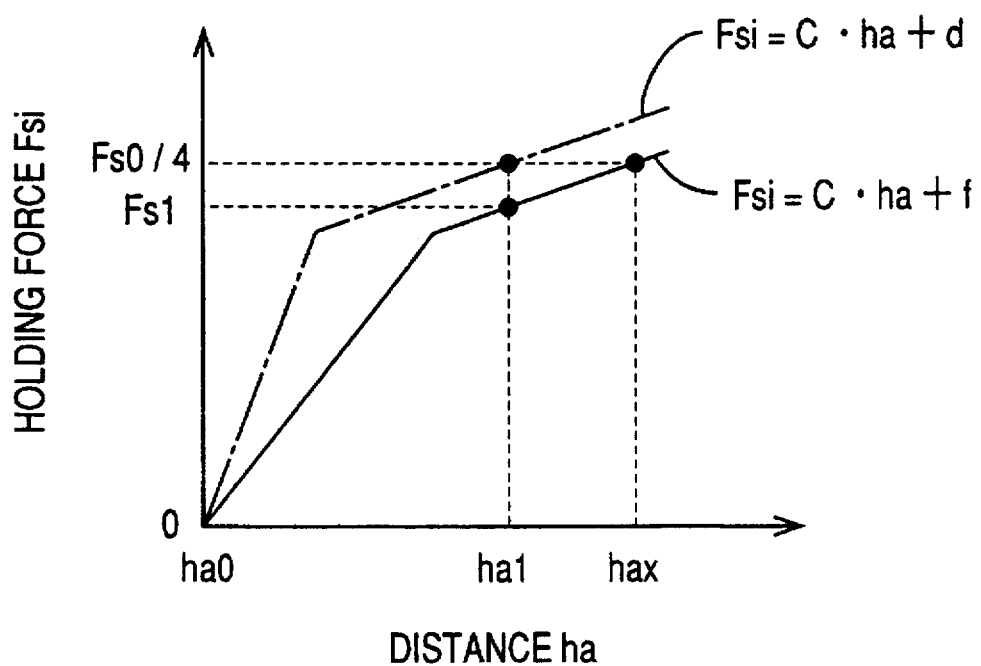
FIG. 18 is a graph for explaining a method of obtaining an optimum relative distance hax for obtaining optimum blank-holding force Fso/4 from the relationship of FIG. 17.

An ha adjusting block 330 is for adjusting the relative distances ha associated with the four die-height adjusting mechanisms 172, independently of each other, so as to provide the optimum blank-holding force Fso (calculated according to the Fso calculating block 286), on the basis of the machine information. Initially, a reference value $ha_0$ which is a maximum value of the relative distance ha when the local forming force Fsi is zero is determined on the basis of the local load value Fai detected by the strain gages 178. Then, the provisional ha-Fsi relationship (Fsi=c·ha+d) (as shown in the graph of FIG. 17) which corresponds to the optimum air pressure Pex calculated according to the Pex calculating block 318 is selected and read out from the machine data memory 310. On the basis of the selected provisional ha-Fsi relationship, a relative distance ha1 for obtaining the blank-holding force Fso/4 is obtained as indicated in the graph of FIG. 18, and the relative distance ha is adjusted to the obtained value ha1, with respect to the reference value ha0, by operating the servomotor 174. In this condition, a test operation is conducted on the press 150, and the blank-holding force Fs1 is measured on the basis of the output signals of the strain gages 178. Since the predetermined provisional ha-Fsi relationship is based on higher rigidity of the die set than the rigidity of the actually used die set 152, 156, 162, the blank-holding force Fs1 is generally smaller than the blank-holding force Fso/4. Based on a difference between these values Fs1 and Fso/4, a final ha-Fsi relationship (Fsi=c·ha+f) is obtained as also indicated in FIG. 18. Then, the optimum relative distance hax for obtaining the blank-holding force Fso/4 is determined by the obtained final ha-Fsi relationship. The servomotor 174 is operated to adjust the distance ha to the value hax. The determination of the relative distance hax and the adjustment of the distance ha to the value hax are effected for each of the four die-height adjusting mechanisms 172, in the same manner as described above. With the relative distances ha thus adjusted, the drawing operation on the press 150 can be effected with the optimum blank-holding force Fso calculated according to the Fso calculating block 286, irrespective of a variation in the rigidity of the press from one machine to another.

As described above, the press 150 equipped with the control system constructed according to the present third embodiment is capable of automatically calculating the optimum air pressure Pe according to the Pex calculating and Pe adjusting blocks 318, 320, and the optimum relative distance ha according to the ha adjusting block 330, depending upon the ambient temperature "t", so as to permit a pressing or drawing operation with the optimum blank-holding force Fso. It will be understood that the pressure control valve 200 to adjust the air pressure Pe and the servomotor 174 to adjust the relative distance ha function as means for adjusting the operating conditions of the press 150, and that adjusting the air pressure Pe and relative distance ha to obtain the optimum blank-holding force Fso depending upon the ambient temperature "t" corresponds to a step of adjusting the pressing operating conditions. It is also noted that the ambient temperature "t" is a physical value indicative of a part of the press operating environment, while the blank-holding force Fso is one of the press operating conditions. In this embodiment, too, the air pressure Pe and the relative distance ha may be manually adjusted by controlling the pressure control valve 200 and servomotor 174, by using suitable switches on the operator's control panel 282, and displays or indicators which are also provided on the control panel 282 to display the optimum blank-holding force Fso calculated according to the Fso calculating block 286, the local load values Fai or local blank-holding force values Fsi detected by the strain gages 178, and the total blank-holding force Fs.

A hb adjusting block 332 is for adjusting the relative distances hb corresponding to the four die-height adjusting mechanisms 240, independently of each other, on the basis of the machine information and die-set information, so that the pressing operation is effected with the optimum local forming force values Ffoi as specified by the die-set information. The hb adjusting block 332 has the same function as the h adjusting block 146 in the first embodiment.

The controller 280 is also adapted to regulate the air pressure Pg in the air chamber 256 of the hydro-pneumatic cylinders 252, so that the local load values Fbi detected by the four sets of strain gages 246 corresponding to the four plungers 168 do not exceed predetermined upper limit values Foli (i=1, 2, 3, 4). That is, The actual air pressure Pg is obtained as a sum of the air pressure Pgg detected by the air sensor 264 and the atmospheric pressure Pt detected by the atmospheric pressure sensor 290. The solenoid-operated pressure control valve 260 is controlled to adjust the air pressure Pg to a predetermined optimum value Pgx. With the air pressure Pg thus adjusted, the press 150 and the die set 152, 156, 162 can be protected against damage due to an overload, irrespective of a variation in the atmospheric pressure Pt. This adjustment of the air pressure Pg depending upon the atmospheric pressure Pt corresponds to a step of adjusting the press operating condition, and the atmospheric pressure Pt is a physical value indicative of a part of the press operating environment while the air pressure Pg is one of the press operating conditions.

In the press 150 constructed as described above, the air pressures Pd, Pe, Pf, and the relative distances ha, hb are automatically adjusted so as to permit a pressing or drawing operation with the optimum blank-holding force Fso and optimum local forming force values Ffoi, irrespective of variations or differences in the rigidity and sliding resistances of the press from one machine to another. The automatic adjustment of the optimum operating parameters is effected by the controller 280, according to the machine information stored in the machine data memory 310 and the die-set information which are transmitted from the ID card 306 through the transmitter/receiver 304 and stored in the die-set data memory 312. Thus, the control system for the press 150 eliminates or minimizes the conventional cumbersome manual adjustments of the operating conditions of the press by the trial-and-error procedure, and reduces the operator's work load during a setup procedure of the press, while assuring high stability in the quality of the products produced by the drawing operation on the blanks 171. It is noted that the air pressures Pd, Pe, Pf, and relative distances ha, hb need not be adjusted strictly to the optimum values Pdx, Pex, Pfx and hax, hbx, respectively, but may be adjusted to fall within respective permissible optimum ranges that assure a required quality of the products.

The control system for the press 150 is further adapted to determine the optimum blank-holding force Fso depending upon the ambient or room temperature "t", and adjust the air pressure Pe and the relative distance ha to effect a drawing operation with the determined optimum blank-holding force Fso that does not cause creasing, cracking or deformation of the products. This arrangement permits the blanks 171 to have the optimum tension $T_0$ for assuring the manufacture of the products with consistently high quality, even under the varying ambient temperature "t" which causes a change in the sliding resistance μ of the blanks 171 relative to the die 152 and pressure ring 156, due to a change in the amount of oil left on the blanks 171. Further, since the pressure control valve 200 is automatically controlled to adjust the air pressure Pe so as to establish the optimum blank-holding force Fso, the operator's work load is considerably reduced, and the pressing operation on the press 150 can be fully automated.

In the present third embodiment, the atmospheric pressure Pt is detected by the atmospheric pressure sensor 290, so that the air pressures Pe, Pd, Pg, Pf are obtained by adding the detected atmospheric pressure Pt to the air pressures (gage pressures) Peg, Pdg, Pgg, Pfg detected by the air pressure sensors 202, 206, 264, 272, respectively. The thus obtained air pressures Pe, Pd, Pg, Pf are adjusted to the optimum levels Pex, Pdx, Pgx, Pfx so that the pressing operation is performed with the optimum air pressures Pex, Pdx, Pgx, Pfx, without an influence by a change in the atmospheric pressure Pt. Namely, the pressing operation can be performed with the optimum blank-holding force Fso and the optimum local forming forces Ffoi, without a risk of damaging of the press 150 and die set 152, 156, 162 due to an overload, irrespective of a variation in the atmospheric pressure Pt, whereby the blanks 171 can be drawn to produce the desired products with consistently high quality. These air pressures Pe, Pd, Pg, Pf are also automatically adjusted, resulting in significant reduction of the operator's work load and making it possible to fully automate the drawing operation.

Figure 19:
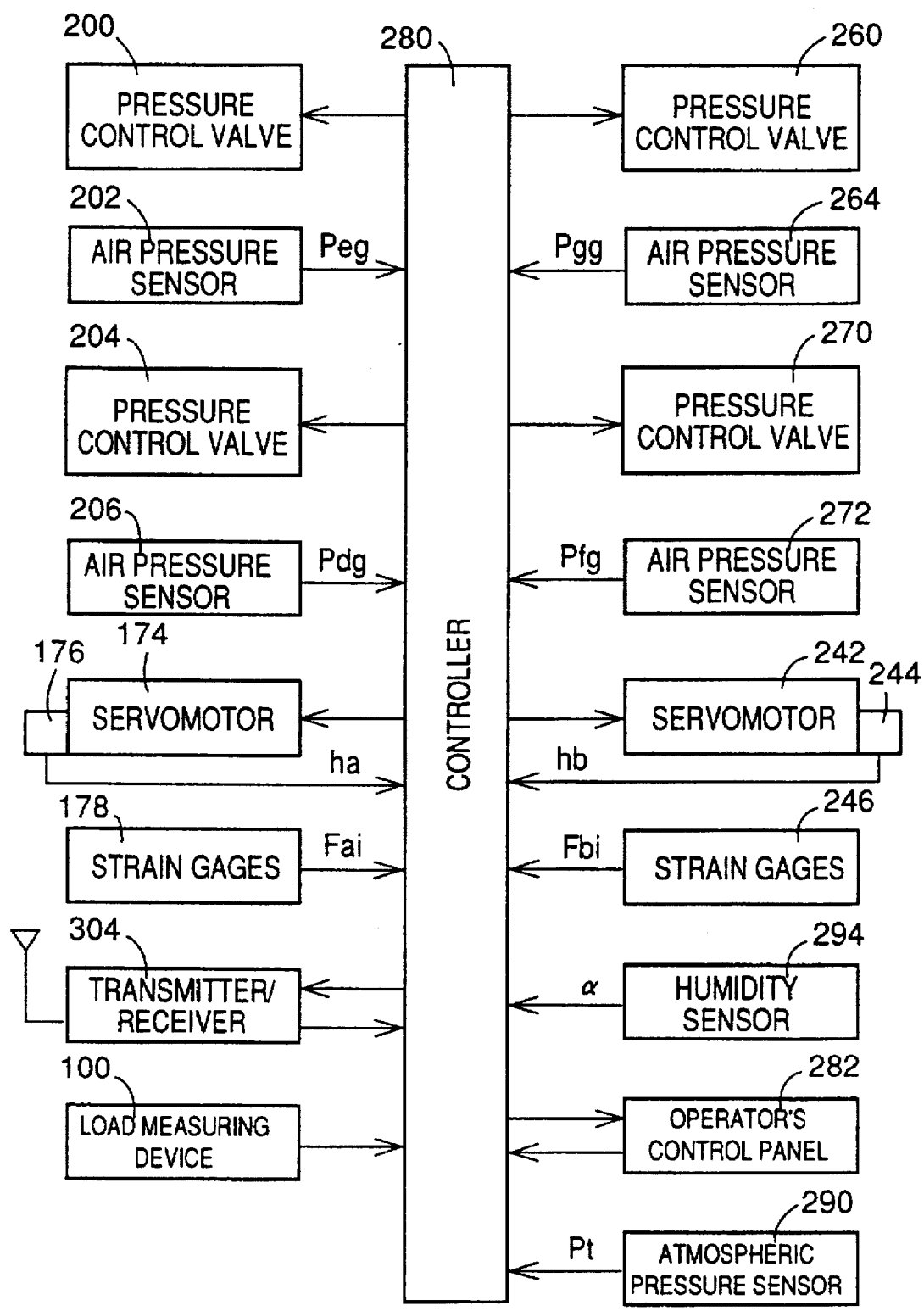
FIG. 19 is a block diagram corresponding to that of FIG. 14, showing a control system for the press of FIG. 11, which is constructed according to a fourth embodiment of the invention.

In the third embodiment of FIGS. 11–16 described above, the optimum blank-holding force Fso for the optimum tension $T_0$ of the blank 49 is obtained based on the detected ambient temperature "t", so that the pressing operation is always performed with the optimum blank-holding force Fso, irrespective of a variation in the sliding resistance μ of the blanks 49 due to the varying ambient temperature "t". As described above, the sliding resistance μ also varies with a change in the humidity of the ambient atmosphere. Therefore, the optimum blank-holding force Fso on the press 150 may be determined depending upon the ambient humidity, detected as a physical value indicative of a part of the press operating environment, as in the second embodiment of FIGS. 9 and 10. Described in detail, the ambient temperature sensor 284 is replaced by a hygrometer or humidity sensor 294 as indicated in the block diagrams of FIGS. 19 and 20. The humidity sensor 294 detects the ambient humidity α near the press 150. Thus, this sensor 294 serves as means for detecting the ambient humidity α as a physical value indicative of a part of the press operating environment. In this fourth embodiment of FIGS. 19 and 20, the die-set data memory 312 stores, as the die-set information, a standard ambient humidity $α_0$ in place of the standard ambient temperature $_0$ and the above equation (8) for calculating the compensating value Δμ. The compensating value Δμ is calculated according to the above equation (8), on the basis of a difference Δα between the actual ambient humidity α and the standard ambient humidity $α_0$. The optimum blank-holding force Fso is calculated according to the above equation (2). Further, the blank-holding force Fso can be obtained otherwise, depending upon the detected ambient humidity α. For instance, the optimum blank-holding force Fso may be obtained on the basis of both the ambient humidity α and the ambient temperature "t" detected by the humidity and temperature sensors 294, 284.

Figure 21:
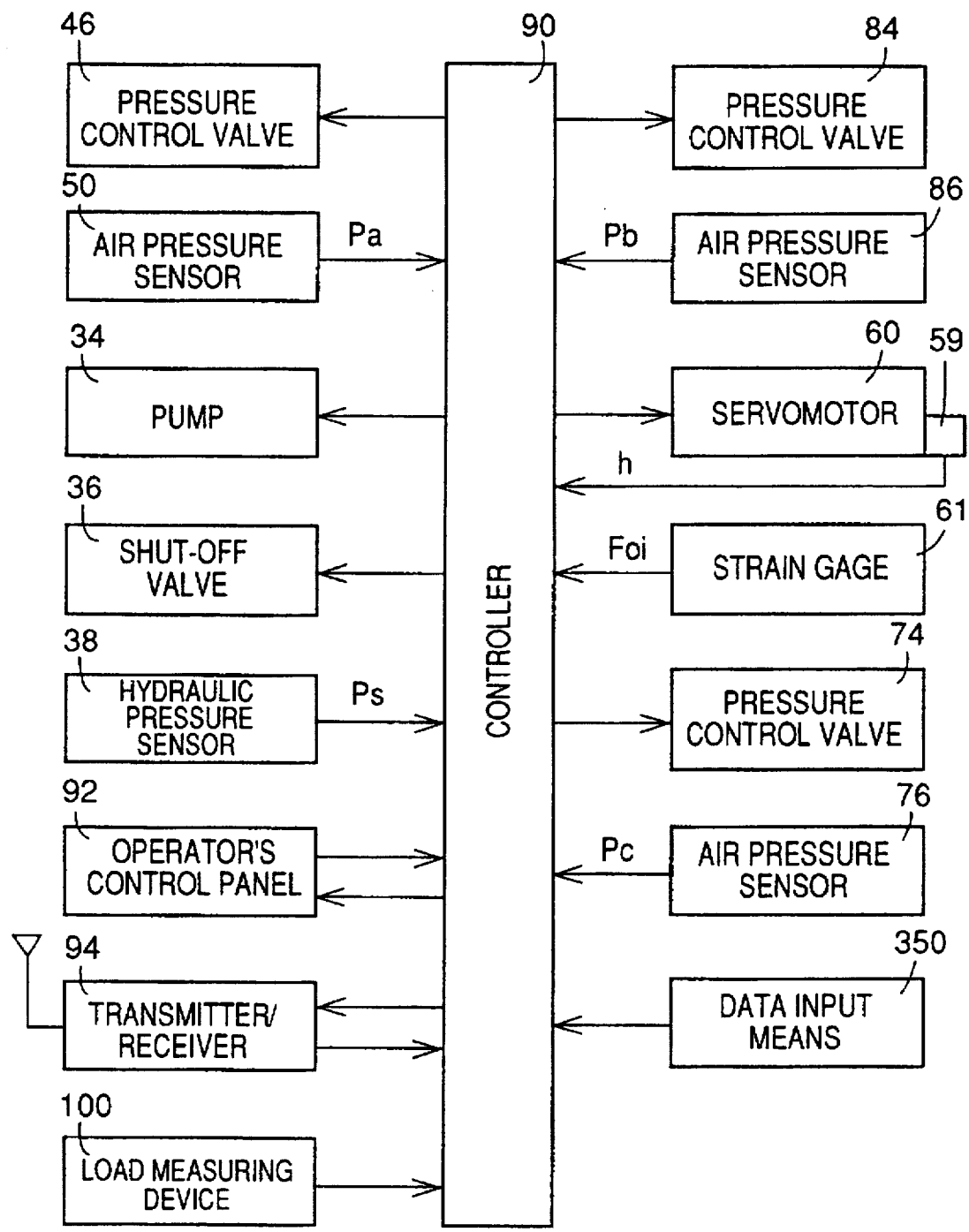
FIG. 21 is a block diagram showing a control system for the press of FIG. 1, which is constructed according to a fifth embodiment of the invention.
Figure 22:
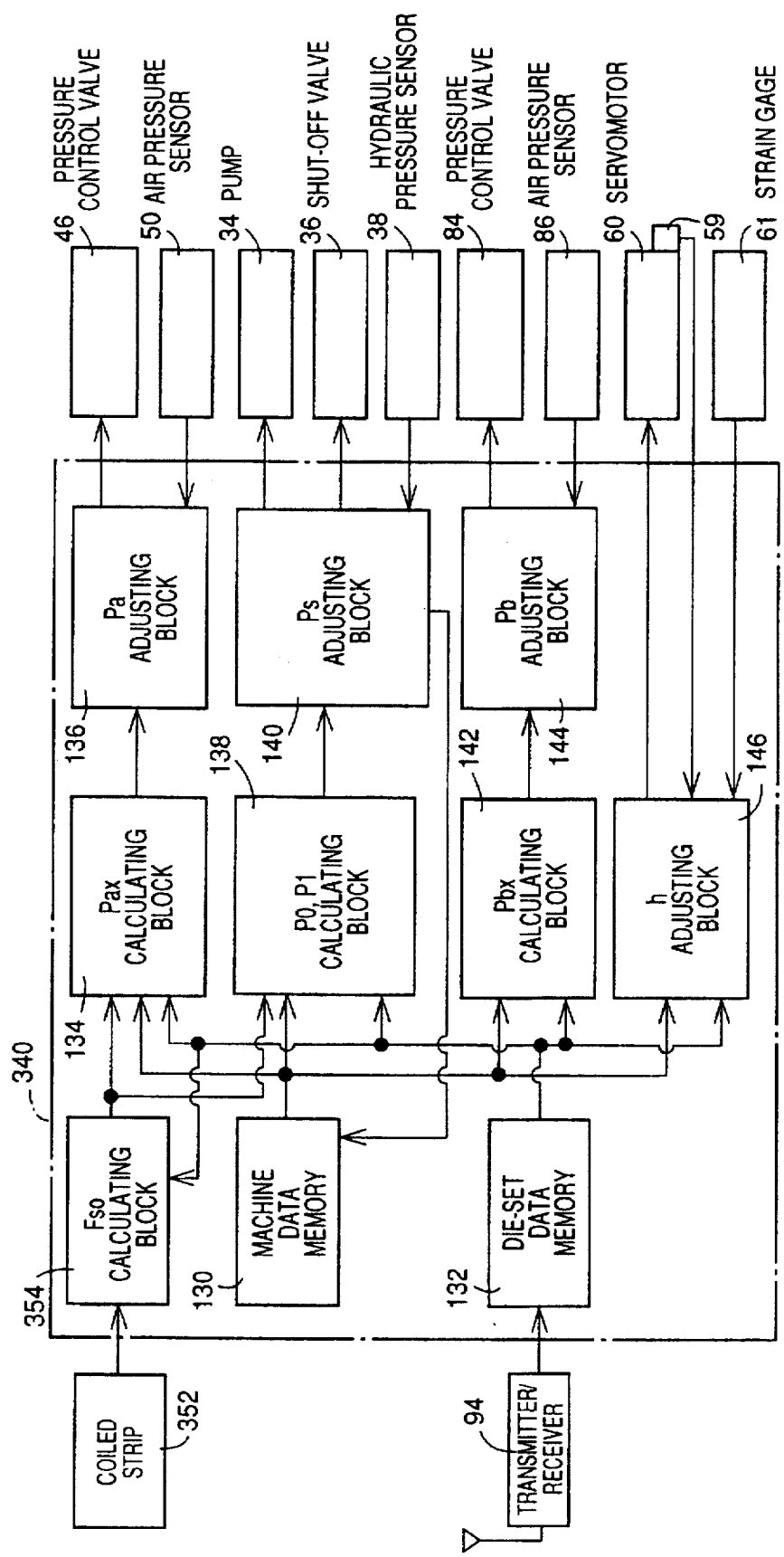
FIG. 22 is a block diagram for explaining the function of a controller of the control system of FIG. 21.

Referring next to the block diagrams of FIGS. 21 and 22, there is illustrated a control system for the press 10 of FIGS. 1 and 2, which is constructed according to a fifth embodiment of the present invention. The present control system uses a controller 340, and data input means 350 for the operator to enter physical values associated with the blank 49, which physical values will influence the quality of the product obtained from the blank 49 even when the blank 49 is drawn under the said blank-holding force Fs. These physical values are indicated below.

Figure 23:
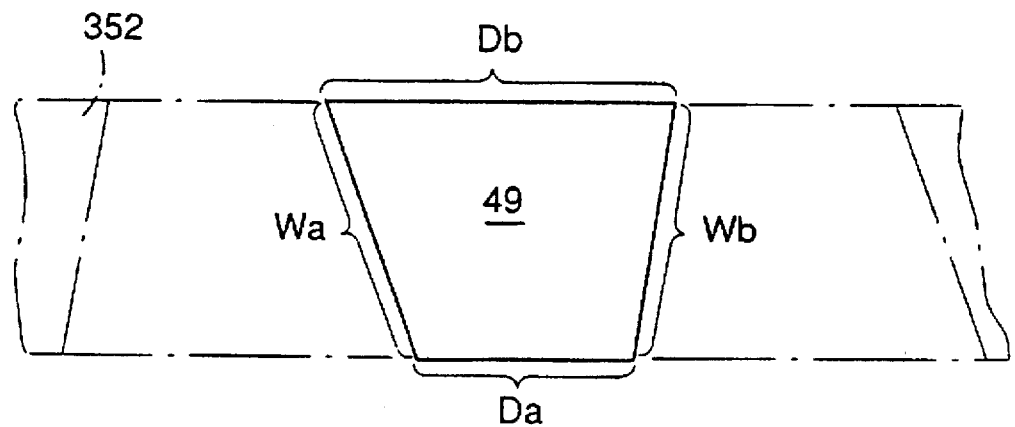
FIG. 23 is a view for explaining dimensions of a blank to be drawn on the press of FIG. 1 under the control of the control system of FIG. 21.

(a) Configuration of the blank 49
  Thickness t
  Dimensions Da, Db, Wa, Wb as indicated in FIG. 23
(b) Mechanical properties of the blank 49
  Tensile stress σmax
  Value "r" indicative of deformability in the width direction
  Value "n"
  Plastic deformation coefficient E
  Yield point stress σy
(c) Chemical Properties of the blank 49
  Content Ce of carbon (C) and manganese (Mg)
(d) Property of plating on the blank 49
  Kind and thickness M (Ata, Atb) of the plating
(e) Surface condition of the blank 49
  Surface roughness da
  Condition and properties Oi of oil The data input means 350 may include at least one of: a keyboard through which the operator of the press 10 enters the physical values; a reader for reading the physical values from a suitable memory medium such as a floppy disk, which may be received from the manufacturer of the blank 49 (in the form of a coiled strip 352 as indicated in FIG. 23); and a device adapted to receive a testing or measuring instrument or instruments for measuring the physical values directly from the blank 49 or strip 352.

Figure 24:
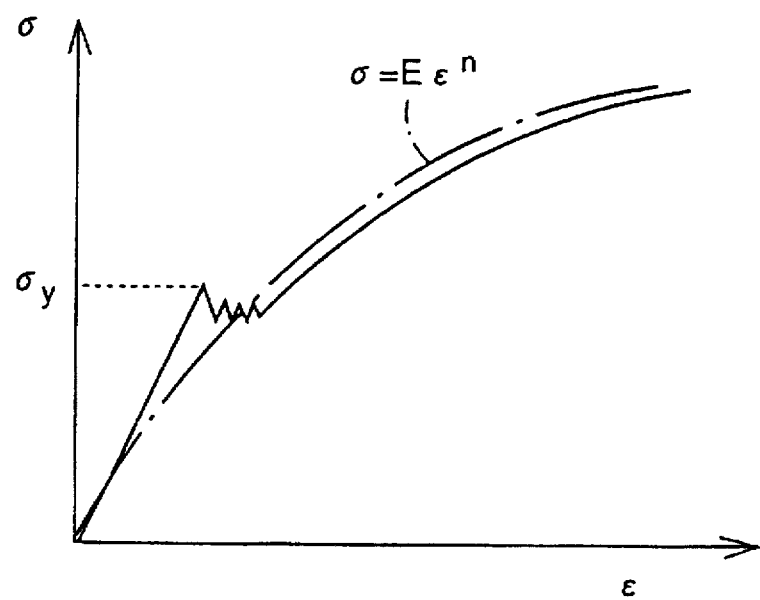
FIG. 24 is a graph for explaining physical values indicative of mechanical properties of the blank to be drawn under the control of the control system of FIG. 21.

The value "n" and the plastic deformation coefficient E are obtained by approximating a stress-strain characteristic curve (σ-ε characteristic curve) as $σ = Eε^n$, as indicated in the graph of FIG. 24. "M" represents the type of the plating applied to the surface of the blank 49, and Δta and Δtb represent the thickness values of the outer and inner plating layers. The condition and properties Oi of the oil include an amount of the oil, particle size of the oily substance, elasticity coefficient and glossiness of the oil. As indicated above, the blanks 49 in the form of the metal sheets to be loaded onto the press 10 are cut from the coiled strip 252 as indicated in FIG. 23. The physical values need not be entered into the controller 340 through the data input means 250, for each of the successive blanks or metal sheets 49. Namely, the physical values of the blanks 49 are entered at a suitable opportunity or under a predetermined condition, such as: when a new coil of the strip 252 is used; when a predetermined time has passed after the last use of the coil 352, during which time the properties of the material of the strip are changed due to aging; and when a predetermined length of the strip 352 has been used, in the case of a coil whose inner and outer portions have different properties such as different amounts of residual stress. Usually, the configuration, chemical properties and plating properties remain substantially constant and will have substantially no influences on the product, as long as the same coil of strip 352 is used. Accordingly, the appropriate physical values are entered or updated only when the use of each coil of strip is started.

In the present fifth embodiment, the die-set data memory 132 in the controller 340 stores equations (13) and (14) for calculating the optimum tension $T_0$ and the sliding resistance μ. These equations (13) and (14) will be described. However, the die-set data memory 132 does not store the optimum tension $T_0$, standard sliding resistance $μ_0$, standard ambient temperature $t_0$, and the equation (8), which are stored in the memory 132 in the first and second embodiments of FIGS. 1–10.

Figure 10:
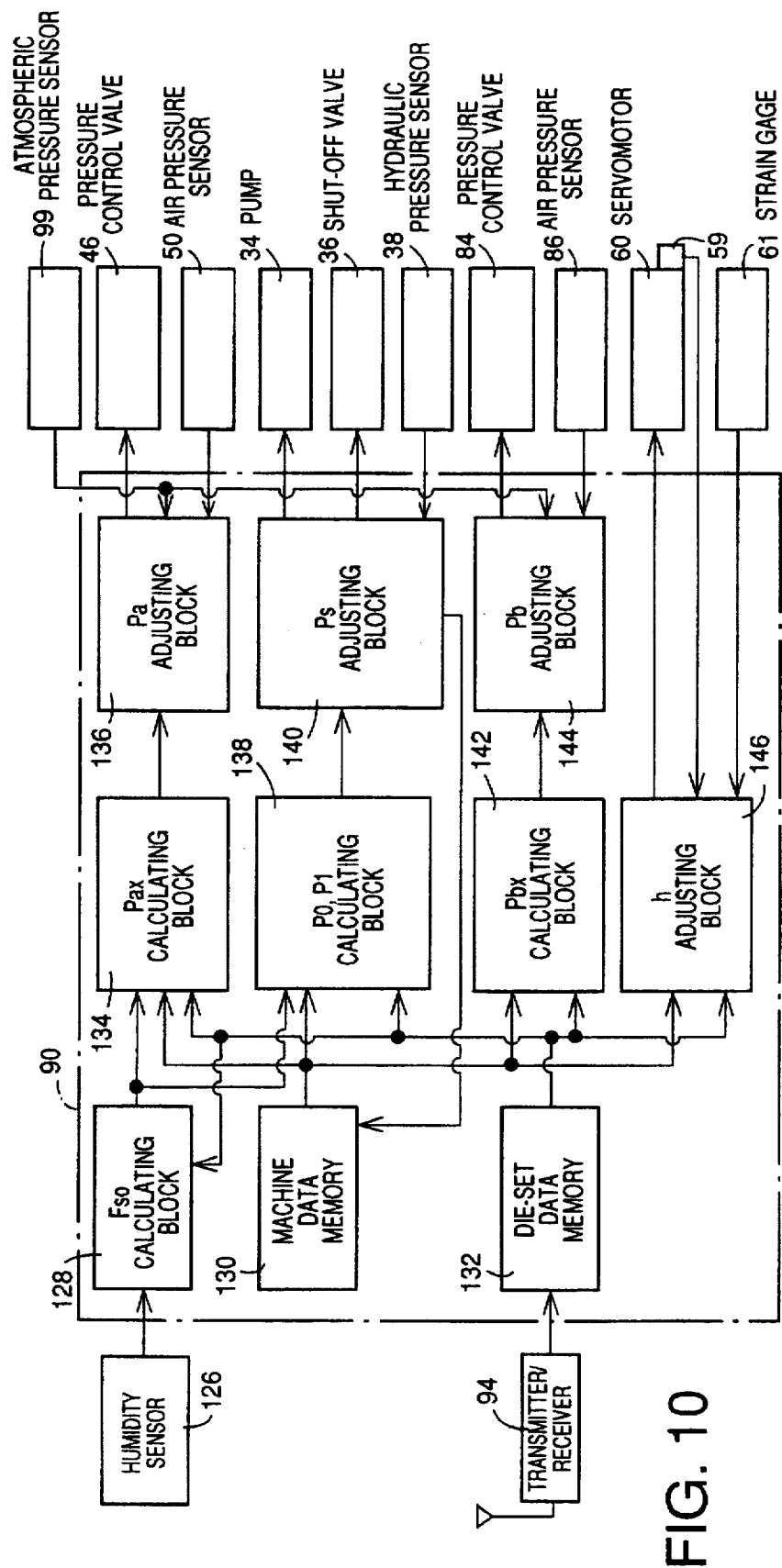
FIG. 10 is a block diagram corresponding to that of FIG. 5, for explaining the functions of a controller of the control system of FIG. 9.

The controller 340 incorporates an Fso calculating block 354 in place of the Fso calculating block 128 of FIGS. 5 and 10. The Fso calculating block 354 is adapted to calculate the optimum blank-holding force Fso depending upon the physical values of the blank 49, according to the following equation (12):

$$Fso = T_0/\mu \tag{12}$$

The optimum tension $T_0$ and the sliding resistance $\mu$ of the blank 49 which are used by the above equation (12) are obtained from the following equations (13) and 14:

$$T_0 = f(t, \sigma max, r, n, E, \sigma y, Ce) \tag{13}$$

$$\mu = g(da, Oi, M(\Delta ta, \Delta tb), Wa, Wb, Da, Db) \tag{14}$$

The above equations (13) and (14) include the various physical values of the blank 49 which are entered through the data input means 350, as described above. It is noted that the quality of the product obtained from the blank 49 depends upon the tension T of the blank during a drawing operation. In other words, whether the product suffers from creasing, cracking or deformation depends upon whether the tension T is adequate or not. The optimum tension $T_0$ is determined by the physical values of the blank 49 and the configuration of the die set. The above equation (13) for calculating the optimum tension $T_0$ is formulated by experiment or simulation or according to a theoretical formula, for each kind of the die set used on the press 10. The sliding resistance $\mu$ varies depending upon the specific plating and surface condition of the blank 49, in particular. In the present press 10 for which the control system of FIGS. 21 and 22 is used, the bead 19 is provided on the die 18. Therefore, the sliding resistance $\mu$ varies depending upon the size of the bead 19 and whether the blank 49 engages the bead 19 during the pressing operation or not. In the present embodiment, the above equation (14) is also formulated by experiment or simulation or according to a theoretical formula, for each kind of the die set. If the bead 19 is not provided, the equation (14) need not be prepared for each kind of the die set, and the dimensions Wa, Wb, Da, Db need not be included in the equation (14), that is, need not be taken into consideration in determining the sliding resistance $\mu$.

It will be understood that the optimum blank-holding force Fso is one of optimum press operating conditions, and that the die-set data memory 132 and the ID card 96 constitute relation memory means for storing a relationship between the physical values of the blank 49 and the optimum pressing condition Fso.

The above equations (13) and (14) stored in the die-set data memory 132 may be replaced by a general formula stored in a suitable memory similar to the machine data memory 130 in the controller 340, and compensating values for the values T and Fso, which compensating values are stored in the die-set data memory 132. More specifically described, a standard optimum tension per unit area of the blank 49 is calculated on the basis of the physical values of the blank 49 and according to the above-indicated general formula, irrespective of the kind of the die set. On the other hand, the compensating values stored in the die set data memory 132 are determined for each kind of the die set, on the basis of the cross sectional area of the tensioned portion of the blank 49, and on the angle of sliding movement of the blank 49 during the drawing operation. The optimum tension $T_0$ and the optimum blank-holding force Fso which correspond to the specific die set can be obtained on the basis of the compensating values stored in the die-set data memory 132 and the standard optimum tension T calculated according to the general formula.

In the present fifth embodiment, the Fso calculating block 354 is adapted to calculate the optimum tension $T_0$ and the sliding resistance $\mu$ on the basis of the physical values of the blank 49 entered through the data input means 350, and according to the above equations (13) and (14) stored in the die-set data memory 132. Then, the Fso calculating block 354 calculates the optimum blank-holding force Fso on the basis of the calculated values $T_0$ and $\mu$ and according to the above equation (12). The Fso calculating block 354 corresponds to means for and a step of calculating an optimum press operating condition on the basis of the actual physical values of the blank 49.

The calculation of the optimum blank-holding force Fso may be effected only when a new coil of strip 352 for the blanks 49 is used. However, the optimum blank-holding force Fso may be calculated or updated each time the physical values of the blanks 49 are entered during use of the same coil, at the opportunities indicated above, namely: when a predetermined time has passed after the last use of the coil 352; and when a predetermined length of the strip 352 has been, in the case of a coil whose inner and outer portions have different properties such as different amounts of residual stress.

As described above, the present fifth embodiment is adapted to calculate the optimum blank-holding force Fso depending upon the physical values indicative of the properties or characteristics of the blank 49, and adjust the air pressure Pa so that the drawing operation on the blank 49 is effected with the calculated optimum blank-holding force Fso, without a risk of creasing, cracking or deformation of the product produced by the drawing operation. Accordingly, the product has improved consistency in its quality, even if different coils of strip 352 have different physical values, that is, different physical characteristics. Thus, the present control system is effective to prevent defective products due to possible variations in the properties or characteristics of the blanks 49. Further, the present control system makes it possible to reduce the tolerance ranges of the blanks 49 in terms of the material and thickness. Moreover, the present arrangement assures the desired quality of the products, even where the products are produced from relatively inexpensive low-quality blanks 49 (coils of strip 352) which would be otherwise easily creased, cracked or deformed due to the variations in the material and thickness, whereby the cost of manufacture of the products is accordingly reduced. In addition, the present arrangement adapted to automatically adjust the pressure control valve 46 so as to establish the optimum blank-holding force Fso considerably reduces the work load of the operator, and makes it possible to fully automate the pressing operation if the physical values of the blank 49 are automatically entered into the controller 340 through the data input means 350.

Figure 25:
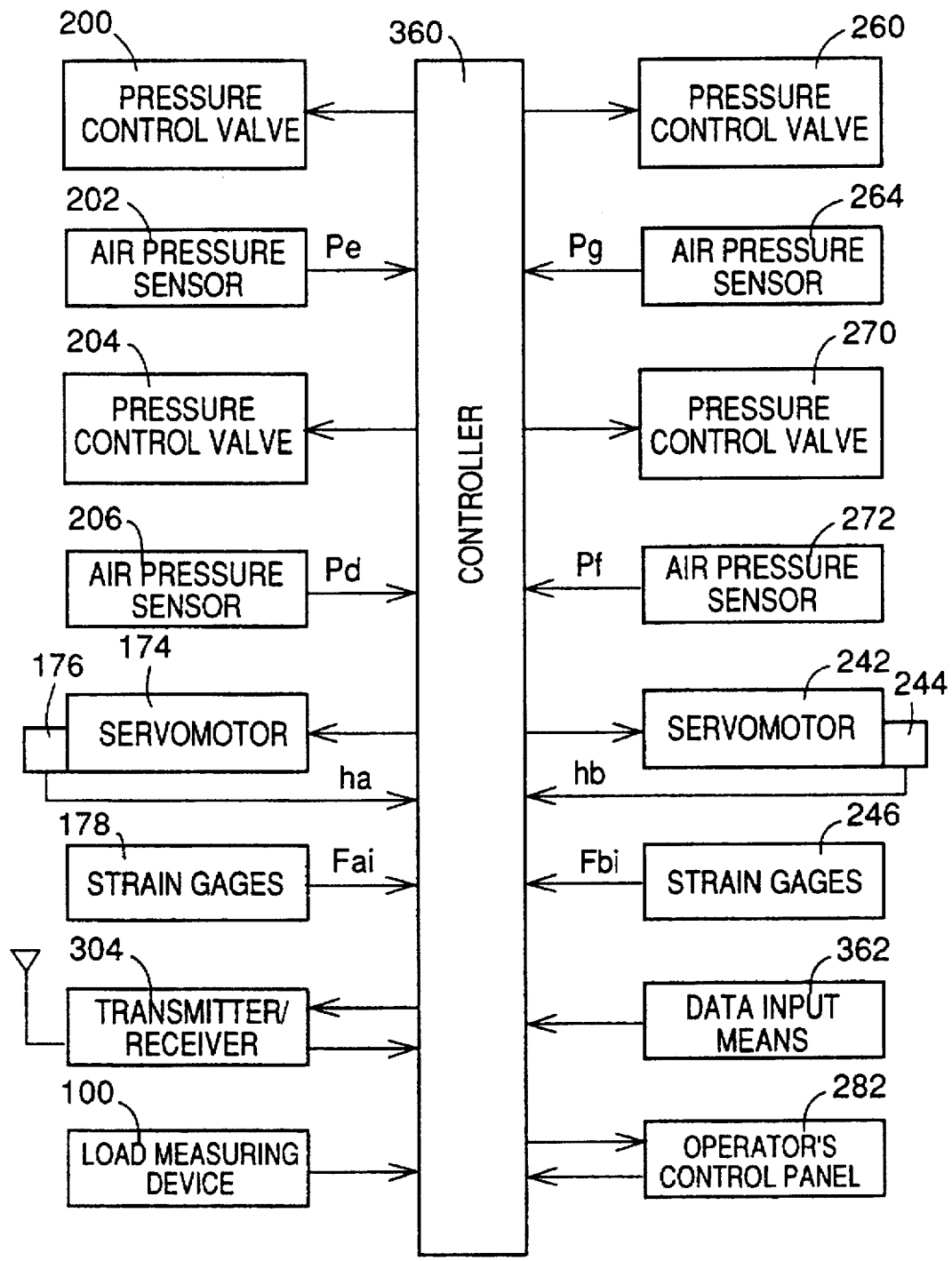
FIG. 25 is a block diagram showing a control system for the press of FIG. 11, which is constructed according to a sixth embodiment of this invention.
Figure 26:
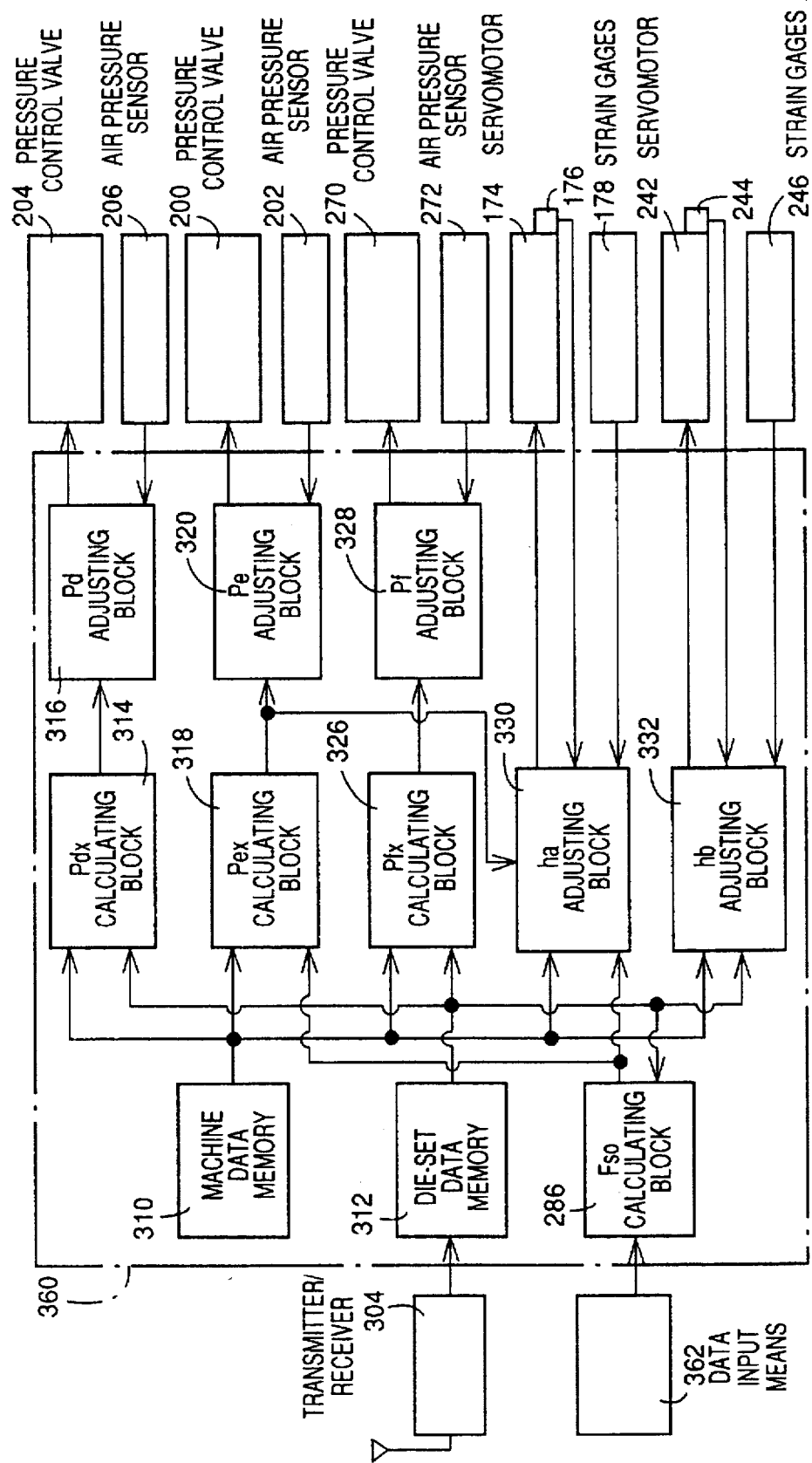
FIG. 26 is a block diagram for explaining the functions of a controller of the control system of FIG. 25.

Referring next to the block diagrams of FIGS. 25 and 26, there is illustrated a control system for the press 150 of FIGS. 11–13, which is constructed according to a sixth embodiment of the present invention. The present control system uses a controller 360, and data input means 362 for the operator to enter physical values associated with the blank 171. The data input means 362 is similar to the data input means 350 used in the preceding fifth embodiment of FIGS. 21 and 22.

In the present sixth embodiment, the die-set data memory 312 in the controller 360 stores the above equations (13) and (14) for calculating the optimum tension $T_0$ and the sliding resistance $\mu$, but does not store the optimum tension $T_0$.

standard sliding resistance $\mu_0$, standard ambient temperature $t_0$, and the equation (8), which are stored in the memory 312 in the third and fourth embodiments of FIGS. 11–20. In the present sixth embodiment, the die-set data memory 312 and the ID card 306 constitute the relationship memory means.

Figure 20:
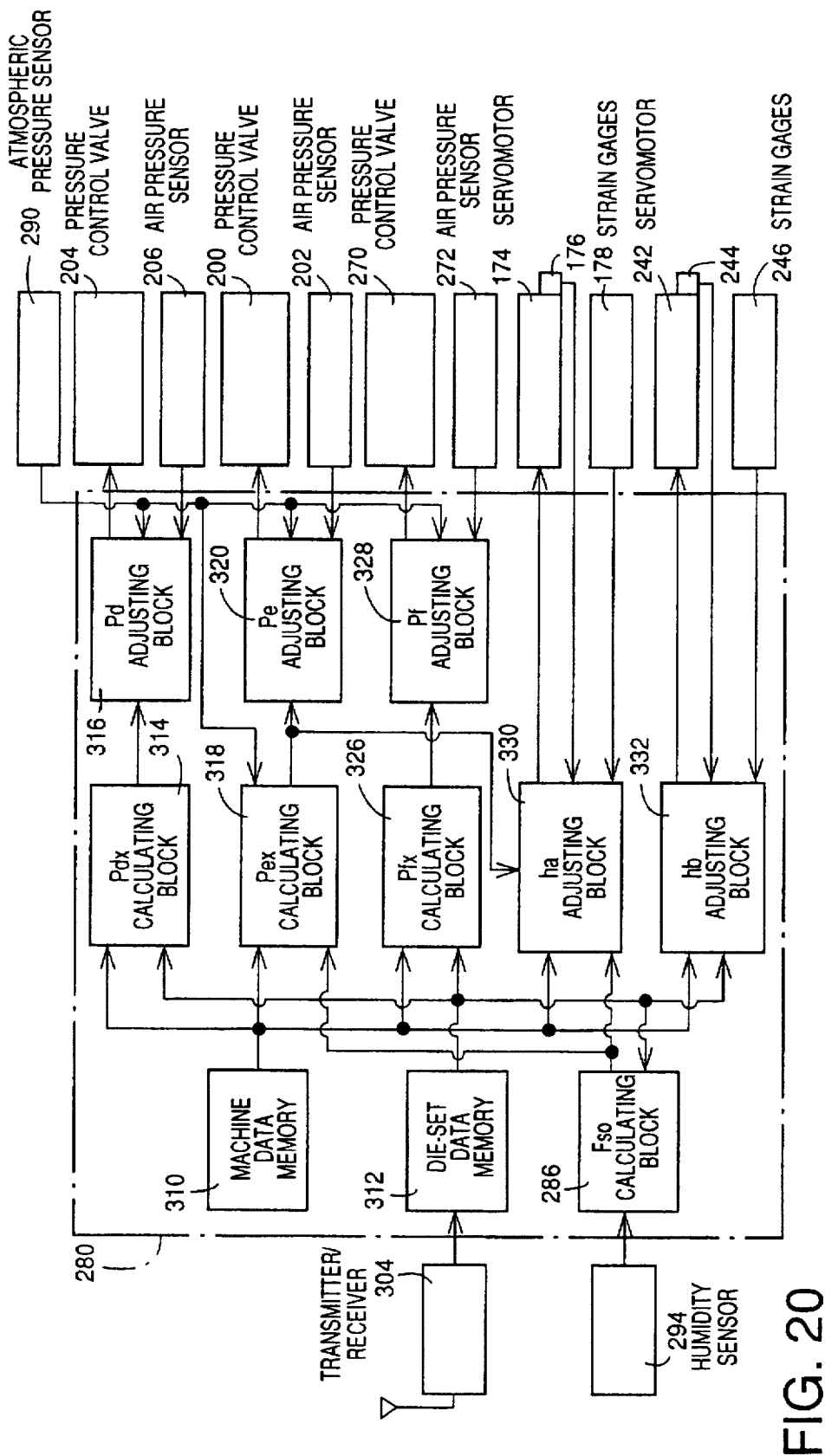
FIG. 20 is a block diagram for explaining the functions of a controller of the control system of FIG. 19.

The controller 360 incorporates an Fso calculating block 364 in place of the Fso calculating block 286 of FIGS. 16 and 20. The Fso calculating block 364 is adapted to calculate the optimum blank-holding force Fso depending upon the physical values of the blank 171. More specifically, the Fso calculating block 364 first calculates the optimum tension $T_0$ and the sliding resistance $\mu$ on the basis of the physical values entered through the data input means 362 and according to the equations (13) and (14). then, the Fso calculating block 364 calculates the optimum blank-holding force Fso on the basis of the calculated values $T_0$ and $\mu$ and according to the equation (12). The Fso calculating block 364 corresponds to means for and a step of calculating an optimum press operating condition on the basis of the actual physical values of the blank 171.

As described above, the present sixth embodiment is adapted to calculate the optimum blank-holding force Fso depending upon the physical values indicative of the properties or characteristics of the blank 171, and adjust the air pressure Pe and the relative distance ha, so that the drawing operation on the blank 171 is effected with the calculated optimum blank-holding force Fso, without a risk of creasing, cracking or deformation of the product produced by the drawing operation. Accordingly, the product has improved consistency in its quality, even if different coils of strip have different characteristics. Thus, the present control system is effective to prevent defective products due to possible variations in the properties or characteristics of the blanks 171. Further, the present control system makes it possible to reduce the tolerance ranges of the blanks 171 in terms of the material and thickness. Moreover, the present arrangement assures the desired quality of the products, even where the products are produced from relatively inexpensive low-quality blanks 171 (coils of strip) which would be otherwise easily creased, cracked or deformed due to the variations in the material and thickness, whereby the cost of manufacture of the products is accordingly reduced. In addition, the present arrangement is adapted to automatically adjust the pressure control valve 200 and the servomotor 174 so as to establish the optimum blank-holding force Fso. Thus, the present arrangement considerably reduces the work load of the operator, and makes it possible to fully automate the pressing operation if the physical values of the blank 171 are automatically entered into the controller 340 through the data input means 362.

While the present invention has been described above in detail in its presently preferred embodiments by reference to the accompanying drawings, it is to be understood that the invention may be otherwise embodied.

Although the presses 10, 150 according to the illustrated embodiments are designed to perform a drawing operation, the principle of the present invention is equally application to a press designed to perform other pressing operations such as a bending operation.

In the first, second, third and fourth embodiments of FIGS. 1–20, the optimum blank-holding force Fso is depending upon the press operating environment, the optimum forming force Ffo may be determined depending upon suitable physical values indicative of a part of the press operating environment. Similarly, the optimum forming force Ffo may be determined, in the fifth and sixth embodiments of FIGS. 21–26, depending upon physical values indicative of the properties of the blank 49, 171.

While the illustrated embodiments are adapted to automatically determine various press operating conditions such as the air pressures, the operating conditions may be manually set by the operator of the press.

In the illustrated embodiments, the relative distances h, ha, hb corresponding to the four die-height adjusting mechanisms 52, 172, 240 are adjusted independently of each other. However, the relative distance h, ha, hb may be adjusted commonly to all the four die-height adjusting mechanisms. In the first embodiment, for example, the air pressures Pc of the four hydro-pneumatic cylinders 66 are adjusted independently of each other. However, these four cylinders 66 may be connected to each other to form a common circuit, and the air pressure Pc in this common circuit may be adjusted. This modification is also possible with respect to the hydro-pneumatic cylinders 194 and 252 (air pressures Pe and Pg).

In the illustrated embodiments, the four air cylinders 80, 216, 266 are connected to the common air tank 82, 218, 268. However, the four air cylinders may be connected to respective air tanks. In this case, the air pressures in these four air cylinders (air tanks) are adjusted independently of each other.

While the illustrated embodiments use the pump, and solenoid-operated shut-off valve and solenoid-operated pressure control valves, other means may be used for adjusting the air and hydraulic pressures.

Although the press 10 is provided with the cushioning device 51 including the balancing hydraulic cylinders 32 for absorbing length variations of the cushion pins 24, the principle of the present invention is also applicable to a press provided with a cushioning device which uses balancing means other than the hydraulic cylinders 32, and to a press not provided with such cushioning device. The invention is also applicable to a press equipped with a hydraulic cylinder or cylinders in place of the cushioning air cylinder 42. In this case, the blank-holding force is generated by a resistance to flow of the working fluid from the hydraulic cylinder through a suitable relief valve when the cushion pad is lowered.

While the press 150 is adapted to produce the blank-holding force while the piston of the hydro-pneumatic cylinder 184 is retracted, the press may be modified so that the blank-holding force is produced before the piston of the cylinder 184 is retracted In this case, the blank-holding force Fs can be adjusted by controlling only the relative distance ha.

While the fifth and sixth embodiments of FIGS. 21–26 are adapted to calculate the optimum tension $T_0$ and sliding resistance $\mu$ to determine the optimum blank-holding force Fso, the optimum value Fso may be obtained directly from the physical values of the blank 49, 171.

In the fifth and sixth embodiments, the optimum tension $T_0$ and sliding resistance $\mu$ are obtained on the basis of the physical values of the blank 49, 171. However, the optimum tension may be obtained as a sum of a standard tension Tn and a compensating value $\Delta T$, and the sliding resistance may be obtained as a sum of a standard sliding resistance $\mu n$ and a compensating value $\Delta \mu$. The standard tension Tn and sliding resistance $\mu n$ are determined to assure the desired quality of the product under standard physical values of the blank. The compensating values $\mu T$ and $\Delta \mu$ are determined on the basis of differences between the actual physical values of the blank and the standard physical values used to determine the standard tension and sliding resistance Tn, $\mu n$.

It is to be understood that the present invention may be embodied with various other changes, modifications and improvements, which may occur to those skilled in the art, in the light of the foregoing teachings.

What is claimed is:

1. A method of optimizing an air pressure of an air cylinder used in a press, wherein the air pressure influences a quality of a product to be obtained by a pressing operation performed on a blank, the method comprising the steps of:

detecting an atmospheric pressure near the press;

detecting an air pressure of the air cylinder; determining, based on the detected air pressure of the air cylinder and the detected atmospheric pressure near the press, an optimum air pressure of the air cylinder; and adjusting the air pressure of the air cylinder so that it is equal to the determined optimum air pressure.

2. A method according to claim 1, wherein:

the air cylinder is a cushioning air cylinder that produces a blank-holding force that is to be applied to the blank through a pressure member that cooperates with one of a pair of dies that holds the blank therebetween; and the step of determining the optimum air pressure includes determining, based on an optimum blank-holding force, the detected air pressure of the air cylinder and the detected atmospheric pressure near the press, an optimum air pressure of the cushioning air cylinder.

3. A method according to claim 1, wherein:

the air cylinder is a counterbalancing air cylinder that is disposed between a slide plate having an upper die attached thereto and a drive mechanism for reciprocating the slide plate; and the step of determining the optimum air pressure includes determining, based on weights of both the slide plate and upper die, the detected actual air pressure of the cylinder and the detected atmospheric pressure near the press, an optimum air pressure of the counterbalancing air cylinder.

4. A method of optimizing an operating condition of a press that influences a quality of a product to be obtained by a pressing operation performed on a blank, the method comprising the steps of:

detecting one of an ambient air temperature and an ambient humidity of the press;

determining, based on one of the ambient air temperature and the ambient humidity, an optimum value for the operating condition of the press; and adjusting the operating condition of the press so that it is equal to the optimum value.

5. A method according to claim 4, wherein said step of determining an optimum value for said operating condition comprises storing said predetermined relationship in memory means of the press.

6. A method according to claim 4, wherein said operating condition of said press consists of a blank-holding force to be applied to said blank through a pressure member, and said predetermined relationship comprises an equation for obtaining an optimum value of said blank-holding force on the basis of at least an amount of change of a sliding resistance of said blank due to a change in at least one of said ambient air temperature and said ambient humidity, said sliding resistance being a resistance to a sliding movement of said blank relative to said pressure member and one of a pair of dies which cooperates with said pressure member to hold said blank during an initial period of said pressing operation.

7. A method of optimizing a blank-holding force which is to be applied to a blank through a pressure member in a press and which influences a quality of a product to be obtained by a pressing operation performed on the blank, said method comprising the steps of:

detecting an ambient air temperature of the press; determining, based on a difference between the detected ambient air temperature and a predetermined standard value for the ambient air temperature, an optimum value for the blank-holding force adjusting the blank-holding force so that it is equal to the optimum value.

8. A method of optimizing an operating condition of a press that influences a quality of a product to be obtained by a pressing operation performed on a blank, the method comprising the steps of:

detecting an ambient humidity of the press;

determining, based on a difference between the detected ambient humidity and a predetermined standard value for the ambient humidity, an optimum value for the operating condition of the press; and adjusting the operating condition of the press so that it is equal to the optimum value.

9. An apparatus for optimizing an air pressure of an air cylinder used in a press, wherein the air pressure influences a quality of a product to be obtained by a pressing operation performed on a blank, the apparatus comprising:

first detecting means for detecting an atmospheric pressure near the press;

second detecting means for detecting an air pressure of the air cylinder;

determining means for determining, based on the atmospheric pressure detected by the first detecting means and the air pressure detected by the second detecting means, an optimum air pressure of the air cylinder; and adjusting means for adjusting the air pressure of the air cylinder so that it is equal to the optimum air pressure.

10. An apparatus according to claim 9, wherein:

the air cylinder is a cushioning air cylinder that produces a blank-holding force that is to be applied to the blank through a pressure member that cooperates with one of a pair of dies that holds the blank therebetween; and the determining means determines the optimum air pressure of the cushioning air cylinder on the basis of an optimum blank-holding force as well as the detected air pressure of the air cylinder and the detected atmospheric pressure near the press.

11. An apparatus according to claim 9, wherein:

the air cylinder is a counterbalancing air cylinder that is disposed between a slide plate having an upper die attached thereto and a drive mechanism for reciprocating the slide plate; and the determining means determines the optimum air pressure of the counterbalancing air cylinder on the basis of weights of the slide plate and the upper die, the detected air pressure of the air cylinder and the detected atmospheric pressure near the press.

12. An apparatus for optimizing an operating condition of a press that influences a quality of a product to be obtained by a pressing operation performed on a blank, the apparatus comprising:

detecting means for detecting one of an ambient air temperature and an ambient humidity of the press;

memory means for storing a predetermined relationship between one of the ambient air temperature and the ambient humidity of the press and optimum values for said operating condition;

determining means for determining, based on the predetermined relationship stored in the memory means, the optimum value for the operating condition of the press; and adjusting the operating condition of the press so that it is equal to the optimum value.

13. An apparatus for optimizing a blank-holding force that is to be applied to a blank through a pressure member in a press, which influences a quality of a product to be obtained by a pressing operation performed on the blank, the apparatus comprising:

detecting means for detecting an ambient air temperature of the press;

memory means for storing a predetermined relationship between the ambient air temperature of the press and optimum values of the blank-holding force, the predetermined relationship including an equation for calculating the optimum value of the blank-holding force, the equation including a term that is representative of the difference between the detected ambient air temperature and the predetermined standard value for the ambient air temperature;

determining means for determining, based on the predetermined relationship stored in the memory means, the optimum value for the blank-holding force; and adjusting the blank-holding force so that it is equal to the optimum value.

14. An apparatus for optimizing a blank-holding force that is to be applied to a blank through a pressure member in a press, which influences a quality of a product to be obtained by a pressing operation performed on the blank, the apparatus comprising:

detecting means for detecting an ambient humidity of the press;

memory means for storing a predetermined relationship between the ambient humidity of the press and optimum values of the blank-holding force, the predetermined relationship including an equation for calculating the optimum value of the blank-holding force, the equation including a term that is representative of the difference between the detected ambient humidity and the predetermined standard value for the ambient humidity;

determining means for determining, based on the predetermined relationship, the optimum value for the blank-holding force; and adjusting the blank-holding force so that it is equal to the optimum value.

* * * * *